(12) United States Patent
Woytowitz et al.

(10) Patent No.: US 8,793,024 B1
(45) Date of Patent: Jul. 29, 2014

(54) IRRIGATION SYSTEM WITH MULTIPLE SOIL MOISTURE BASED SEASONAL WATERING ADJUSTMENT

(75) Inventors: Peter J. Woytowitz, San Diego, CA (US); Jeffrey J. Kremicki, Cardiff by the Sea, CA (US); LaMonte D. Porter, San Marcos, CA (US)

(73) Assignee: Hunter Industries, Inc., San Marcos, CA (US)

( * ) Notice: Subject to any disclaimer, the term of this patent is extended or adjusted under 35 U.S.C. 154(b) by 527 days.

(21) Appl. No.: 12/713,104

(22) Filed: Feb. 25, 2010

Related U.S. Application Data

(60) Provisional application No. 61/156,397, filed on Feb. 27, 2009.

(51) Int. Cl.
G05D 11/00 (2006.01)
G05B 11/01 (2006.01)
B05B 3/00 (2006.01)
F16K 31/00 (2006.01)

(52) U.S. Cl.
USPC ............................ 700/284; 239/723; 137/78.2

(58) Field of Classification Search
USPC ....................... 700/14, 284; 137/78.2; 239/723
See application file for complete search history.

(56) References Cited

U.S. PATENT DOCUMENTS

| | | | | |
|---|---|---|---|---|
| 3,721,254 A | * | 3/1973 | Rutten | 137/78.2 |
| 4,176,395 A | * | 11/1979 | Evelyn-Veere et al. | 700/284 |
| 4,180,083 A | * | 12/1979 | Miyaoka et al. | 137/101.25 |
| 4,567,563 A | | 1/1986 | Hirsch | |
| 4,646,224 A | * | 2/1987 | Ransburg et al. | 700/14 |
| 4,693,419 A | | 9/1987 | Weintraub et al. | |
| 4,722,478 A | * | 2/1988 | Fletcher et al. | 239/69 |
| 4,807,664 A | * | 2/1989 | Wilson et al. | 137/624.11 |
| 4,811,221 A | * | 3/1989 | Sturman et al. | 700/284 |
| 4,877,189 A | * | 10/1989 | Williams | 239/749 |

(Continued)

FOREIGN PATENT DOCUMENTS

| | | |
|---|---|---|
| WO | WO 03/008473 A1 | 10/2003 |
| WO | WO 2008/144563 | 11/2008 |

OTHER PUBLICATIONS

Dukes et al.,"Soil Moisture Sensor Control for Conservation of Landscape Irrigation", 2007, Georgia Water Resources Conference, Mar. 27-29.*

(Continued)

Primary Examiner — Kavita Padmanabhan
Assistant Examiner — Thomas Stevens
(74) Attorney, Agent, or Firm — Knobbe, Martens, Olson & Bear, LLP

(57) ABSTRACT

An irrigation controller has a control panel including a display and a plurality of user inputs. A processor is operatively connected to the control panel and to a memory. A plurality of switches are operatively connected to the processor for turning a power signal ON and OFF to a plurality of valves that deliver water to a plurality of sprinklers in different zones. Programming is stored in the memory for implementing a seasonal adjustment feature that is independently operable with a plurality of individual watering programs to selectively energize the valves. The programming calculates a soil moisture requirement value for each program using a signal from at least one soil moisture sensor that is associated with a zone that is assigned to that watering program, and automatically modifies the watering program assigned to that zone through the seasonal adjust feature based on the soil moisture requirement value.

20 Claims, 43 Drawing Sheets

(56) References Cited

U.S. PATENT DOCUMENTS

| Patent | Date | Inventor | Ref |
|---|---|---|---|
| 4,922,433 A * | 5/1990 | Mark | 700/284 |
| 4,937,732 A * | 6/1990 | Brundisini | 700/16 |
| 5,097,861 A | 3/1992 | Hopkins et al. | |
| 5,148,826 A | 9/1992 | Bakhshaei | |
| 5,148,985 A * | 9/1992 | Bancroft | 239/64 |
| 5,173,855 A * | 12/1992 | Nielsen et al. | 700/284 |
| 5,208,855 A | 5/1993 | Marian | |
| 5,229,937 A | 7/1993 | Evelyn-Veere | |
| 5,251,153 A * | 10/1993 | Nielsen et al. | 700/284 |
| 5,293,554 A * | 3/1994 | Nicholson | 700/284 |
| 5,337,957 A | 8/1994 | Olson | |
| 5,381,331 A * | 1/1995 | Mock et al. | 700/16 |
| 5,444,611 A | 8/1995 | Woytowitz et al. | |
| 5,546,974 A * | 8/1996 | Bireley | 137/78.3 |
| 5,694,963 A * | 12/1997 | Fredell et al. | 137/2 |
| 5,696,671 A | 12/1997 | Oliver | |
| 5,740,038 A * | 4/1998 | Hergert | 700/284 |
| 5,829,678 A | 11/1998 | Hunter et al. | |
| 5,836,339 A * | 11/1998 | Klever et al. | 137/78.2 |
| 5,870,302 A | 2/1999 | Oliver | |
| 5,944,444 A * | 8/1999 | Motz et al. | 405/37 |
| 6,016,971 A * | 1/2000 | Welch et al. | 239/63 |
| 6,088,621 A | 7/2000 | Woytowitz et al. | |
| 6,145,755 A * | 11/2000 | Feltz | 239/1 |
| 6,227,220 B1 * | 5/2001 | Addink | 137/1 |
| 6,267,298 B1 | 7/2001 | Campbell | |
| 6,298,285 B1 * | 10/2001 | Addink et al. | 700/284 |
| 6,314,340 B1 | 11/2001 | Mecham et al. | |
| 6,452,499 B1 | 9/2002 | Runge et al. | |
| 6,453,215 B1 * | 9/2002 | Lavoie | 700/284 |
| 6,453,216 B1 | 9/2002 | McCabe et al. | |
| 6,568,416 B2 * | 5/2003 | Tucker et al. | 137/14 |
| 6,570,109 B2 | 5/2003 | Klinefelter et al. | |
| 6,600,971 B1 * | 7/2003 | Smith et al. | 700/284 |
| 6,721,630 B1 | 4/2004 | Woytowitz | |
| 6,782,311 B2 | 8/2004 | Barlow et al. | |
| 6,823,239 B2 | 11/2004 | Sieminski | |
| 6,842,667 B2 | 1/2005 | Beutler et al. | |
| 6,892,114 B1 | 5/2005 | Addink et al. | |
| 6,895,987 B2 | 5/2005 | Addink et al. | |
| 6,947,811 B2 | 9/2005 | Addink et al. | |
| 6,977,351 B1 | 12/2005 | Woytowitz | |
| 6,993,416 B2 * | 1/2006 | Christiansen | 700/284 |
| 7,010,394 B1 | 3/2006 | Runge et al. | |
| 7,010,396 B2 * | 3/2006 | Ware et al. | 700/284 |
| 7,048,204 B1 | 5/2006 | Addink et al. | |
| 7,058,478 B2 | 6/2006 | Alexanian | |
| 7,069,115 B1 | 6/2006 | Woytowitz | |
| 7,133,749 B2 * | 11/2006 | Goldberg et al. | 700/284 |
| 7,146,254 B1 | 12/2006 | Howard | |
| 7,168,632 B2 * | 1/2007 | Kates | 239/69 |
| 7,203,576 B1 * | 4/2007 | Wilson et al. | 700/284 |
| 7,225,058 B1 | 5/2007 | Porter | |
| 7,245,991 B1 * | 7/2007 | Woytowitz | 700/284 |
| 7,261,245 B2 * | 8/2007 | Zur | 239/1 |
| 7,289,886 B1 | 10/2007 | Woytowitz | |
| 7,403,840 B2 | 7/2008 | Moore et al. | |
| 7,412,303 B1 * | 8/2008 | Porter et al. | 700/284 |
| 7,430,458 B2 | 9/2008 | Dansereau et al. | |
| 7,458,521 B2 * | 12/2008 | Ivans | 239/1 |
| 7,477,950 B2 * | 1/2009 | DeBourke et al. | 700/19 |
| 7,532,954 B2 | 5/2009 | Evelyn-Veere | |
| 7,596,429 B2 | 9/2009 | Cardinal et al. | |
| 7,619,322 B2 * | 11/2009 | Gardner et al. | 307/40 |
| 7,789,321 B2 * | 9/2010 | Hitt | 239/63 |
| 7,805,221 B2 | 9/2010 | Nickerson | |
| 7,853,363 B1 | 12/2010 | Porter et al. | |
| 7,877,168 B1 | 1/2011 | Porter et al. | |
| 7,953,517 B1 | 5/2011 | Porter et al. | |
| 7,956,624 B2 * | 6/2011 | Beaulieu | 324/692 |
| 8,301,309 B1 | 10/2012 | Woytowitz et al. | |
| 8,538,592 B2 | 9/2013 | Alexanian | |
| 8,548,632 B1 | 10/2013 | Porter et al. | |
| 8,600,569 B2 | 12/2013 | Woytowitz et al. | |
| 8,606,415 B1 | 12/2013 | Woytowitz et al. | |
| 2002/0002425 A1 * | 1/2002 | Dossey et al. | 700/284 |
| 2002/0072829 A1 | 6/2002 | Addink et al. | |
| 2003/0093159 A1 | 5/2003 | Sieminski | |
| 2003/0109964 A1 | 6/2003 | Addink et al. | |
| 2003/0179102 A1 * | 9/2003 | Barnes | 340/870.07 |
| 2003/0182022 A1 | 9/2003 | Addink et al. | |
| 2004/0011880 A1 | 1/2004 | Addink et al. | |
| 2004/0015270 A1 | 1/2004 | Addink et al. | |
| 2004/0030456 A1 | 2/2004 | Barlow et al. | |
| 2004/0039489 A1 | 2/2004 | Moore et al. | |
| 2004/0181315 A1 * | 9/2004 | Cardinal et al. | 700/284 |
| 2004/0206395 A1 * | 10/2004 | Addink et al. | 137/80 |
| 2004/0225412 A1 * | 11/2004 | Alexanian | 700/284 |
| 2005/0038569 A1 | 2/2005 | Howard | |
| 2005/0125083 A1 * | 6/2005 | Kiko | 700/19 |
| 2005/0199842 A1 * | 9/2005 | Parsons et al. | 251/129.04 |
| 2005/0203669 A1 | 9/2005 | Curren | |
| 2005/0211791 A1 | 9/2005 | Clark et al. | |
| 2005/0211792 A1 | 9/2005 | Clark et al. | |
| 2005/0211793 A1 | 9/2005 | Clark et al. | |
| 2005/0211794 A1 | 9/2005 | Clark et al. | |
| 2005/0216127 A1 | 9/2005 | Clark et al. | |
| 2005/0216128 A1 | 9/2005 | Clark et al. | |
| 2005/0216129 A1 | 9/2005 | Clark et al. | |
| 2005/0216130 A1 | 9/2005 | Clark et al. | |
| 2006/0116792 A1 | 6/2006 | Addink | |
| 2006/0122736 A1 * | 6/2006 | Alexanian | 700/284 |
| 2006/0161309 A1 | 7/2006 | Moore et al. | |
| 2006/0184284 A1 * | 8/2006 | Froman et al. | 700/284 |
| 2006/0184285 A1 | 8/2006 | Evelyn-Veere | |
| 2007/0016334 A1 * | 1/2007 | Smith et al. | 700/284 |
| 2007/0055407 A1 | 3/2007 | Goldberg et al. | |
| 2007/0156290 A1 * | 7/2007 | Froman et al. | 700/284 |
| 2007/0237583 A1 * | 10/2007 | Corwon et al. | 405/37 |
| 2007/0282486 A1 * | 12/2007 | Walker et al. | 700/284 |
| 2007/0293990 A1 | 12/2007 | Alexanain | |
| 2008/0091307 A1 | 4/2008 | Dansereau et al. | |
| 2008/0142614 A1 * | 6/2008 | Elezaby | 239/69 |
| 2009/0094097 A1 | 4/2009 | Gartenswartz | |
| 2009/0099701 A1 | 4/2009 | Li et al. | |
| 2009/0138105 A1 | 5/2009 | Crawford | |
| 2009/0177330 A1 | 7/2009 | Kah, Jr. | |
| 2009/0216345 A1 * | 8/2009 | Christfort | 700/21 |
| 2009/0326723 A1 | 12/2009 | Moore et al. | |
| 2010/0030476 A1 | 2/2010 | Woytowitz et al. | |
| 2010/0094472 A1 | 4/2010 | Woytowitz et al. | |
| 2010/0312404 A1 | 12/2010 | Nickerson | |
| 2011/0093123 A1 * | 4/2011 | Alexanian | 700/284 |
| 2011/0224836 A1 | 9/2011 | Hern et al. | |
| 2011/0238228 A1 | 9/2011 | Woytowitz et al. | |
| 2011/0238229 A1 | 9/2011 | Woytowitz et al. | |

OTHER PUBLICATIONS

Shedd et al., "Evaluation of Evapotranspiration and Soil Moisture-based Irrigation Control on Turfgrass", Proceedings ASCE EWRI World Environmental & Water Resources Congress, May 15-19, 2007, 21 pages.*

Hunter Catalog 2007, 110 pages.*

The ongoing prosecution history of U.S. Appl. No. 11/458,551, filed Jul. 19, 2006, including without limitations Office Action, Amendments, Remarks, and any other potentially relevant documents.

The ongoing prosecution history of U.S. Appl. No. 12/042,301, filed Mar. 4, 2008, including without limitations Office Action, Amendments, Remarks, and any other potentially relevant documents.

Aqua Conserve Products from Internet—Email address: http://www.aquaconserve.com/products.php (2002, Aqua Conservation Systems), in 5 pages.

East Bay Municipal Utility District (EBMUD), "Irrigation Controllers Timer for the Homeowner," US Environmental Protection Agency (EPA) (EPA 832-K-03-001, Jul. 2003)—http://www.epa.gov/owm/water-efficiency/Irrigation_booklet.pdf, 13 pages.

Hydropoint, Inc., WeatherTRAK, Smart Irrigation Made Simple, in 1 page. 2004 Hydropoint, Inc. http://www.hydropoint.com (2004 Hydropoint, Inc.), 1 page.

Residential Landscape Irrigation Study Using Aqua ET Controllers for Aqua Conserve, Denver Water, Denver, CO & City of Sonoma, CA & Valley of the Moon Water District, CA. Jun. 2002, in 5 pages.

(56) References Cited

OTHER PUBLICATIONS

SRR Remote Wiring and Installation of Hunter the Irrigation Innovators from Internet—Email address: http:///www.hunterindustries.com/resources/technical_bulletin/srr_remote.html (2004 Hunter Industries Incorporated), in 1 page.

Toro Partners with HydroPoint Data Systems to Develop Weather-Based Irrigation Controllers of Athletic Turf News from Internet—Email address: http://athleticturf.net/athleticturf/article, Jan. 16, 2004, 2 pages.

U.S. Appl. No. 10/985,425 "Amendment" in response to USPTO Office Action mailed on Aug. 11, 2005 in 9 pages.

U.S. Appl. No. 10/985,425 "Amendment" in response to USPTO Office Action mailed Dec. 6, 2005 in 8 pages.

U.S. Appl. No. 10/985,425 "Examiner's Answer" in response to Appellants' Appeal Brief filed Mar. 23, 2007 (appealing from USPTO Office Action mailed on Mar. 24, 2006), 8 pages.

U.S. Appl. No. 10/985,425 "Reply Brief" in response to Examiner's Answer from Board of Appeals and Interferences mailed Jul. 25, 2007, 3 pages.

Crop Evapotranspiration—Guidelines for Computing Crop Water Requirements—FAQ Irrigation and Drainage Paper 56 Attachment for link to Internet—Email address: http://hydrotechnic.150m.com/crop_water.html (1998) 60 pages.

U.S. Appl. No. 10/985,425 "Brief on Appeal" in response to Board of Appeals and Interferences' Notice of Panel Decision from Pre-Appeal Brief Review mailed Jan. 23, 2007 (appealing from USPTO Office Action mailed Mar. 24, 2006) in 22 pages.

* cited by examiner

IRRIGATION SYSTEM WITH MULTIPLE SOIL MOISTURE BASED SEASONAL WATERING ADJUSTMENT

CROSS-REFERENCE TO RELATED APPLICATIONS

This application is related, by inventorship and subject matter, to co-pending U.S. patent application Ser. No. 12/251,179 filed Oct. 14, 2008 by Peter J. Woytowitz et al. entitled "Irrigation System with Soil Moisture Based Seasonal Watering Adjustment." This application claims priority from the similarly entitled U.S. Provisional Application Ser. No. 61/156,397 filed by Peter J. Woytowitz et al. on Feb. 27, 2009.

FIELD OF THE INVENTION

The present invention relates to residential and commercial irrigation systems, and more particularly to irrigation controllers that use soil moisture data in calculating and executing watering schedules.

BACKGROUND OF THE INVENTION

Electronic irrigation controllers have long been used on residential and commercial sites to water turf and landscaping. They typically comprise a plastic housing that encloses circuitry including a processor that executes a watering program. Watering schedules are typically manually entered or selected by a user with pushbutton and/or rotary controls while observing an LCD display. The processor turns a plurality of solenoid actuated valves ON and OFF with solid state switches in accordance with the watering schedules that are carried out by the watering program. The valves deliver water to sprinklers connected by subterranean pipes.

There is presently a large demand for conventional irrigation controllers that are easy for users to set up in terms of entering and modifying the watering schedules. One example is the ICC™ irrigation controller commercially available from Hunter Industries, Inc., the assignee of the subject application. Commercial controllers may allow the user to enter multiple watering programs. Each watering program consists of one or more watering schedules. The user simply enters the start times for a selected watering program, assigns one or more stations to the watering program, and schedules each station to run a predetermined number of minutes to meet the irrigation needs of the site. The problem with conventional irrigation controllers is that they are often set up to provide the maximum amount of irrigation required for the hottest and driest season, and then either left that way for the whole year, or in some cases the watering schedules are modified once or twice per year by the user. The result is that large amounts of water are wasted. Water is a precious natural resource and there is an increasing need to conserve the same.

A conventional irrigation controller of the type that is used in the commercial market includes a seasonal adjustment feature. In some controllers, there is one seasonal adjustment that is an overall adjustment for all stations in the controller that is changed by the user and adjusts the overall watering as a percentage of the originally scheduled cycle times. This feature is typically a simple global adjustment implemented by the user that adjusts the overall watering as a percentage of the originally scheduled cycle times. It is common for the seasonal adjustment to vary between a range of about ten percent to about one hundred and fifty percent or more of the scheduled watering. This is the simplest and most common overall watering adjustment that users of irrigation controllers can effectuate to modify their irrigation requirements through the different seasons. Some commercially available irrigation controllers expand this capability by allowing independent seasonal adjustment of each program. This may be referred to as multiple seasonal adjusts, percentage adjusts by program or water budget by program. Because of this, there is the potential to have several seasonal adjustments that need to be made by the user. With this advanced programming where the user has a separate seasonal adjust for each program, the user may assign stations with similar irrigation requirements to an independent seasonal adjust. For example, all of the stations that irrigate turf in the sun may be assigned to one seasonal adjust. Likewise, all stations that water turf in the shade may be assigned to another seasonal adjustment. This may continue as they add other zones such as those used for potted plants, those used for planters with over head watering, those used for planters with drip, those used for watering trees, etc. While this allows for greater flexibility to perform better irrigation throughout the seasons, it adds to the complexity for the user. Users can move the amount of adjustments down to zero to thirty percent in the winter, depending on their local requirements. They may run the system at fifty percent during the spring or fall seasons, and then at one hundred percent for the summer. The ability to seasonally adjust up to three hundred percent of the scheduled watering accommodates the occasional heat wave when turf and landscaping require significantly increased watering. The seasonal adjustment feature does not produce the optimum watering schedules because it does not take into consideration the amount of moisture that is actually available in the soil for the plants to utilize for healthy growth. Instead, the seasonal adjustment feature is manually set to simply adjust the watering schedules either globally, or by individual programs, to run a longer or shorter period of time based on the existing watering schedules. When the seasonal adjustment feature is accurately re-set on a regular basis, a substantial amount of water is conserved while still providing adequate irrigation in a variety of weather conditions. The problem is that most users do not re-set this on a regular basis, or do not set this correctly, so either a considerable amount of water is wasted, or turf and landscaping die.

In the past, irrigation controllers used with turf and landscaping have used soil moisture data to activate or deactivate irrigation zones based on actual soil moisture conditions. When soil moisture sensors are used with conventional irrigation controllers the sensors typically interrupt the programmed irrigation cycle by breaking the electrical connection between the controller and the irrigation valves when the soil is moist. Some specialized controllers that are designed to work specifically with soil moisture sensors can turn the irrigation on when the soil reaches a dry state, then turns the irrigation off when it reaches a moist state.

While conventional soil moisture based controllers help to conserve water and maintain plant health over a wider range of weather conditions they are specifically adapted to soil moisture sensor control and may not meet other needs of the landscaped area well. Soil moisture sensors that are hooked up to traditional irrigation controllers may simply disrupt the scheduled irrigation by disconnecting the common line to the valves when the soil is moist. In these cases, the irrigation controller turns ON the outputs to the valves when they are normally scheduled to run. If the soil moisture sensor is sensing moist soil conditions, it simply disconnects the electrical circuit to the valve. The controller thinks it is irrigating, but the irrigation process is not happening. This can create confusion for the user when they go to the controller and see that station (X) is on yet they go out to the property to see that the same station is not running irrigation. This can result in calls to professionals to debug the irrigation system when the soil moisture was just keeping the station from running as designed. In these applications, there is no indication on the controller that the soil moisture has disrupted the irrigation process.

In both of the aforementioned circumstances, the systems may require one sensor to be placed in the ground for every zone on the controller. Cables are then run back to the controller through the landscape. Some commercially available irrigation controllers irrigate over forty zones. This requires a substantial cost in materials and labor. Additionally, some conventional irrigation controllers calculate the amount of water used based on the irrigation cycles as they run. When the sensors disrupt irrigation, while the controller thinks it is irrigating, the controller creates erroneous reports of over use of water, when in fact conservation is occurring. In some irrigation controllers, the controller knows the theoretical amount of water scheduled to be applied. As the stations are running, the controller measures this theoretical flow against the actual flow with a flow meter installed on the irrigation site. When the theoretical and actual flow are not within certain parameters, an alarm will indicate that there is a problem with the irrigation system. Soil moisture installations mentioned above will not work with these types of controllers.

In another application one soil moisture sensor is hooked up to a rain sensor input on a conventional type of irrigation controller. In this case, as soon as the soil moisture sensor detects moisture, it shuts the entire controller off. This requires abnormal programming in the controller and also requires the soil moisture sensor to be placed in the last station to be run so the irrigation does not shut off before all stations have irrigated. With this arrangement, watering conservation may not be optimized as all of the previous stations may have run too much water for proper irrigation to have occurred prior to the last station sensing that the soil is moist after just a few minutes of irrigation.

SUMMARY OF THE INVENTION

The present invention provides an irrigation controller with a control panel including a display and a plurality of user inputs. A processor is operatively connected to the control panel and to a memory. A plurality of switches are operatively connected to the processor for turning a power signal ON and OFF to a plurality of valves that deliver water to a plurality of sprinklers in different zones. Programming is stored in the memory for implementing a seasonal adjustment feature that is independently operable with a plurality of individual watering programs to selectively energize the valves. The programming calculates a soil moisture requirement value for each watering program using a signal from at least one soil moisture sensor that is associated with a zone that is assigned to that watering program, and automatically modifies the watering program assigned to that zone through the seasonal adjust feature based on the soil moisture requirement value.

The present invention also provides a soil moisture based irrigation system that includes a stand alone irrigation controller with a seasonal adjustment feature that is independently operable with individual watering programs to selectively energize a plurality of electrically actuated valves that deliver water to a plurality of sprinklers in different zones. The system further includes a plurality of soil moisture sensors, each zone having at least one soil moisture sensor physically associated therewith. A stand alone soil moisture control unit is operatively in communication with the irrigation controller. The soil moisture sensor control unit includes programming configured to calculate a soil moisture requirement value for each zone using a signal from at least one soil moisture sensor associated with that zone and to automatically modify one or more watering programs of the irrigation controller assigned to that zone through the seasonal adjust feature based on the soil moisture requirement value.

DETAILED DESCRIPTION

Figure 1A:
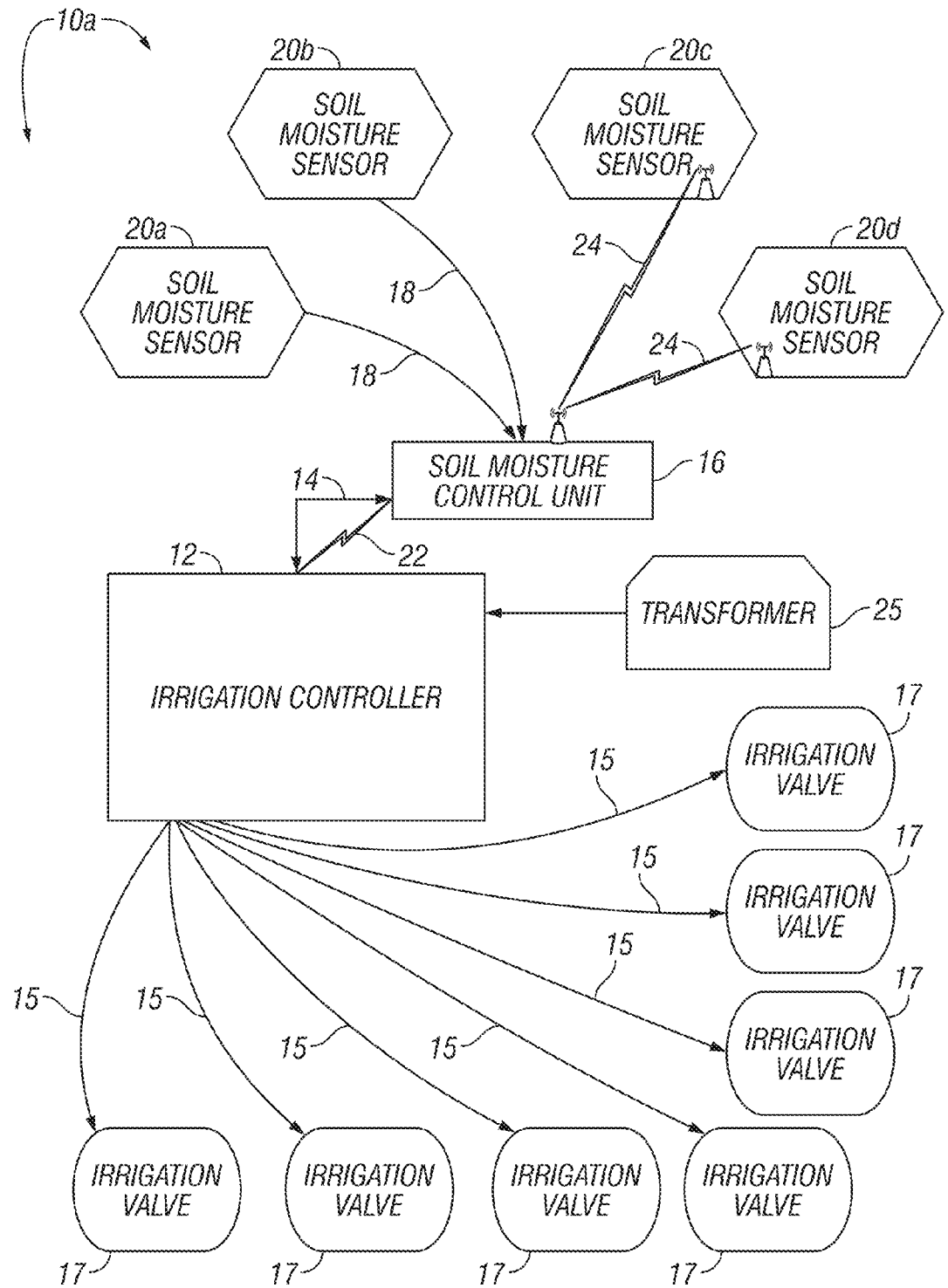
FIG. 1A is a simplified block diagram of an irrigation system in accordance with a first embodiment of the present invention using a stand alone irrigation controller, and a soil moisture sensor control unit with each soil moisture sensor communicating directly to the soil moisture control unit.

The entire disclosures of the following U.S. patents and U.S. patent applications are hereby incorporated by reference: U.S. Pat. No. 5,097,861 granted Mar. 24, 1992 of Hopkins et al. entitled IRRIGATION METHOD AND CONTROL SYSTEM; U.S. Pat. No. 5,444,611 granted Aug. 22, 1995 of Peter J. Woytowitz, et al. entitled LAWN AND GARDEN IRRIGATION CONTROLLER; U.S. Pat. No. 5,829,678 granted Nov. 3, 1998 of Richard E. Hunter et al. entitled SELF-CLEANING IRRIGATION REGULATOR VALVE APPARATUS; U.S. Pat. No. 6,088,621 granted Jul. 11, 2000 also of Peter J. Woytowitz et al. entitled PORTABLE APPARATUS FOR RAPID REPROGRAMMING OF IRRIGATION CONTROLLERS; U.S. Pat. No. 6,721,630 granted Apr. 13, 2004 also of Peter J. Woytowitz entitled EXPANDABLE IRRIGATION CONTROLLER WITH OPTIONAL HIGH-DENSITY STATION MODULE; U.S. Pat. No. 6,842,667 granted Jan. 11, 2005 of Beutler et al. entitled POSITIVE STATION MODULE LOCKING MECHANISM FOR EXPANDABLE IRRIGATION CONTROLLER; U.S. patent application Ser. No. 10/883,283 filed Jun. 30, 2004 also of Peter J. Woytowitz entitled HYBRID MODULAR/DECODER IRRIGATION CONTROLLER, now U.S. Pat. No. 7,069,115 granted Jun. 27, 2007; pending U.S. patent application Ser. No. 10/985,425 filed Nov. 9, 2004 also of Peter J. Woytowitz et al. and entitled EVAPOTRANSPIRATION UNIT CONNECTABLE TO IRRIGATION CONTROLLER; pending U.S. patent application Ser. No. 11/288,831 filed Nov. 29, 2005 of LaMonte D. Porter et al. and entitled EVAPOTRANSPIRATION UNIT FOR RE-PROGRAMMING AN IRRIGATION CONTROLLER; U.S. patent application Ser. No. 11/045,527 filed Jan. 28, 2005 also of Peter J. Woytowitz entitled DISTRIBUTED ARCHITECTURE IRRIGATION CONTROLLER, now U.S. Pat. No. 7,245,991 granted Jul. 17, 2007; U.S. Pat. No. 7,289,886 of Peter J. Woytowitz granted Oct. 30, 2007 entitled MODULAR IRRIGATION CONTROLLER WITH SEPARATE FIELD VALVE LINE WIRING TERMINALS; U.S. Pat. No. 7,225,058 of Lamonte D. Porter granted May 29, 2007 entitled MODULAR IRRIGATION CONTROLLER WITH INDIRECTLY POWERED STATION MODULES; pending U.S. patent application Ser. No. 11/458,551 filed Jul. 19, 2006 of Lamonte D. Porter et al. entitled IRRIGATION CONTROLLER WITH INTERCHANGEABLE CONTROL PANEL; pending U.S. patent application Ser. No. 12/042,301 filed Mar. 4, 2008 of Peter J. Woytowitz et al. entitled IRRIGATION CONTROLLER WITH SELECTABLE WATERING RESTRICTIONS; and pending U.S. patent application Ser. No. 12/181,894 filed Jul. 29, 2008 of Peter J. Woytowitz et al. entitled IRRIGATION SYSTEM WITH ET BASED SEASONAL WATERING ADJUSTMENT; PENDING U.S. patent application Ser. No. 12/243,897 filed Oct. 1, 2008 of LaMonte D. Porter et al. entitled LANDSCAPE CONTROLLER WITH CONTROL PANEL INSERTABLE FEATURE MODULE; and PENDING U.S. patent application Ser. No. 12/251,179 filed Oct. 14, 2008 of Peter J. Woytowitz et al. entitled IRRIGATION SYSTEM WITH SOIL MOISTURE BASED SEASONAL WATERING ADJUSTMENT. The aforementioned U.S. patents and applications are all assigned to Hunter Industries, Inc., the assignee of the subject application.

The present invention addresses the poor inner-operability between soil moisture sensors and conventional irrigation controllers as well as the ability for a moisture sensor control unit to automatically increase or decrease the programmed duration of the irrigation schedule. The irrigation system of the present invention has a familiar manner of entering, selecting and modifying its watering schedules, and either built-in or add-on capability to automatically modify its watering schedules based on soil moisture data in order to conserve water and effectively irrigate vegetation throughout the year as weather conditions vary. The user friendly irrigation system of the present invention is capable of saving a significant amount of water that can theoretically be conserved on a given irrigation site, but is still able to be used by most non-professionals because of the simplicity of the connections between the soil moisture sensor and the controller as well as the clear indication of when irrigation is or is not happening for the user. The moisture sensor indicates the level of moisture in the soil. The soil moisture control unit calculates the percentage of irrigation schedule that is required for the next irrigation cycle. The irrigation controller then calculates the watering requirements and controls the irrigation process.

The system of the present invention may take the form of a stand alone irrigation controller connected to a standalone soil moisture control unit that is connectable to one or more soil moisture sensors. Alternatively, the system may take the form of a stand alone irrigation controller with a removable soil moisture control module that is connectable to one or more soil moisture sensors. In yet another embodiment, the system may take the form of a standalone soil moisture based irrigation controller with all the components mounted in a single box-like housing that is connectable to one or more soil moisture sensors.

In accordance with one aspect of the present invention a soil moisture based irrigation system includes a stand alone irrigation controller with multiple seasonal adjust features and one or more soil moisture sensors. The soil moisture based irrigation system further includes a stand alone soil moisture control unit operatively connected to the irrigation controller and the soil moisture sensors. The soil moisture control unit includes programming configured to calculate one or more estimated soil moisture requirement values using signals from the soil moisture sensors, and to automatically modify individual watering programs of the irrigation controller through the seasonal adjust feature based on the estimated soil moisture requirement values to thereby conserve water while maintaining plant health.

In accordance with another aspect of the present invention a soil moisture based irrigation system includes an interface that enables a user to select and/or enter watering schedules and a memory for storing the watering schedules. The system further includes one or more sensors for generating signals representative of the soil moisture in individual irrigation zones. Each sensor may be assigned to one or more watering programs. A processor in the system that is capable of calculating one or more estimated soil moisture requirement values based at least in part on the signal from each soil moisture sensor. The system further includes a program executable by the processor to enable the processor to generate commands for selectively turning a plurality of valves ON and OFF in accordance with the watering schedules. The program includes seasonal a adjust feature that provides the capability for automatically modifying the watering schedules based on the estimated soil moisture requirement values to thereby conserve water while maintaining plant health.

The present invention also provides a unique method of controlling a plurality of valves on an irrigation site using soil moisture data. The method includes the step of calculating an estimated soil moisture requirement value based in part on signals from one or more soil moisture sensors associated with one or more watering programs. The method further includes the step of automatically modifying one or more watering programs based on the estimated soil moisture requirement values using a seasonal adjust algorithm to thereby conserve water while maintaining the health of plants on the irrigation site. Optionally, the method of the present invention may further include the step of inputting an overall watering adjustment for each soil moisture sensor and automatically modifying the watering program associated with that soil moisture sensor through the seasonal adjust algorithm for the associated watering program based on the estimated soil moisture value as increased or decreased by the inputted overall watering adjustment.

The present invention also provides a unique method of automatically establishing an initial watering schedule to control a plurality of valves on an irrigation site using soil moisture data. The method includes the step of assigning on or more master zones with each zone having a soil moisture sensor communicating to it. The method further includes the step of assigning associated zones to each master zone. The method further includes the step of starting the controllers' irrigation in an automatic programming mode. In the automatic programming mode, the controller runs the first master zone until the soil moisture sensor senses that the soil is moist. The controller then sets this time as the run time for the first master zone and calculates a run time for each associated zone assigned to it. The controller repeats this function for each of the remaining master zones. When each of the sensors sense that the zone associated with it is dry, the controller will set the delay time between watering value for that zone and begin irrigating according to the watering schedule.

Referring to FIG. 1A, in accordance with a first embodiment of the present invention, an irrigation system 10a comprises a stand alone irrigation controller 12 connected via cable 14 to a stand alone soil moisture control unit 16 that is in turn connected via buried multi-wire cables 18 to a plurality of soil moisture sensors 20a-20b. It will be understood that the many advantages of the present invention can be achieved with a single soil moisture sensor, however, multiple soil moisture sensors are preferred. FIG. 1A illustrates various means for communication between the soil moisture sensors 20a-d and the soil moisture sensor control unit 16. The controller 12, soil moisture unit 16 and one or more soil moisture sensors 20c and 20d exchange data and commands via wireless communication links 22 and 24.

The stand alone irrigation controller 12 (FIG. 1A) and soil moisture control unit 16 would typically be mounted in a garage or other protected location, although they can have a waterproof construction that allows them to be mounted out of doors. The soil moisture sensors 20a-d are typically mounted in the ground at places that represent the typical moisture content of the irrigated areas. The cables 14 and 18 typically include copper wires so that power can be supplied to the soil moisture control unit 16 and the soil moisture sensor 20 from the irrigation controller 12. Data and commands are sent on other copper wires in the cables. Fiber optic cables can also be utilized for sending data and commands. Optionally, the soil moisture sensors 20a-d may receive their power via battery when only the data is sent over the connecting wire 18 or the radio links 24.

A transformer 25 (FIG. 1A) that plugs into a standard household 110 volt AC duplex outlet supplies twenty-four volt AC power to the stand alone irrigation controller 12. In its preferred form, the irrigation system 10a employs a hard wired communication link 14 between the stand alone irrigation controller 12 and the stand alone soil moisture control unit 16 that are normally mounted adjacent one another, such as on a garage wall Hard wired communication links 18 are provided between the stand alone soil moisture control unit 16 and the soil moisture sensors 20a and 20b, and wireless communication links 24 are provided between the stand alone soil moisture control unit and the soil moisture sensors 20c and 20d. The stand alone soil moisture control unit 16 may be manufactured in a form factor that is small enough to fit inside the open space of the irrigation controller 12. One or more solenoid actuated irrigation valves 17 are connected to outputs of the stand alone irrigation controller using buried multi-wire cable 15 or other suitable wires.

Figure 1B:
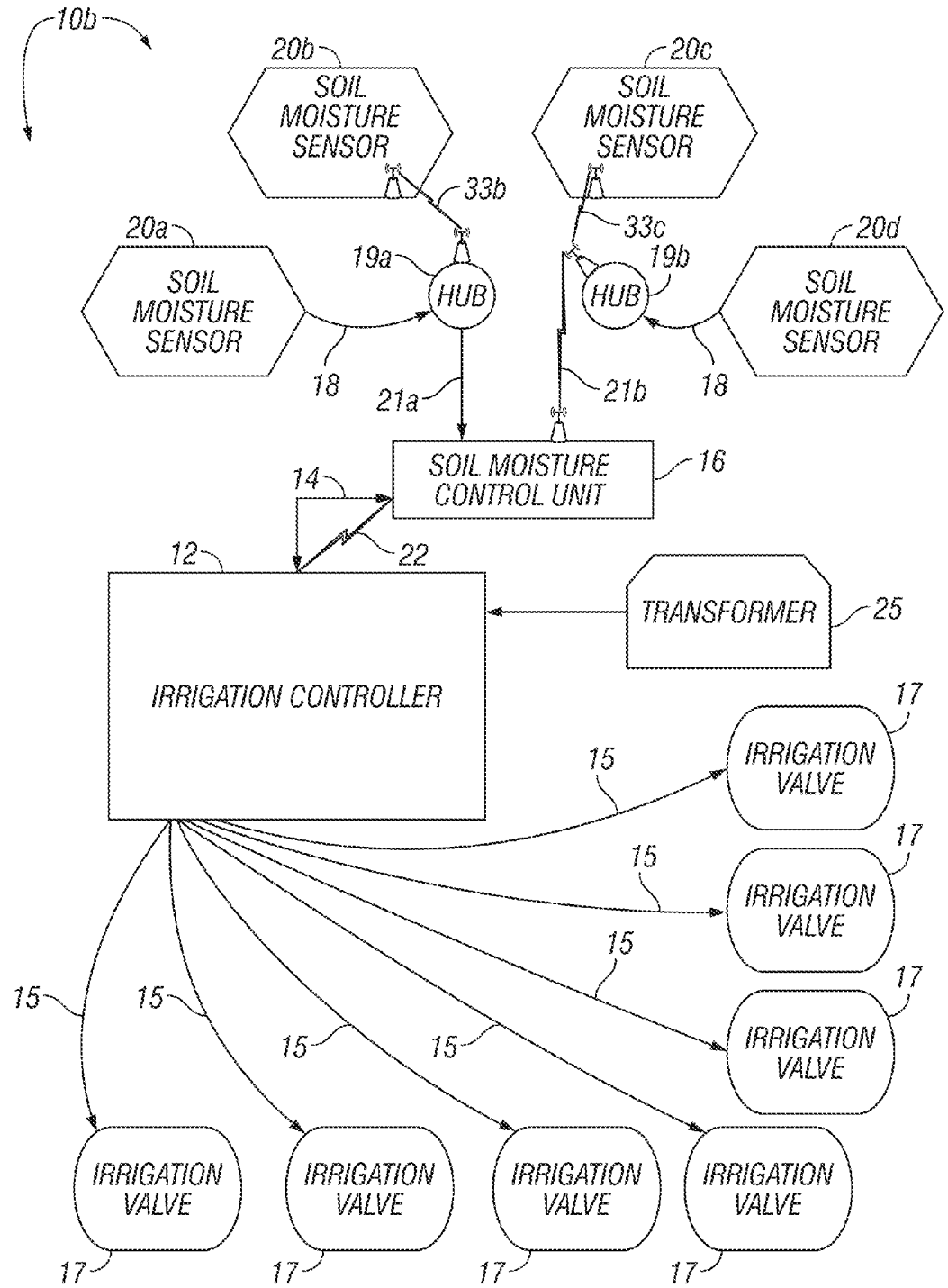
FIG. 1B is a simplified block diagram of an irrigation system in accordance with a second embodiment of the present invention using a stand alone irrigation controller, and a soil moisture sensor control unit with each soil moisture sensor communicating through a communication hub to the soil moisture control unit.

Referring to FIG. 1B, in accordance with an a second embodiment of the present invention, an irrigation system 10b comprises a stand alone irrigation controller 12 connected via cable 14 to a stand alone soil moisture control unit 16. This figure illustrates alternate means for communication to and from the soil moisture sensors 20a-d and the soil moisture sensor control unit 16 through communications hubs 19(a-b). Soil moisture control unit 16 is connected via cable 21a to a communications hub 19a. Communications hub 19a is connected to soil moisture sensor 20a using cable 18 and wireless connection 33b is used to communicate with soil moisture sensor 20b. Soil moisture sensors 20c and 20d communicate with communications hub 19b using wireless connection 33c and cable 18 respectively. Communications hub 19b communicates through wireless link 21b to the soil moisture control unit 16. The controller 12 and soil moisture control unit 16 would typically be mounted in a garage or other protected location, although they can have a waterproof construction that allows them to be mounted out of doors. The soil moisture sensors 20a-d are typically mounted in the ground at places that represent the typical moisture content of the irrigated areas. The cables 14, 18 and 21a typically include copper wires so that power can be supplied to the soil moisture control unit 16, communications hub 19a, and the soil moisture sensor 20a from the irrigation controller 12. Data and commands are sent on other copper wires in the cables. Fiber optic cables can also be utilized for sending data and commands. Alternately, these same devices may be powered by one or more batteries (not illustrated).

Soil moisture sensors 20b and 20c (FIG. 1B) and wireless communications hub 19b may be powered by batteries (not illustrated), or other power source, as they utilize wireless communications. A transformer 25 that plugs into a standard household 110 volt AC duplex outlet supplies twenty-four volt AC power to the stand alone irrigation controller 12. In its preferred form, the irrigation system 10b employs a hard wired communication link 14, between the stand alone irrigation controller 12 and the stand alone soil moisture control unit 16 that are normally mounted adjacent one another, such as on a garage wall, and a hard wired communication link 21a between the stand alone soil moisture control unit 16 and the communications hub 19a. Hard wired communications 18 or wireless communication links 33b-c provides communication channels to the soil moisture sensors 20a-d to the communication hubs 19a and 19b. Hardwire communications cable 21a or wireless communication link 21b provides communication channels to the communication hubs 19a and 19b respectively. The soil moisture control unit 16 may be manufactured small enough to fit inside the open space of the irrigation controller 12. Irrigation valves 17 are connected to the output of the irrigation controller using wires 15.

Figure 1C:
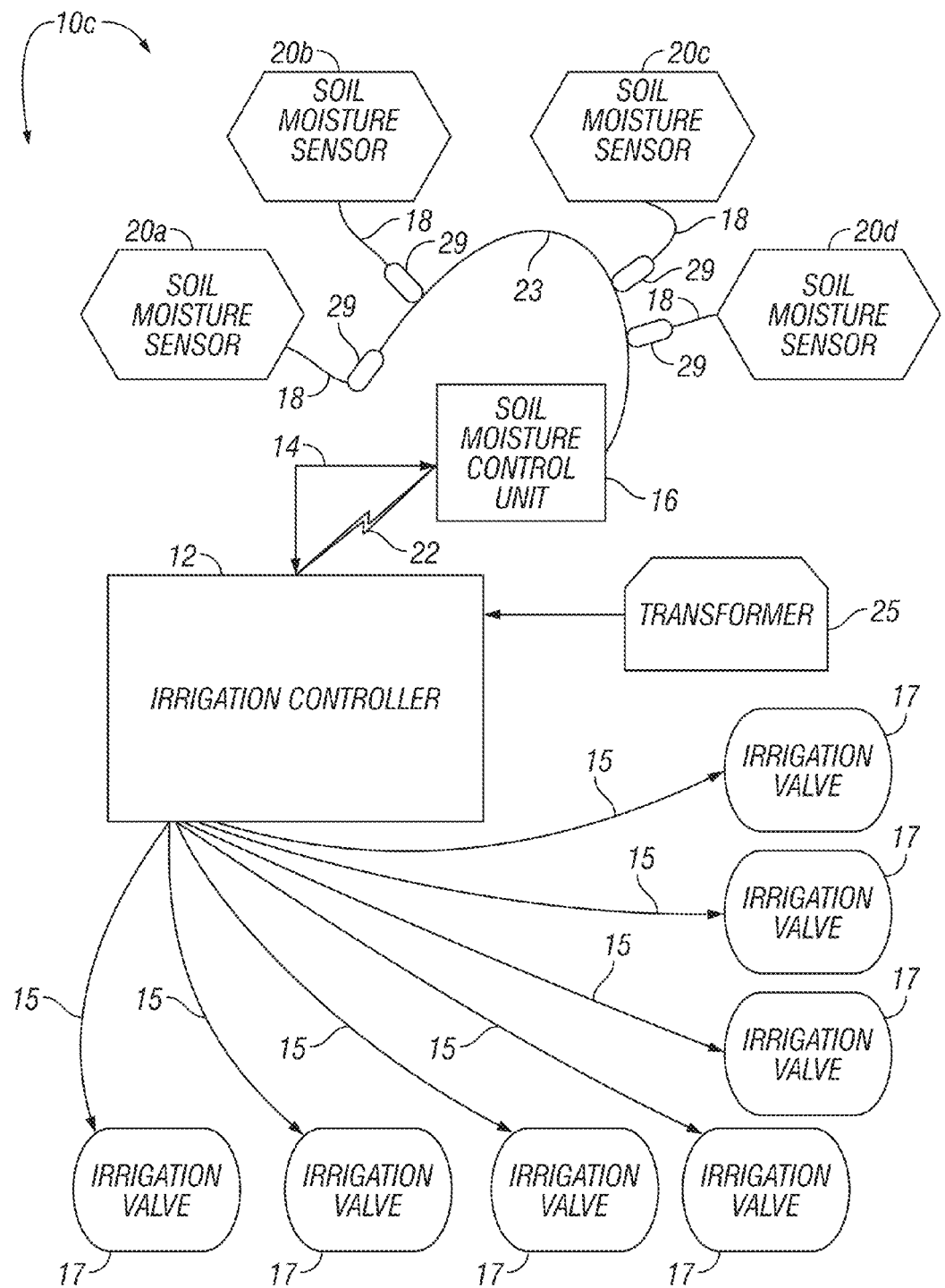
FIG. 1C is a simplified block diagram of an irrigation system in accordance with a third embodiment of the present invention using a stand alone irrigation controller, and a soil moisture sensor control unit with each soil moisture sensor communicating to the soil moisture control unit through a multiwire cable using encoder and decoder circuitry.

Referring to FIG. 1C, in accordance with a third embodiment of the present invention, an irrigation system 10c comprises a standalone irrigation controller 12 connected via cable 14 to a standalone soil moisture control unit 16 that is in turn connected via a multi wire cable 23 to one or more decoder modules 24. Each soil moisture sensor 20a-d is connected to a decoder module 29 via sensor wiring 18. Optionally, the decoder module 29 may be built into the housings of the soil moisture sensors 20a-d to allow connection directly to cable 23. The controller 12 and soil moisture control unit 16 would typically be mounted in a garage or other protected location, although they can have a waterproof construction that allows them to be mounted out of doors.

In the third embodiment 10c the soil moisture sensors 20a-d are typically mounted in the ground at places that represent the typical moisture content of the irrigated areas. The cables 14 and 18 typically include copper wires so that power can be supplied to the soil moisture control unit 16 and the soil moisture sensor 20 from the irrigation controller 12. Data and commands may be sent on the same power wires, or on other copper wires in the cables. Fiber optic cables can also be utilized for sending data and commands. The multi conductor cable 23 connects to any one of a multiple number of decoder modules 29. The decoder modules each have an individual address assigned to them. Any data transmitted by the cable 23 includes and address message packet in the communications that identify which sensor the data is coming from or being sent to. This allows for many sensors to be installed over a large are using only a single two or three wire cable 23, thus potentially saving thousands of feet of wire and the related labor to install it. A transformer 25 that plugs into a standard household 110 volt AC duplex outlet supplies twenty-four volt AC power to the stand alone irrigation controller 12.

In its preferred form, the irrigation system 10c (FIG. 1C) employs a hard wired communication link 14 between the stand alone irrigation controller 12 and the stand alone soil moisture control unit 16 that are normally mounted adjacent one another, such as on a garage wall, and hard wired decoder system consisting of wire cable 23 and decoder modules 24 between the stand alone soil moisture control unit 16 and the soil moisture sensors 20a-d. The soil moisture control unit 16 may be manufactured small enough to fit inside the open space of the irrigation controller 12. One or more irrigation valves 17 are connected to the output of the irrigation controller using multi wire cable 15 or other suitable individual wires.

Figure 1D:
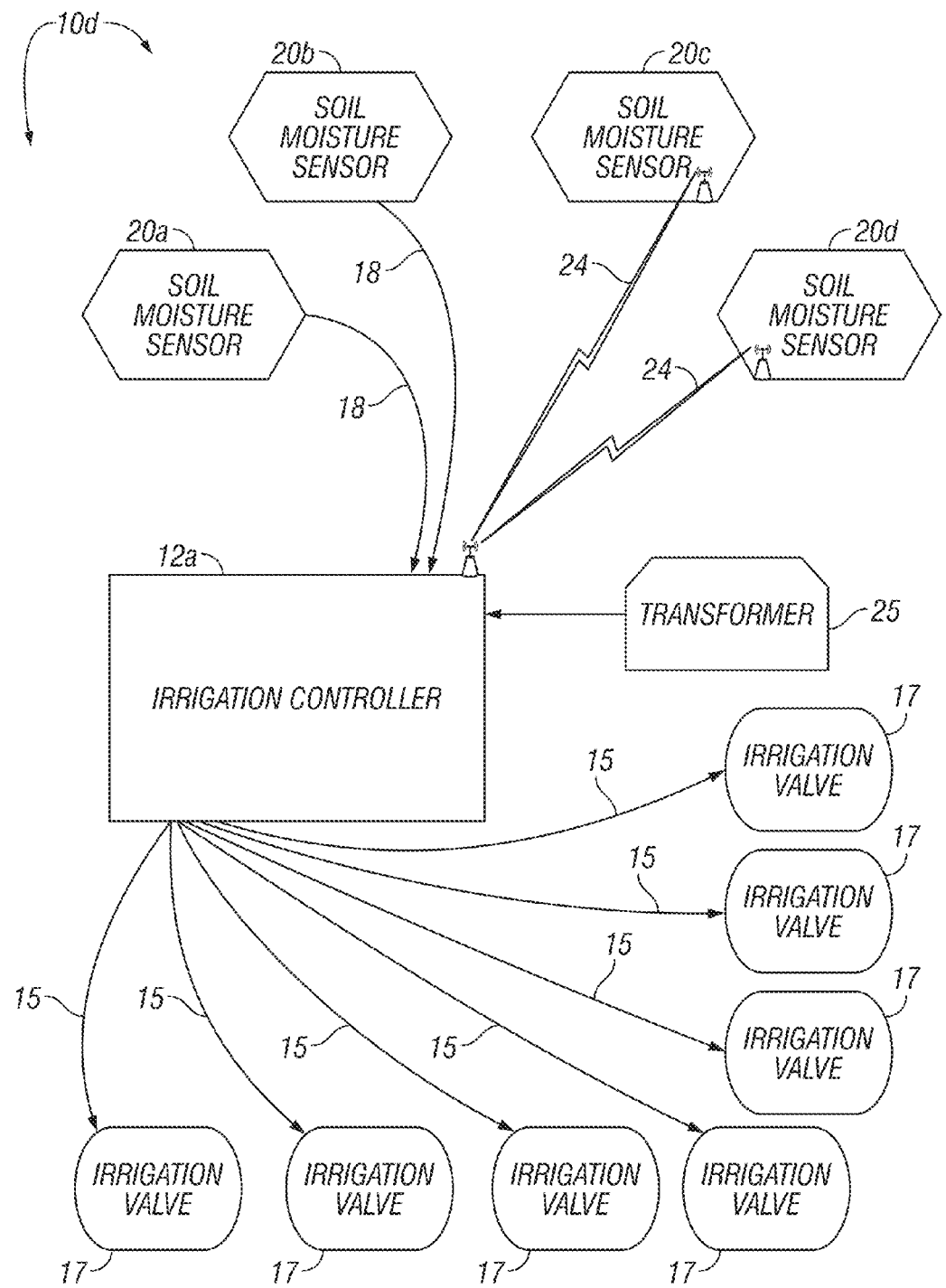
FIG. 1D is a simplified block diagram of an irrigation system in accordance with a fourth embodiment of the present invention using a stand alone irrigation controller with integrated soil moisture control capabilities with each soil moisture sensor communicating directly to the irrigation controller.

Referring to FIG. 1D, in accordance with a fourth embodiment 10d of the present invention, a modified stand alone irrigation controller 12a internally contains similar electronics and logic and/or firmware similar to that of the stand alone controller 12 and the stand alone soil moisture control unit 16 of FIG. 1A. FIG. 1D illustrated multiple means for communications to and from the soil moisture sensors 20a-d and the stand alone irrigation controller 12a. The stand alone irrigation controller 12a is in connected via multi-wire cables 18 to one or more soil moisture sensors 20a-b. The stand alone irrigation controller 12a and one or more soil moisture sensors 20c and 20d may exchange data and commands via wireless communication links 24. The stand alone irrigation controller 12a and would typically be mounted in a garage or other protected location, although it can have a waterproof construction that allows it to be mounted out of doors.

In the embodiment 10d (FIG. 1D) the soil moisture sensors 20a-d are typically mounted in the ground at places that represent the typical moisture content of the irrigated areas. The cables 18 typically include copper wires so that power can be supplied to the soil moisture sensors 20a-b from the stand alone irrigation controller 12a. Data and commands may be sent on the same power wires or on other copper wires in the cables. Fiber optic cables can also be utilized for sending data and commands. Optionally, the soil moisture sensors 20a-d may receive power via a battery where only the data is sent over the connecting wires 18 or the radio links 24. A transformer 25 that plugs into a standard household 110 volt AC duplex outlet supplies twenty-four volt AC power to the stand alone irrigation controller 12a. In its preferred form, the irrigation system 10d employs the irrigation controller 12a and hard wired communication links 18a-18b between the irrigation controller 12a and the soil moisture sensors 20a-20b, or by wireless communication links 24 of soil moisture sensors 20c and 20d. The stand irrigation controller 12a may be "purpose built" to work with soil moisture sensors 20a-d or it may be manufactured as a more generic irrigation controller that is designed to accept a plug-in module that adapts it to work with soil moisture sensors 20a-d. One or more irrigation valves 17 are connected to the output of the irrigation controller using multi wire cable 15 or other suitable individual wires.

Figure 1E:
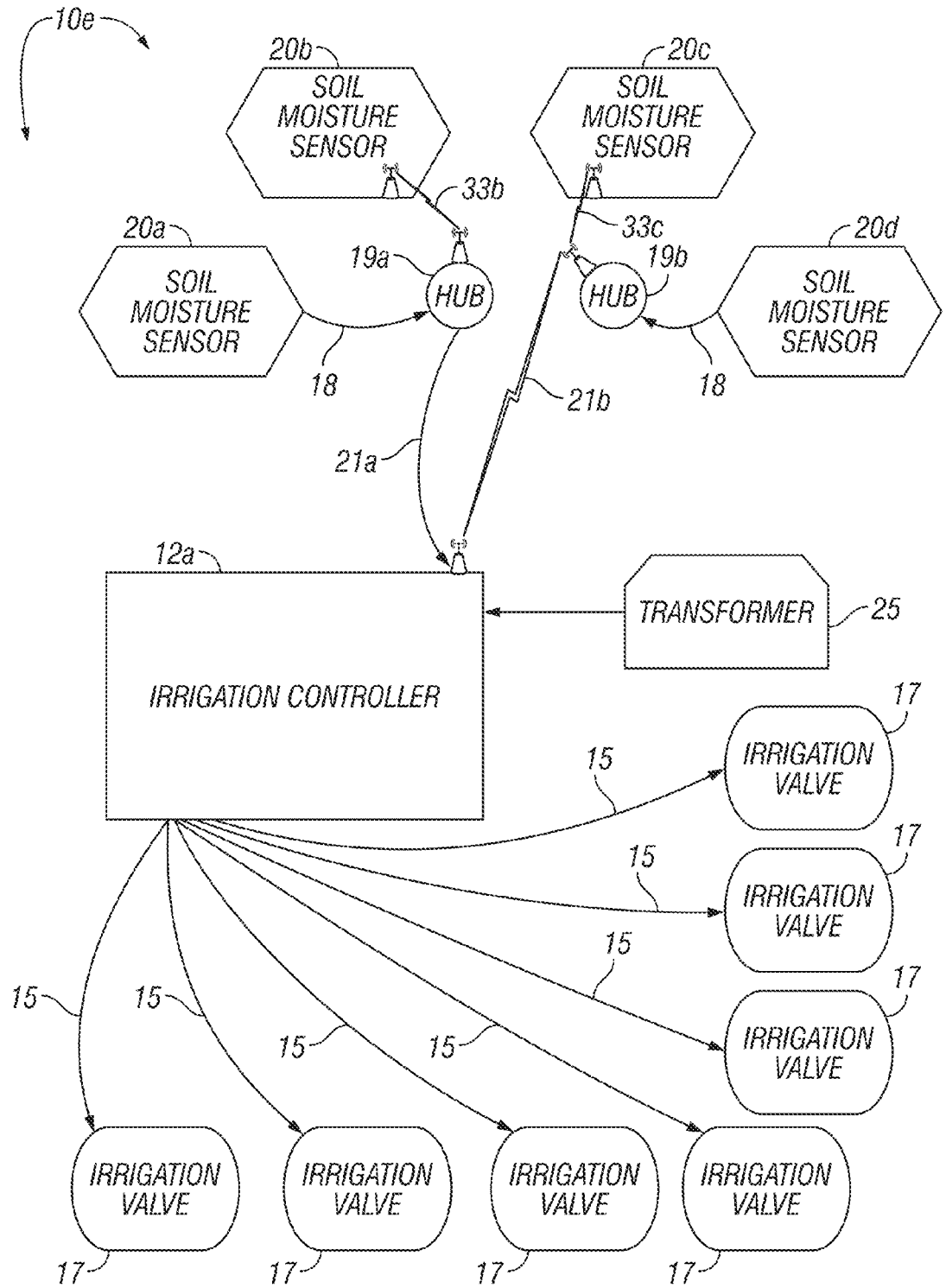
FIG. 1E is a simplified block diagram of an irrigation system in accordance with a fifth embodiment of the present invention using a stand alone irrigation controller with integrated soil moisture control capabilities with each soil moisture sensor communicating with the irrigation controller through a multiwire cable.

Referring to FIG. 1E, in accordance with a fifth embodiment 10e of the present invention, a standalone irrigation controller 12a internally contains electronics and logic and/or firmware similar to that of the standalone controller 12 of FIG. 1A and the attached soil moisture control unit 16 of FIG. 1A. FIG. 1E illustrates multiple means for communication to and from the soil moisture sensors 20a-d and the irrigation controller 12a through communications hubs 19a-b. The irrigation controller 12a is connected via cable 21a to a communications hub 19a. Communications hub 19a is connected to soil moisture sensor 20a using cable 18a and wireless connection 33b is used to communicate with soil moisture sensor 20b. Soil moisture sensors 20c and 20d communicate with wireless communications hub 19b using wireless connection 33c and cable 18d respectively. Communications hub 19b communicates through wireless link 21b to the soil moisture controller 12a.

In the system 10e (FIG. 1E) the controller 12a would typically be mounted in a garage or other protected location, although it can have a waterproof construction that allows it to be mounted out of doors. The soil moisture sensors 20a-d are typically mounted in the ground at places that represent the typical moisture content of the irrigated areas. The cables 18 and 21a typically include copper wires so that power can be supplied to the communications hub 19a and the soil moisture sensor 20a from the irrigation controller 12a. Data and commands may be sent on other copper wires in the cables. Fiber optic cables can also be utilized for sending data and commands. Alternately, these same devices may be powered by one or more batteries (not shown). Soil moisture sensors 20b and 20c and wireless communications hub 19b may be powered by batteries (not shown), or another power source, as they utilize wireless communications. A transformer 25 that plugs into a standard household 110 volt AC duplex outlet supplies twenty-four volt AC power to the stand alone irrigation controller 12a.

In its preferred form, the irrigation system 10e (FIG. 1E) employs hard wired communications 18 or wireless communication links 33b-c between the soil moisture sensors 20(a-d) and the communication hubs 19a and 19b. Hardwire communications cable 21a or wireless communication link 21b provides communication channels between the communication hubs 19a and 19b respectively and the irrigation controller 12a. Irrigation valves 17 are connected to the output of the irrigation controller 12 using wires 15.

Figure 1F:
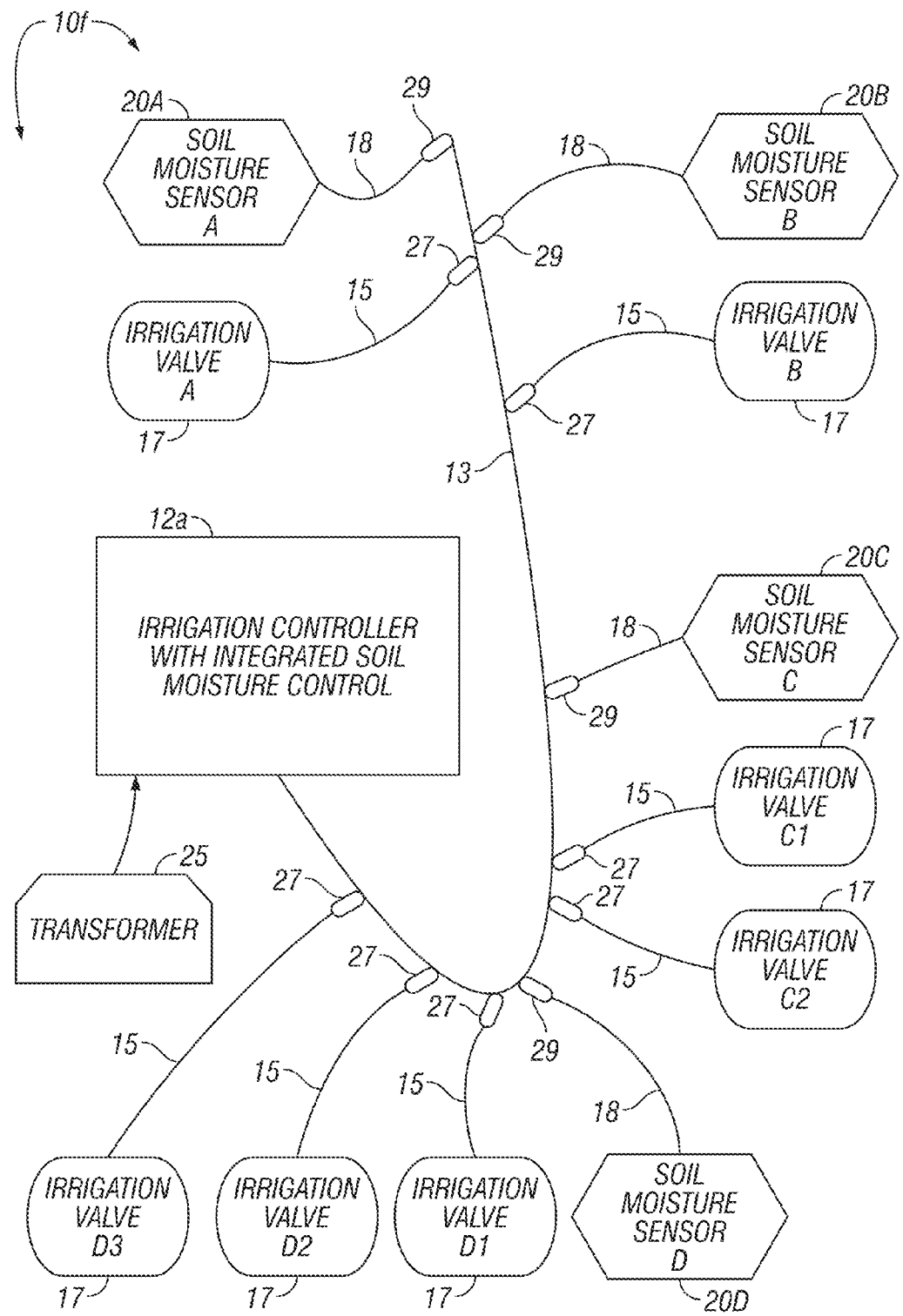
FIG. 1F is a simplified block diagram of an irrigation system in accordance with a sixth embodiment of the present invention using an irrigation controller with integrated soil moisture control capabilities with each soil moisture sensor and valve communicating with the irrigation controller through a multiwire cable using encoder and decoder circuitry.

Referring to FIG. 1F, in accordance with a sixth embodiment 10f of the present invention, a standalone irrigation controller 12a internally contains electronics and logic and/or firmware similar to that of the standalone controller 12 of FIG. 1A and the attached soil moisture control unit 16 of FIG. 1A. In this case, controller 12 is designed to communicate to all of the peripheral devices using encoder and decoder technology. The irrigation controller 12a is connected via cable 13 to a variety of decoder modules 27 and 29. Decoder modules 27 are designed to provide power to turn on control valves when the irrigation controller sends the appropriate command. Decoder modules 29 are designed to communicate two ways and provide the communication channel between the soil moisture sensors 20a-d and the irrigation controller 12a. Decoder modules 29 are connected to the soil moisture sensors 20 via using cable 18a. Optionally, the decoder module 29 may be built into the housings of sensors 20a-d to allow connection directly to cable 13.

The decoder modules 27 and 29 (FIG. 1F) each have an individual address assigned to them. Any data transmitted by the cable 13 includes an address message packet in the communications that identify which sensor or valve the data is coming from or being sent to. This allows for many sensors and many valves to be installed over a large are using only a single two or three wire cable 13, thus potentially saving thousands of feet of wire and the related labor to install it. The controller 12a would typically be mounted in a garage or other protected location, although it can have a waterproof construction that allows it to be mounted out of doors. The soil moisture sensors 20a-d are typically mounted in the ground at places that represent the typical moisture content of the irrigated areas. The cables 18 typically include copper wires so that power can be supplied to the soil moisture sensors 20a-d from the irrigation controller 12a. Data and commands may be sent on the power wires or on other copper wires in the cables. Alternately, these same devices may be powered by one or more batteries (not illustrated). A transformer 25 that plugs into a standard household 110 volt AC duplex outlet supplies twenty-four volt AC power to the stand alone irrigation controller 12a.

In its preferred form, the irrigation system 10f of FIG. 1F employs hard wired decoder communications cable 13 which is connected to decoder modules 27 and 29. Irrigation valves are connected to decoder modules 27 using cables 15. Soil moisture sensors are connected to the decoder modules 29 using cables 18.

Figure 1G:
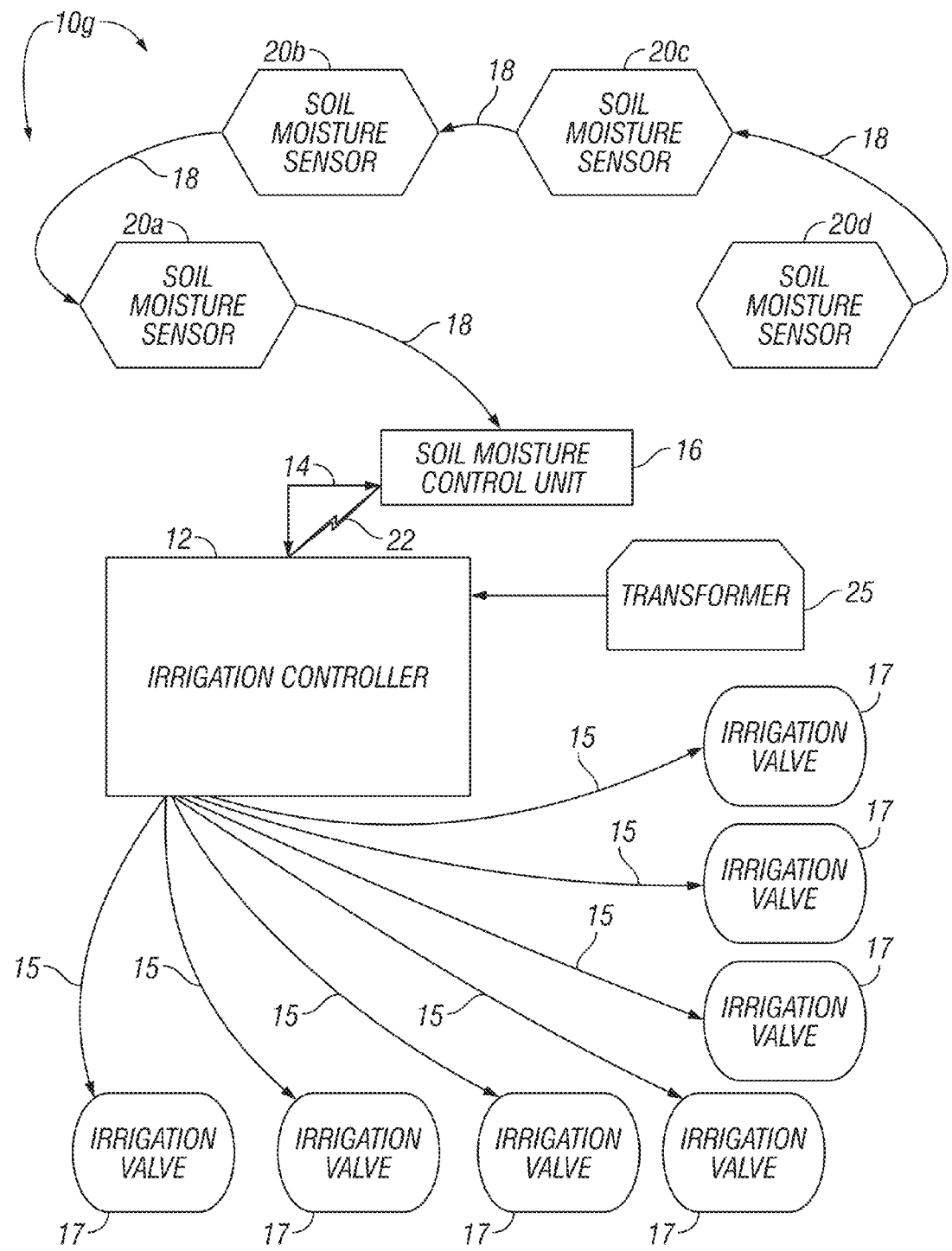
FIG. 1G is a simplified block diagram of an irrigation system in accordance with a seventh embodiment of the present invention using a stand alone irrigation controller, and a soil moisture sensor control unit with one sensor communicating directly to the soil moisture control unit and each following soil moisture sensors communicating through the soil moisture sensor ahead of it in a daisy chain fashion.

Referring to FIG. 1G, in accordance with a seventh embodiment 10g of the present invention, a standalone irrigation controller 12 is connected via cable 14 to a standalone soil moisture control unit 16 that is in turn connected via multi wire cables 18 to one or more soil moisture sensors 20a-20d. This figure illustrates a daisy chain connection configuration for the soil moisture sensors 20a-20d that allows for communications to and from the soil moisture sensors 20a-d and the soil moisture sensor control unit 16. The stand alone irrigation controller 12 and stand alone soil moisture control unit 16 would typically be mounted in a garage or other protected location, although they can have a waterproof construction that allows them to be mounted out of doors. The soil moisture sensors 20a-d are typically mounted in the ground at places that represent the typical moisture content of the irrigated areas. The cables 14 and 18 typically include copper wires so that power can be supplied to the soil moisture control unit 16 and the soil moisture sensor 20 from the irrigation controller 12. Data and commands are sent on other copper wires in the cables. Fiber optic cables can also be utilized for sending data and commands. Optionally, the soil moisture sensor 20 may receive its power via a battery where only the data is sent over the connecting wire 18. A transformer 25 that plugs into a standard household 110 volt AC duplex outlet supplies twenty-four volt AC power to the stand alone irrigation controller 12.

In its preferred form, the irrigation system 10g (FIG. 1G) employs a hard wired communication link 14 between the stand alone irrigation controller 12 and the stand alone soil moisture control unit 16 that are normally mounted adjacent one another, such as on a garage wall, and hard wired communication link 18 between the stand alone soil moisture control unit 16 and the soil moisture sensor 20a. Subsequent soil moisture sensors are connected in a daisy chain fashion to the next sensor ahead of it. The soil moisture control unit 16 may be manufactured small enough to fit inside the open space of the irrigation controller 12. One or more irrigation valves 17 are connected to the output of the irrigation controller using multi wire cable 15 or other suitable individual wires.

Figure 1H:
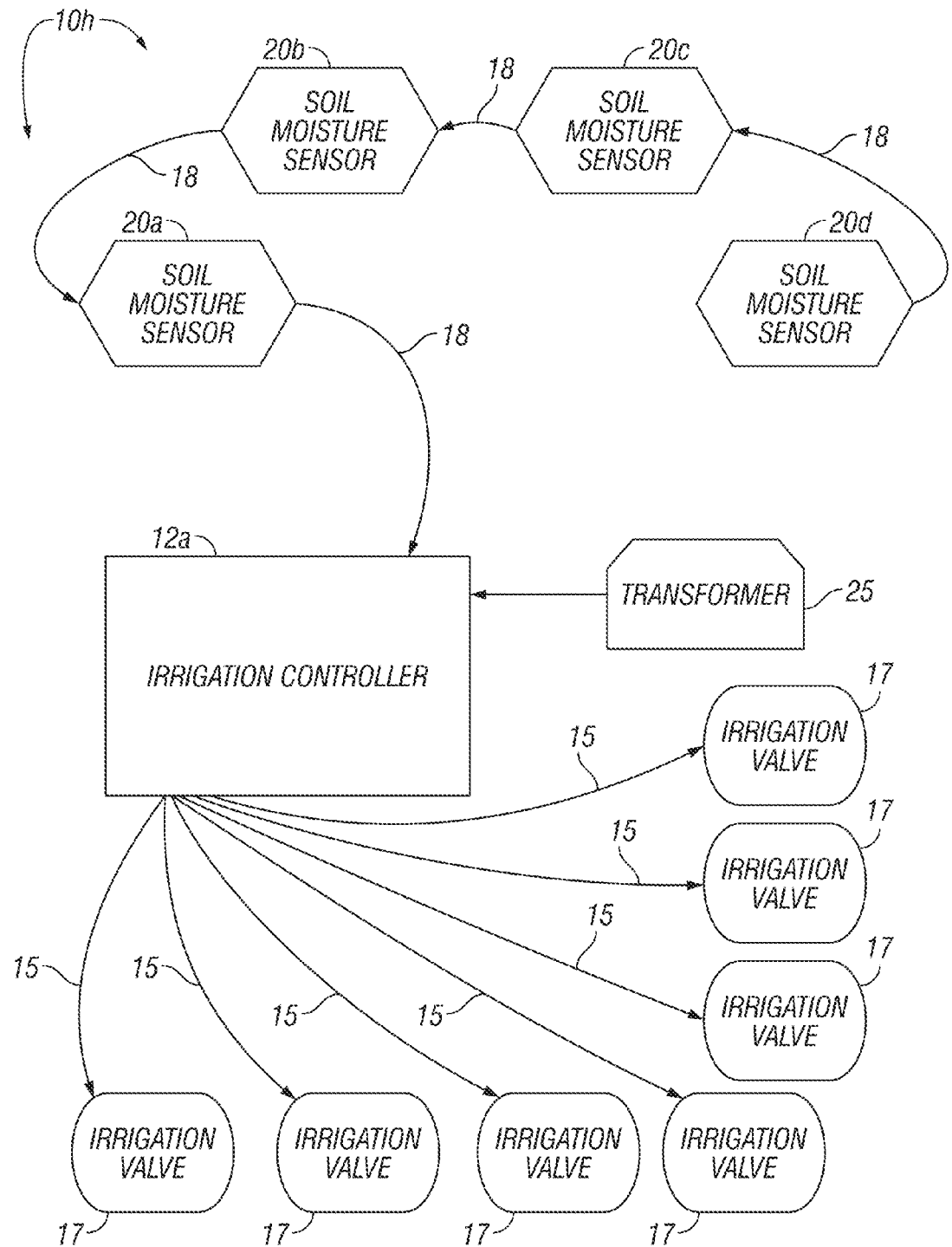
FIG. 1H is a simplified block diagram of an irrigation system in accordance with an eighth embodiment of the present invention using an irrigation controller with integrated soil moisture control capabilities having one soil moisture sensor communicating directly to the irrigation controller, and each of the following soil moisture sensors communicating through the soil moisture sensor ahead of it in a daisy chain fashion.

Referring to FIG. 1H, in accordance with an eighth embodiment 10h of the present invention, a stand alone irrigation controller 12a internally contains electronics and logic and/or firmware similar to that of the standalone controller 12 of FIG. 1A and the attached soil moisture control unit 16 of FIG. 1A. This figure illustrates a daisy chain communications scheme to and from the soil moisture sensors 20a-d and the irrigation controller 12a. The irrigation controller 12a is connected via multi-wire cables 18 to soil moisture sensors 20a. Subsequent soil moisture sensors are connected in a daisy chain fashion to the next soil moisture sensor ahead of it. The controller 12a would typically be mounted in a garage or other protected location, although it can have a waterproof construction that allows it to be mounted out of doors. The soil moisture sensors 20a-d are typically mounted in the ground at places that represent the typical moisture content of the irrigated areas. The cables 18 typically include copper wires so that power can be supplied to the soil moisture sensors 20a-b from the irrigation controller 12a. Data and commands may be sent on the same power wires or on other copper wires in the cables. Fiber optic cables can also be utilized for sending data and commands. Optionally, the soil moisture sensors 20a-d may receive power via a battery where only the data is sent over the connecting wires 18. A transformer 25 that plugs into a standard household 110 volt AC duplex outlet supplies twenty-four volt AC power to the stand alone irrigation controller 12a.

In its preferred form, the irrigation system 10h (FIG. 1H) employs an irrigation controller 12a and hard wired communication links 18 between the irrigation controller 12a and the soil moisture sensors 20a. Subsequent soil moisture sensors are connected in a daisy chain fashion to the next sensor ahead of it. The irrigation controller 12a may be purpose built to work with soil moisture sensors 20a-d or it may be manufactured as a more generic irrigation controller that is designed to accept a plug-in module that adapts it to work with soil moisture sensors 20a-d. One or more irrigation valves 17 are connected to the output of the irrigation controller using multi wire cable 15 or other suitable individual wires.

In each of the FIGS. 1A, 1B, 1C and 1G, the hard wired connection 14 may be replaced by a wireless connection 22 and the soil moisture control unit 16 may receive its power from an alternative source, including a different 24 volt AC power supply or one or more batteries.

Figure 2:
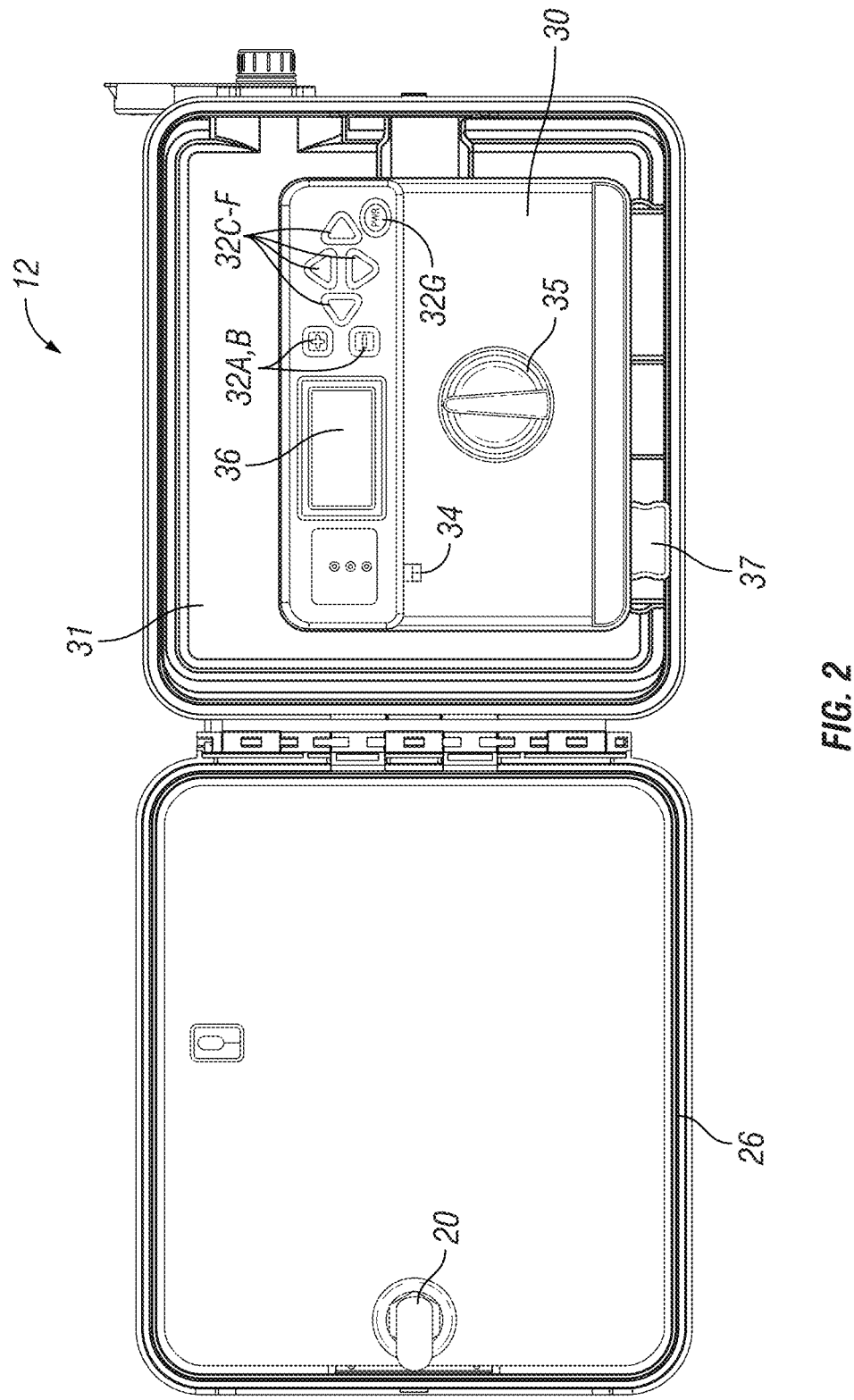
FIG. 2 is a front elevation view of the stand alone irrigation controller of the system of any of FIGS. 1A-1H with its front door open to reveal its removable face pack.
Figure 3:
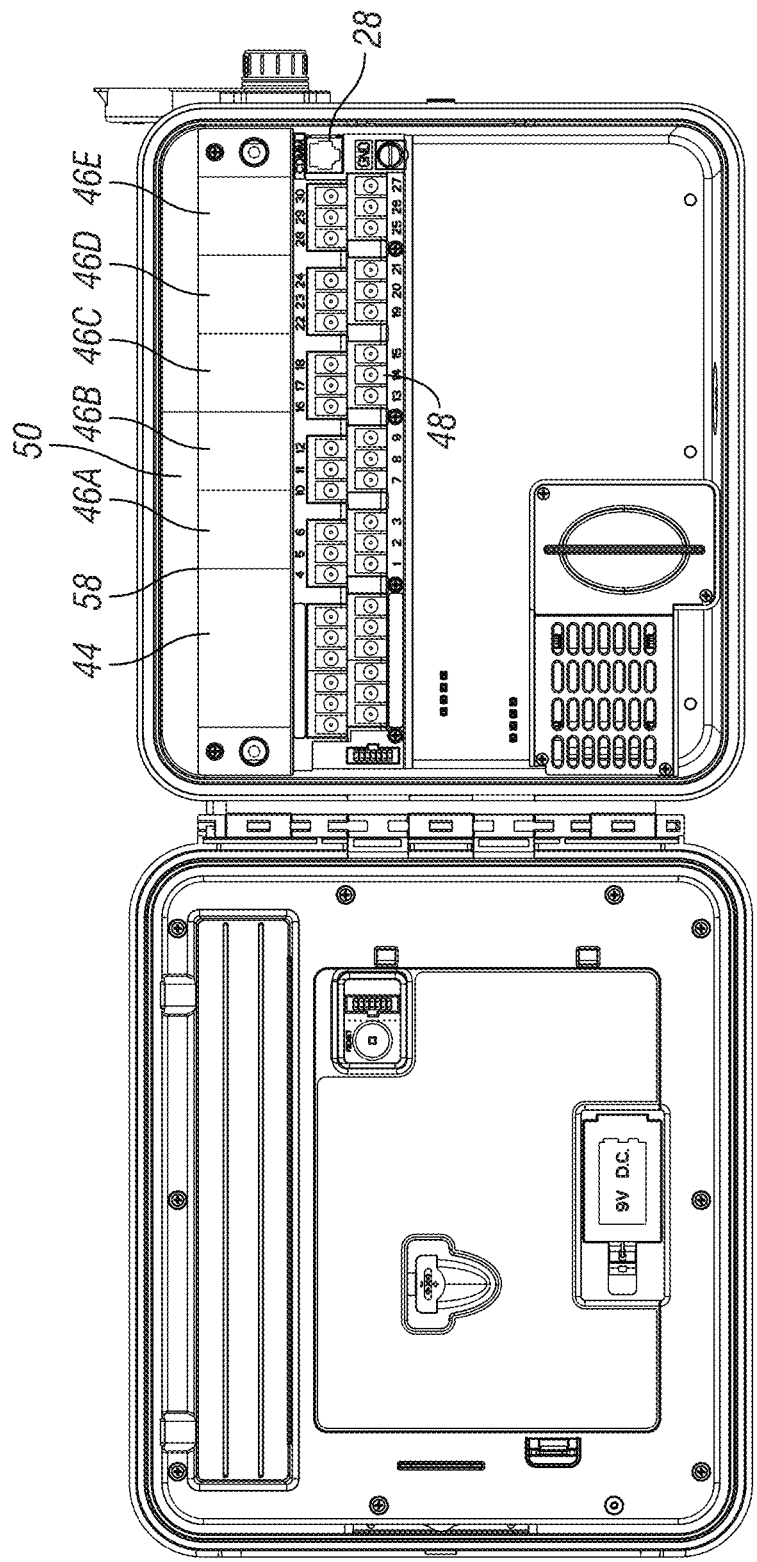
FIG. 3 is an enlarged perspective view of the back panel of the stand alone irrigation controller of FIG. 2 illustrating one base module and five station modules plugged into their respective receptacles in the back panel.

Referring to FIG. 2, the stand alone irrigation controller 12 includes a wall-mountable plastic housing structure in the form of a generally box-shaped front door 26 hinged along one vertical edge to a generally box-shaped back panel 28 (FIG. 3). A generally rectangular face pack 30 (FIG. 2) is removably mounted to the hinged cover plate 31 which covers the back panel 28 and is normally concealed by the front door 26 when not being accessed for programming. The face pack 30 has an interface in the form of a plurality of manually actuable controls including a rotary knob switch 35 and push button switches 32a-32g as well as slide switch 34 which serves as a sensor by-pass switch. One or more programs and their associated watering schedules consisting of various run and cycle times can be entered by the user by manipulating the rotary knob switch 35 and selected ones of the push button switches 32a-32g in conjunction with observing numbers, words and/or graphic symbols indicated on a liquid crystal display (LCD) 36. Push buttons 32c and 32d are used to increase or decrease the seasonal adjust value. The watering schedules can be a complicated set of run time and cycle algorithms, or a portion thereof, such as a simple five minute cycle for a single station. Alternatively, existing pre-programmed watering schedules can be selected, such as selected zones every other day. An optional features card 37 that modifies the programming features to the user is installed in face pack 30. Any or sub-combination of manually actuable input devices such as rotary switches, dials, push buttons, slide switches, rocker switches, toggle switches, membrane switches, track balls, conventional screens, touch screens, etc. may be used to provide an interface that enables a user to select and/or enter a watering schedule. Still another alternative involves uploading watering schedules through the SMARTPORT (Trademark) feature of the irrigation controller 12, more details of which are set forth in the aforementioned U.S. Pat. No. 6,088,621.

Figure 4:
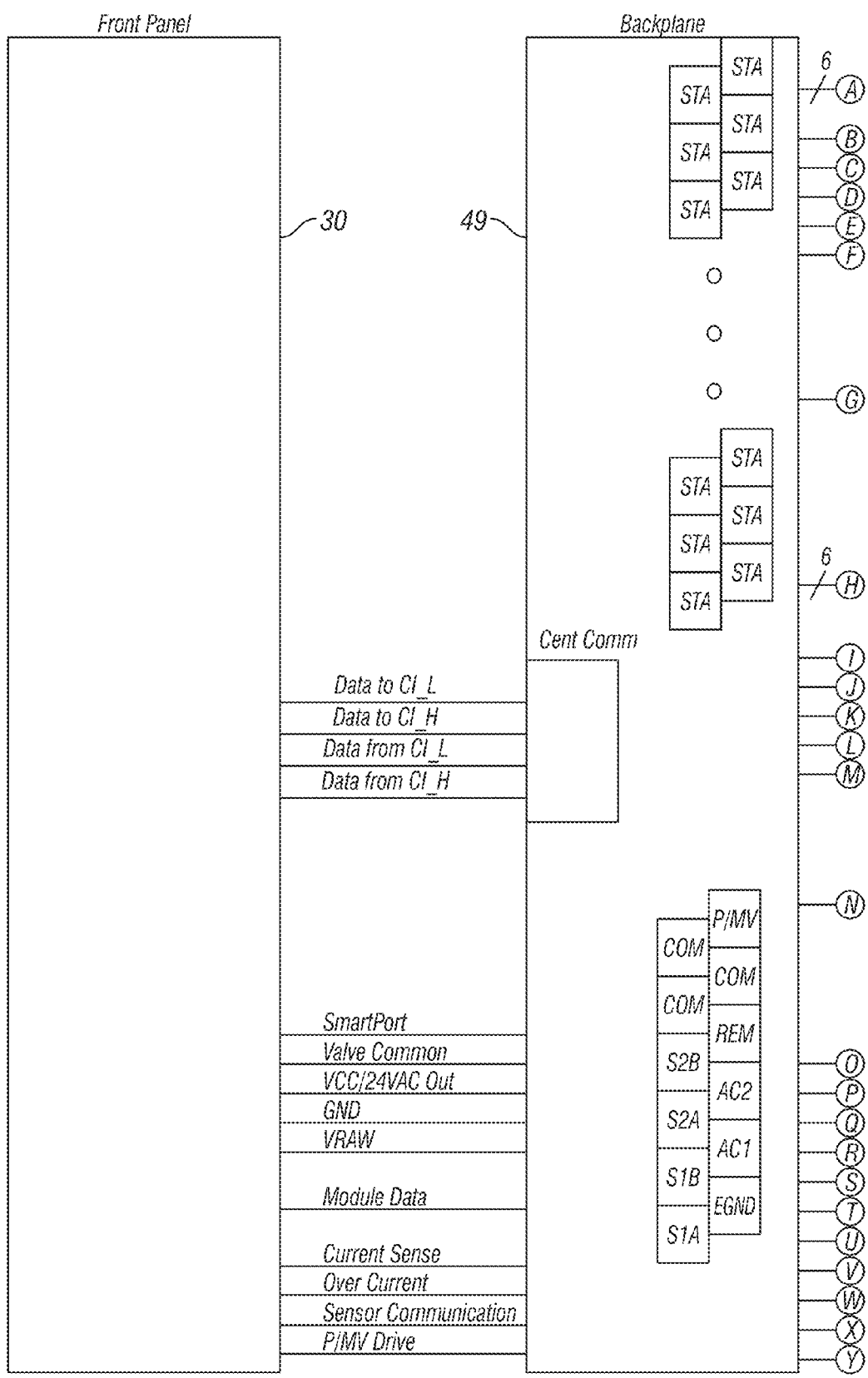
FIG. 4 is a block diagram of the electronic portion of the stand alone irrigation controller of FIG. 2 with two output modules.
Figure 4:
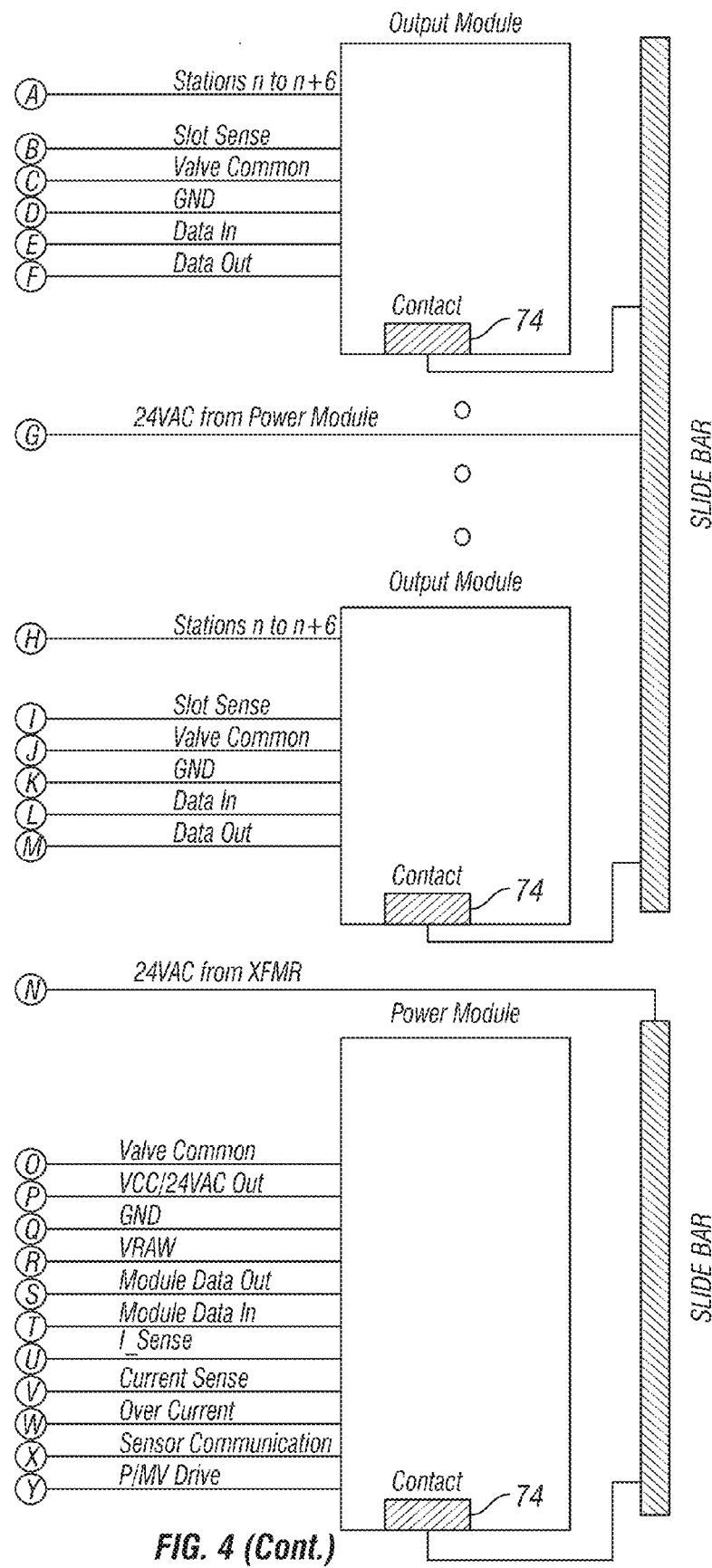

The face pack 30 (FIG. 2) encloses and supports a printed circuit board (not illustrated) with a processor for executing and implementing a stored watering program. An electrical connection is made between the face pack 30 and the components in the back panel 28 through a detachable ribbon cable including a plurality of conductors 38a-g (FIG. 4). The circuitry inside the face pack 30 can be powered by a battery to allow a person to remove the face pack 30, un-plug the ribbon cable, and walk around the lawn, garden area or golf course while entering watering schedules or altering pre-existing watering schedules.

A processor 40 (FIG. 5) is mounted on the printed circuit board inside the face pack 30. A watering program stored in a memory 42 is executable by the processor 40 to enable the processor to generate commands for selectively turning a plurality of solenoid actuated irrigation valves (not illustrated) ON and OFF in accordance with the selected or entered watering schedule. An example of such an irrigation valve is disclosed in U.S. Pat. No. 5,996,608 granted Dec. 7, 1999 of Richard E. Hunter et al. entitled DIAPHRAGM VALVE WITH FILTER SCREEN AND MOVEABLE WIPER ELEMENT, the entire disclosure of which is hereby incorporated by reference. Said patent is also assigned to Hunter Industries, Inc. Typically the solenoid actuated valves are mounted in subterranean plastic boxes (not illustrated) on the irrigated site.

The processor 40 communicates with removable modules 44 and 46a-c (FIG. 3) each containing a circuit that includes a plurality of solid state switches, such as triacs. These switches turn twenty-four volt AC current ON and OFF to open and close corresponding solenoid actuated valves via connected to dedicated field valve wires and a common return line to screw terminals 48 on the modules 44 and 46a-c.

In FIG. 3, the modules 44 and 46 are shown installed in side-by-side fashion in station module receptacles formed in the back panel 28. The module 44 serves as a base module that can turn a master valve ON and OFF in addition to a plurality of separate station valves. Each module includes an outer generally rectangular plastic housing with a slot at its forward end. A small printed circuit board (not illustrated) within the module housing supports the station module circuit that includes conductive traces that lead to the electrical connectors. Electrical plugs that communicate with the processor 40 and the screw terminals 48 are accessible via the slot in the forward end of the module housing. These electrical plugs register with corresponding electrical sockets on the topside of a relatively large printed circuit board 49 (FIG. 4) mounted inside the back panel 28 when the module 44 is slid into its corresponding receptacle. The relatively large printed circuit board 49 is referred to as a "back plane." The base module 44 and station modules 46a-e and the back plane 49 are thus electrically and mechanically connected in releasable fashion through the electrical plugs and sockets when the base module 44 and station modules 46a-c are inserted or plugged into their respective receptacles.

An elongate locking bar 50 (FIG. 3) can be manually slid up and down in FIG. 4 between locked and unlocked positions to secure and un-secure the modules 44 and 46a-c after they have been fully inserted into their respective receptacles. Opposing raised projections 52 formed on the locking bar 50 facilitate sliding the locking bar 50 with a thumb. A pointer 54 extends from one of the raised projections 52 and serves as a position indicator that aligns with LOCKED and UNLOCKED indicia (not illustrated) molded into the upper surface of another plastic support structure 56 mounted inside back panel 28.

The receptacles for the modules such as 44 and 46a-e are partially defined by vertical walls 58 (FIG. 3) formed on the back panel 28. Vertical walls 60 also formed on the back panel 28 to provide support to the modules 44 and 46a-d. Terminal strip 48 provides connection points for all of the valve wiring, decoder cable wiring and for connecting remote sensors and accessories. The term "receptacles" should be broadly construed as defined in one or more of the patents and pending applications incorporated by reference above. Although three output modules are show in FIG. 4 for clarity, the controller may be designed to allow for any number of modules.

Figure 5:
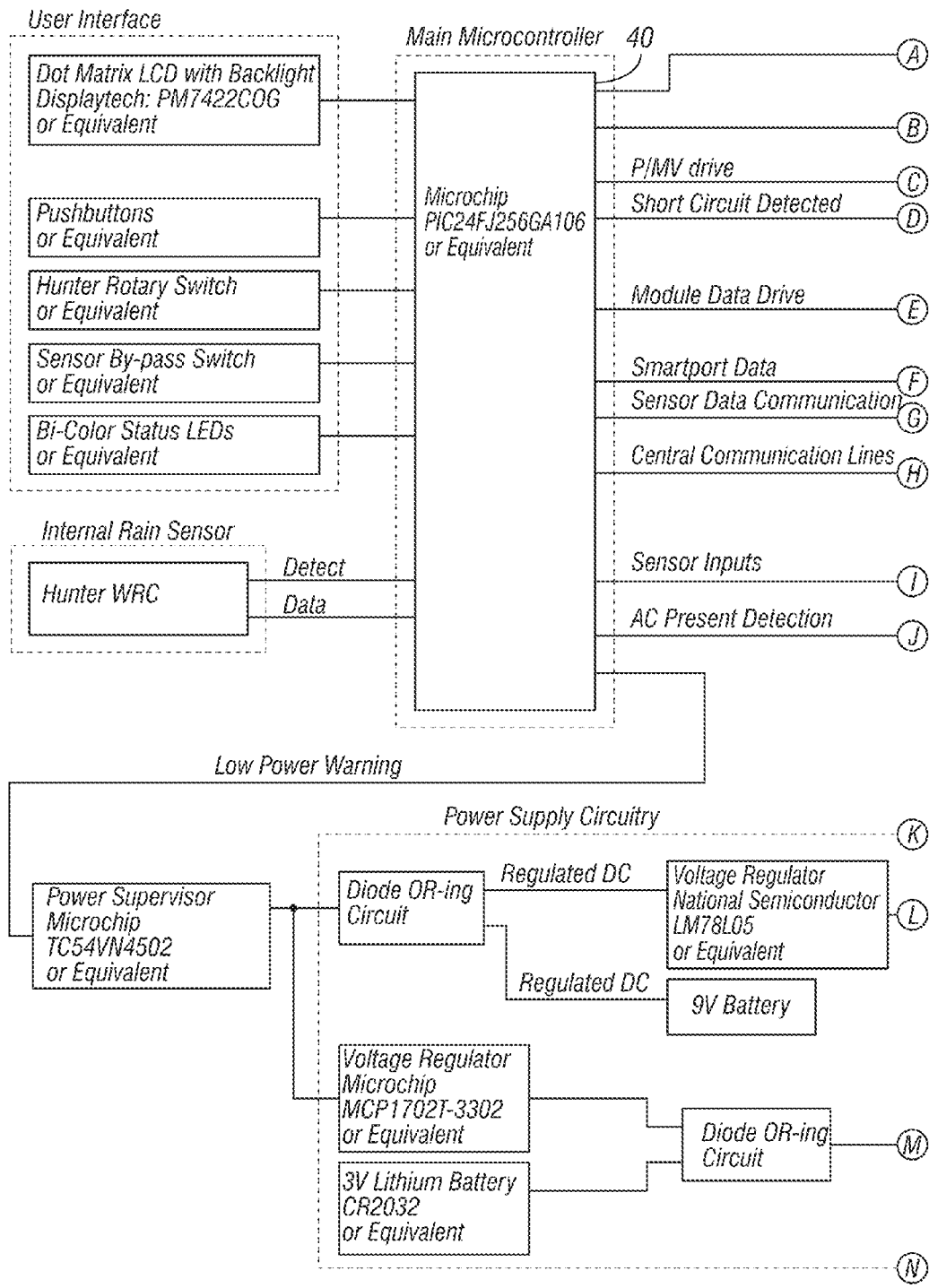
FIG. 5 is a block diagram illustrating further details of the electronic portion of the stand alone irrigation controller of FIG. 2 that resides in the face pack of the irrigation controller.
Figure 5:
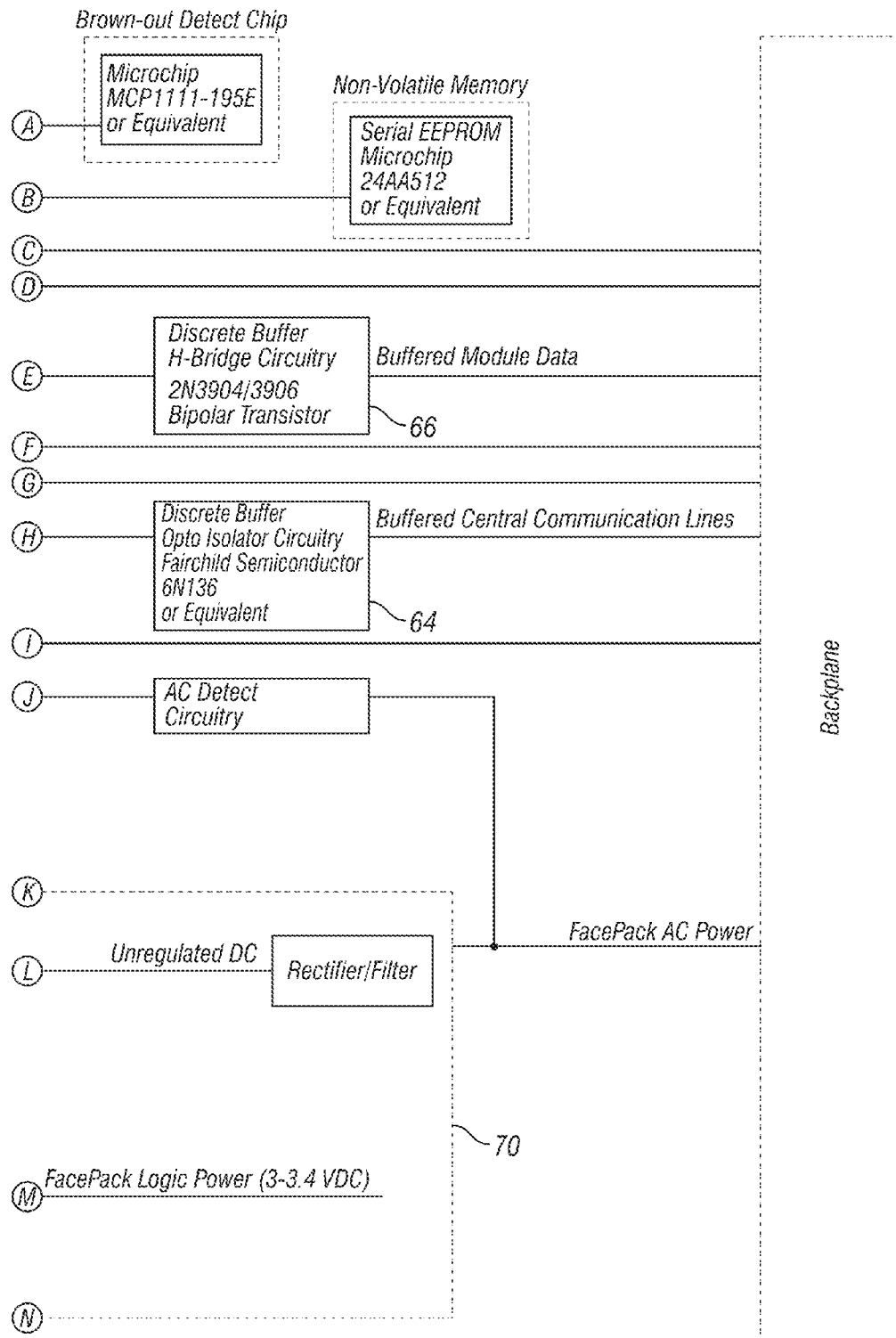

FIGS. 4 and 5 are block diagrams of the electronic portion of the stand alone irrigation controller 12. The electronic components are mounted on printed circuit boards contained within the face pack 30, back panel 28, base module 44 and station modules 46a-e. The processor 40 (FIG. 4) is mounted on the printed circuit board inside the face pack 30 and executes the watering program stored in the memory 42. By way of example, the processor 40 may be a Microchip PIC24FJ256GA106 processor that executes a program stored memory. The processor 40 and memory may be provided in the form of a micro-computer with on-chip memory or as separate components. The manually actuable controls 31, 32a-32g and 34 and the LCD display 36 of the face pack 30 are connected to the processor 40. The processor 40 sends drive signals through buffer 64 and back plane 49 to the base module 44. By way of example the buffer 64 may be Fairchild semiconductor 6N136 or equivalent device. The processor 40 sends data signals to the modules 46a-c through buffer 66. The buffer 66 may be an H-bridge buffer including industry standard 2N3904/3906 discrete bipolar transistors.

The processor 40 (FIG. 4) controls the base module 44 and the station modules 46a-e in accordance with one or more watering programs. Serial or multiplexed communication is enabled via the back plane 49 to the base module 44 and to each of the output modules 46a-e. Suitable synchronous serial data and asynchronous serial data station module circuits are disclosed in the aforementioned U.S. Pat. No. 6,721,630. The location of each module in terms of which receptacle it is plugged into is sensed using resistors on the back plane 49 and a comparator which may be an industry standard LM393 device. The face pack 30 receives twenty-four volt AC power from the transformer 25 through the back plane 49 and regulates the same via a power supply circuit 70 (FIG. 5). The power supply circuit 70 includes a National Semiconductor LM7905 voltage regulator, a Microchip Technology TC54VN45202 power supervisor, and a Microchip MCP1702T-3302A voltage regulator. A lithium battery 72 such as an industry standard CR2032 battery is included in the power supply circuit 70 and provides backup power to the micro controller to maintain the internal clock in the event of a power failure. The face pack ribbon cable that connects the face pack 30 and the back plane 49 can be disconnected, and a nine volt battery (FIG. 5) then supplies power to the face pack 30. This allows a user to remove the face 30 pack from the back panel 28 and enter or modify watering schedules as he or she walks around the irrigation site.

The modules 44 and 46a-e have contacts 74 (FIG. 4) on the sides of their outer plastic housings. When the modules are first plugged into their receptacles, only a communication path is established with the processor 40 via the back plane 49. At this time the locking bar 50 (FIG. 3) is in its UNLOCKED position. Thereafter, when the locking bar is slid to its LOCKED position finger-like contacts 76 (FIG. 4) on the underside of the locking bar 50 register with the contacts 74 on the modules 44 and 46a-c to supply twenty-four volt AC power to the modules that is switched ON and OFF to the valves that are connected to the modules. The finger-like contacts are connected to a common conductor carried by the locking bar 50. When the locking bar 50 is slid to its LOCKED position projections and tabs that extend from the locking bar 50 and the modules are aligned to prevent withdrawal of the modules. See the aforementioned U.S. Pat. No. 7,225,058 for further details.

Figure 6:
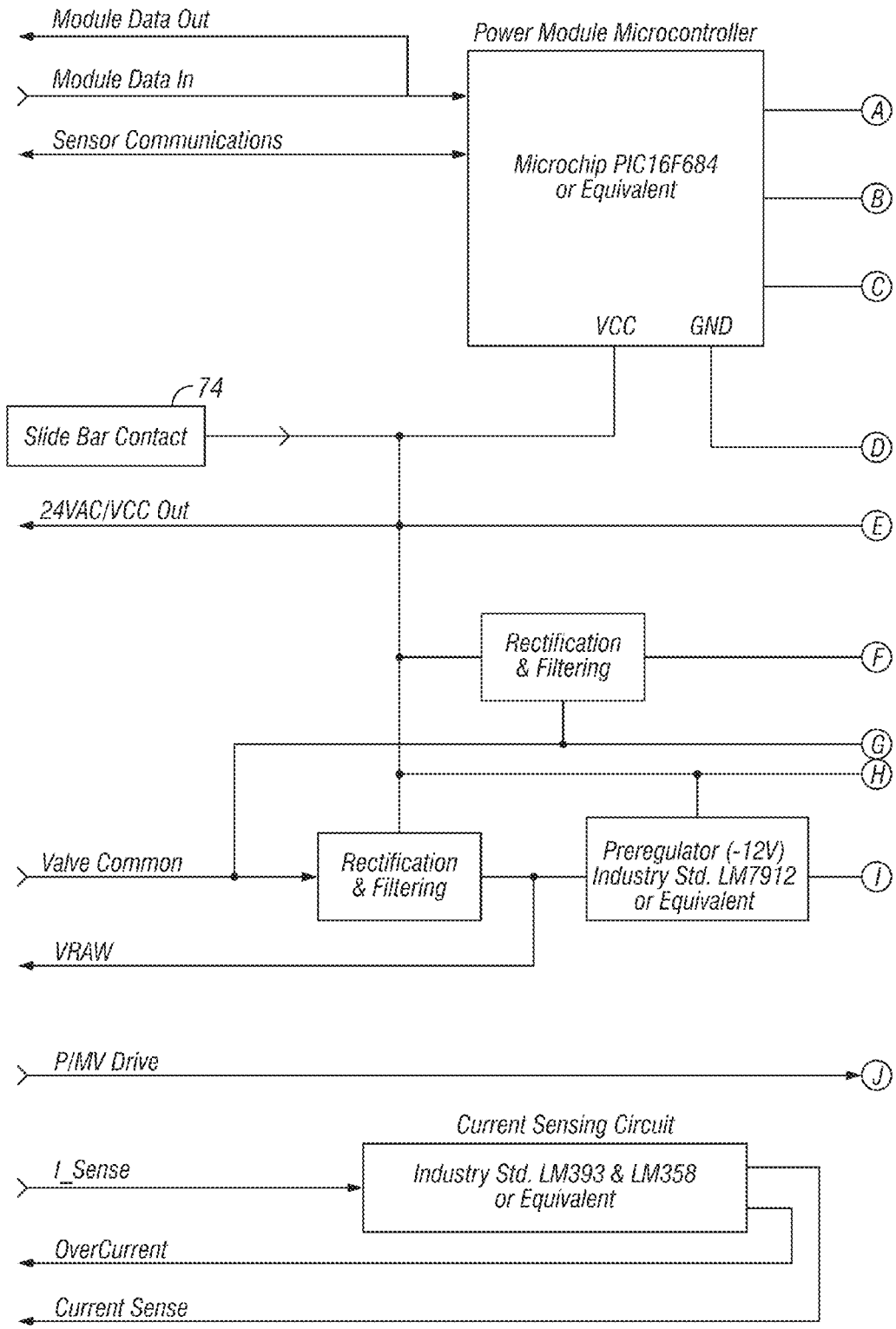
FIG. 6 is a block diagram illustrating further details of the electronic portion of the stand alone irrigation controller of FIG. 2 that resides in the base module.
Figure 6:
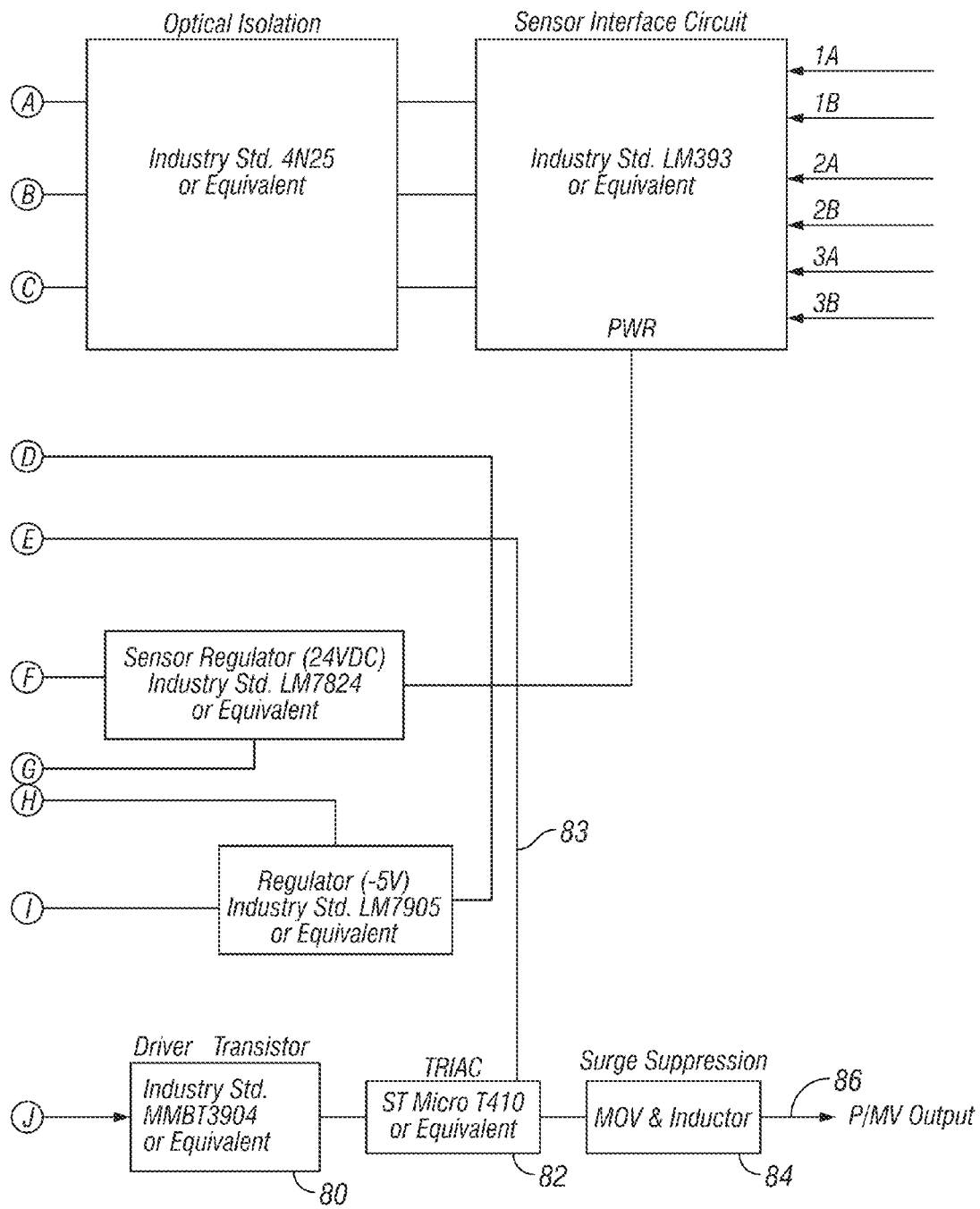

FIG. 6 is a block diagram illustrating the details of the power module 44. The power module circuit includes a transistor driver 80 and triac 82 for switching the 24VAC signal ON and OFF to the Pump/Mater Valve output of the controller. By way of example, the transistor driver 80 may be an industry standard MMBT3905 manufactured by ON Semiconductor and others. The triac may be an ST Micro (trademark) T410. The 24VAC signal is supplied to the triac 82 via contact 74 and line 83. The 24VAC signal from the triac 82 is routed through an inductor/MOV network 84 including an Epcos Inc. S10K35 MOV for surge protection to pump relay or master valve of the irrigation system via line 86.

The power module circuit also accepts the field sensor signals. These sensors may be normally open or normally closed contacts, pulse (flow), or other proprietary signals such as those used in the Hunter ET System. The sensor signals are first applied to the Sensor interface circuit which contains an industry standard LM393 comparator. The sensor interface circuit feeds a bank of optoisolators, typically comprised of industry standard 4N25 devices. The optoisolators feed the Power Module microcontroller which is a Microchip (Trademark) PIC16F684. This device interprets the (now) conditioned and isolated sensor signals, and communicates their status to the front panel via the sensor communication line. The sensor communication line can also send information from the front panel to the power module such as what type of sensor is connected. This information is useful in helping the power module determine how to power the sensor and interpret its signals. It may also be advantageous to allow the microcontroller in the power module to be aware of the status of the station outputs in the controller. For instance, if the power module is sensing flow, but no stations are on, it can alert the front panel of this fact. The module data is therefore also brought into a pin on the power module microcontroller.

Yet another function of the power module is to sense the current being drawn by the solenoid valves in the field. This is accomplished via the current sensing circuit. A "raw" current signal is brought into the power module on the I_Sense line from the backplane. The current sensing circuit serves two functions. It uses an industry standard LM393 comparator to monitor the instantaneous current and compare it to a pre-set limit. If the instantaneous current exceeds this limit, the "over current" signal goes active and alerts the front panel of the problem so that the outputs may immediately be shut down. The current sense circuit also provides a "current sense" signal to the front panel. This signal represents a filtered, scaled version of the I-Sense signal. It is generated using an industry standard LM358 op amp to amplify, peak detect, and filter the I_Sense signal. The front panel can use the "current sense" signal to display the actual current being drawn by the solenoid actuated valves. It can also use this information to determine if there is enough power capacity left in the controller to turn another solenoid ON.

The power module has several power supplies in it. All the supplies are fed with an unregulated 24VAC signal from the slide bar contact. This signal is first rectified and filtered, then sent to various regulators, and also back out to the backplane on the VRAW line. A pre-regulator comprised of an industry standard LM7912 generates a −12V signal. This signal is fed into an industry standard LM7905 regulator which supplied a minus five volt output. This minus five volt output is used as the logic ground for the entire controller. The power module also contains a separate rectifier and filter for a plus 24VDC voltage regulator comprised of an industry standard LM7824. This 24VDC signal is used to power the sensors.

Figure 7:
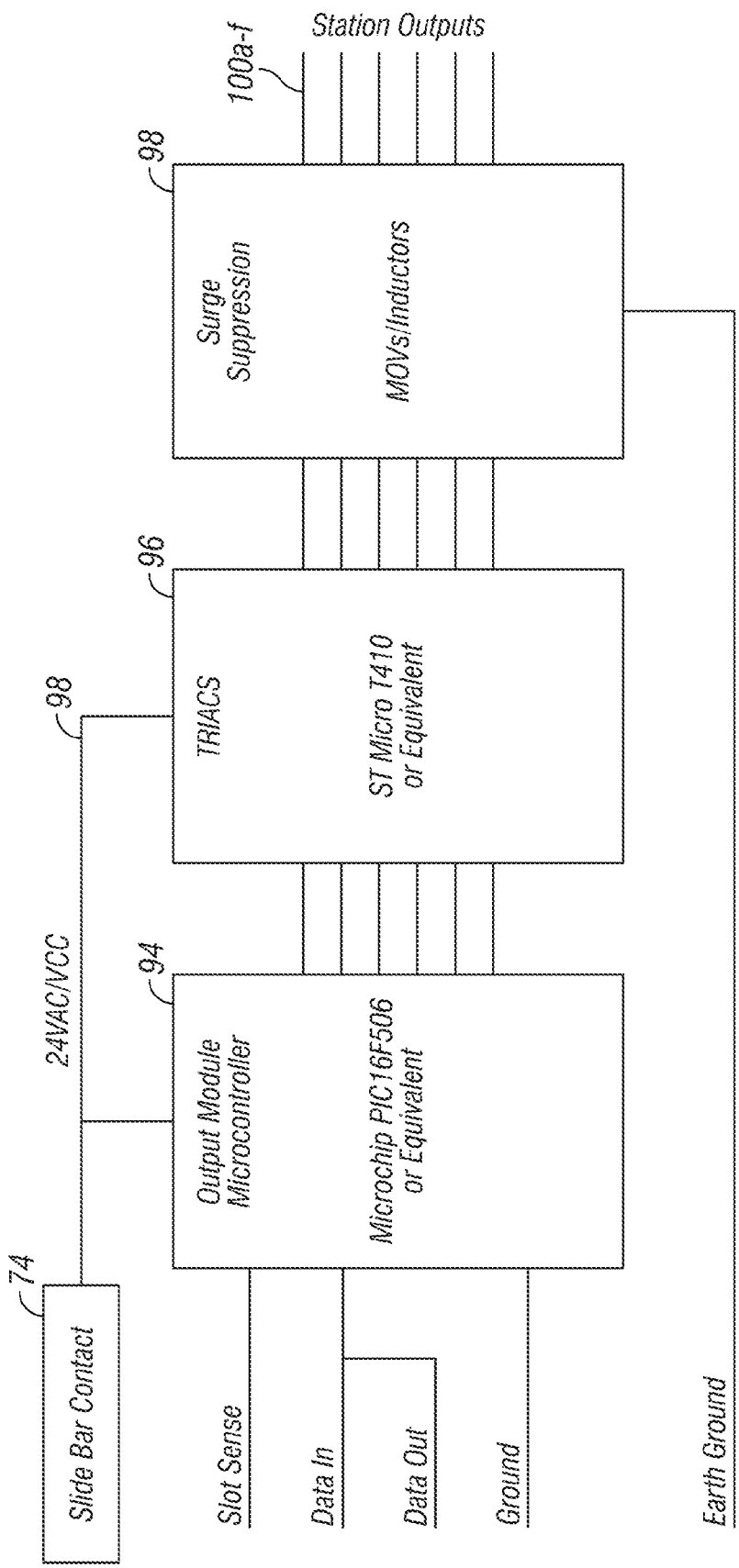
FIG. 7 is a block diagram illustrating further details of the electronic portion of the stand alone irrigation controller of FIG. 2 that resides in each of the station modules.

FIG. 7 is a block diagram illustrating details of the electronic circuit in each of the station modules 46. The station module circuit includes a microcontroller such as the Microchip (Trademark) PIC16F506 processor 94. The station module circuit further includes triacs 96 for switching the 24VAC signal ON and OFF to six different solenoid actuated valves. The 24VAC signal is supplied to triac 96 via contact 74 and line 98. The 24VAC signal from each triac 94 is routed through an inductor/MOV network 98 including Epcos Inc. S10K35 MOV's for surge protection to six field valve lines 100*a-f*, each of which can be connected to a corresponding solenoid actuated valve.

Figure 8A:
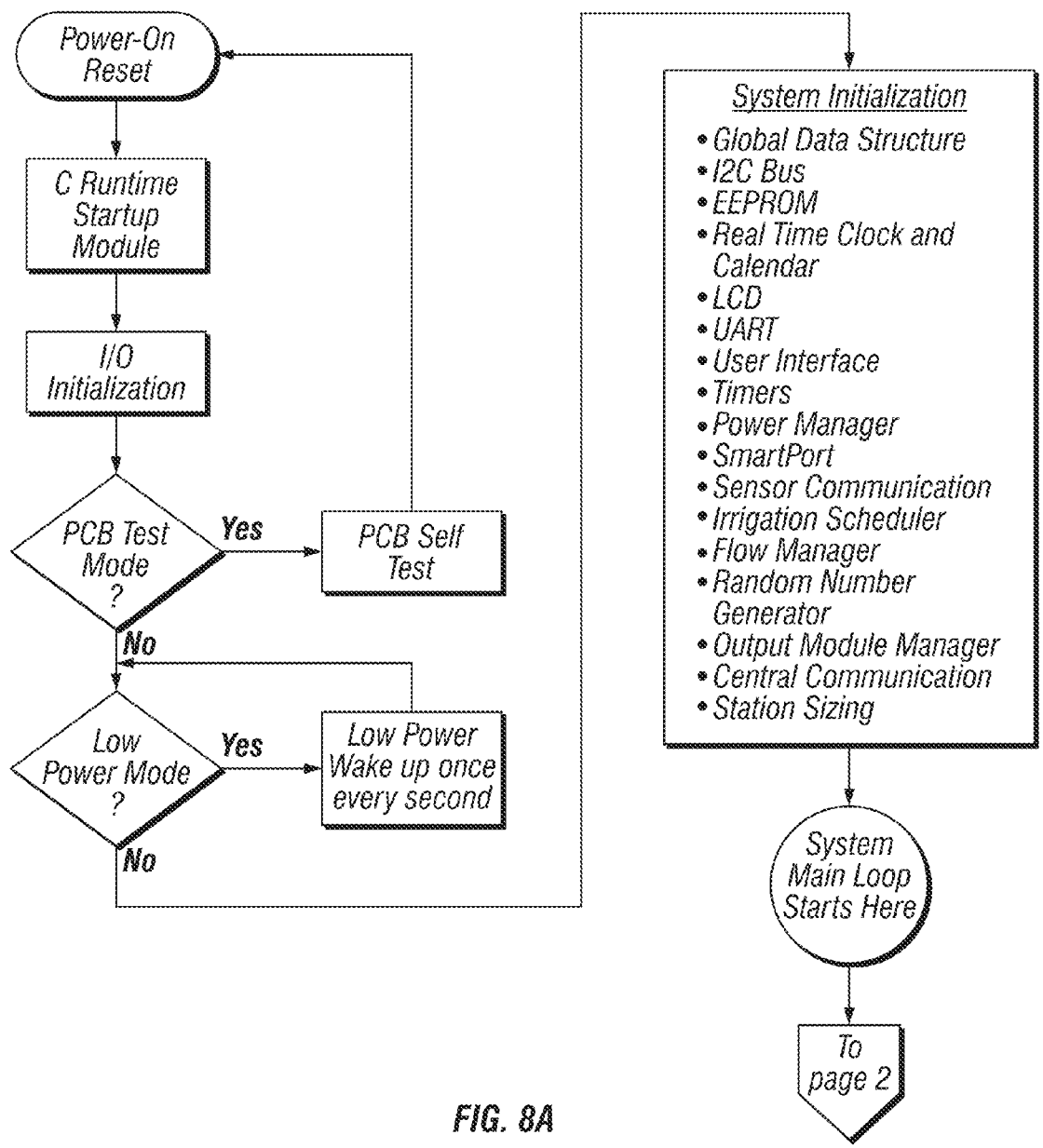
FIGS. 8A-8P are detailed flow diagrams illustrating the operation of the stand alone irrigation controller of FIG. 2.
Figure 8B:
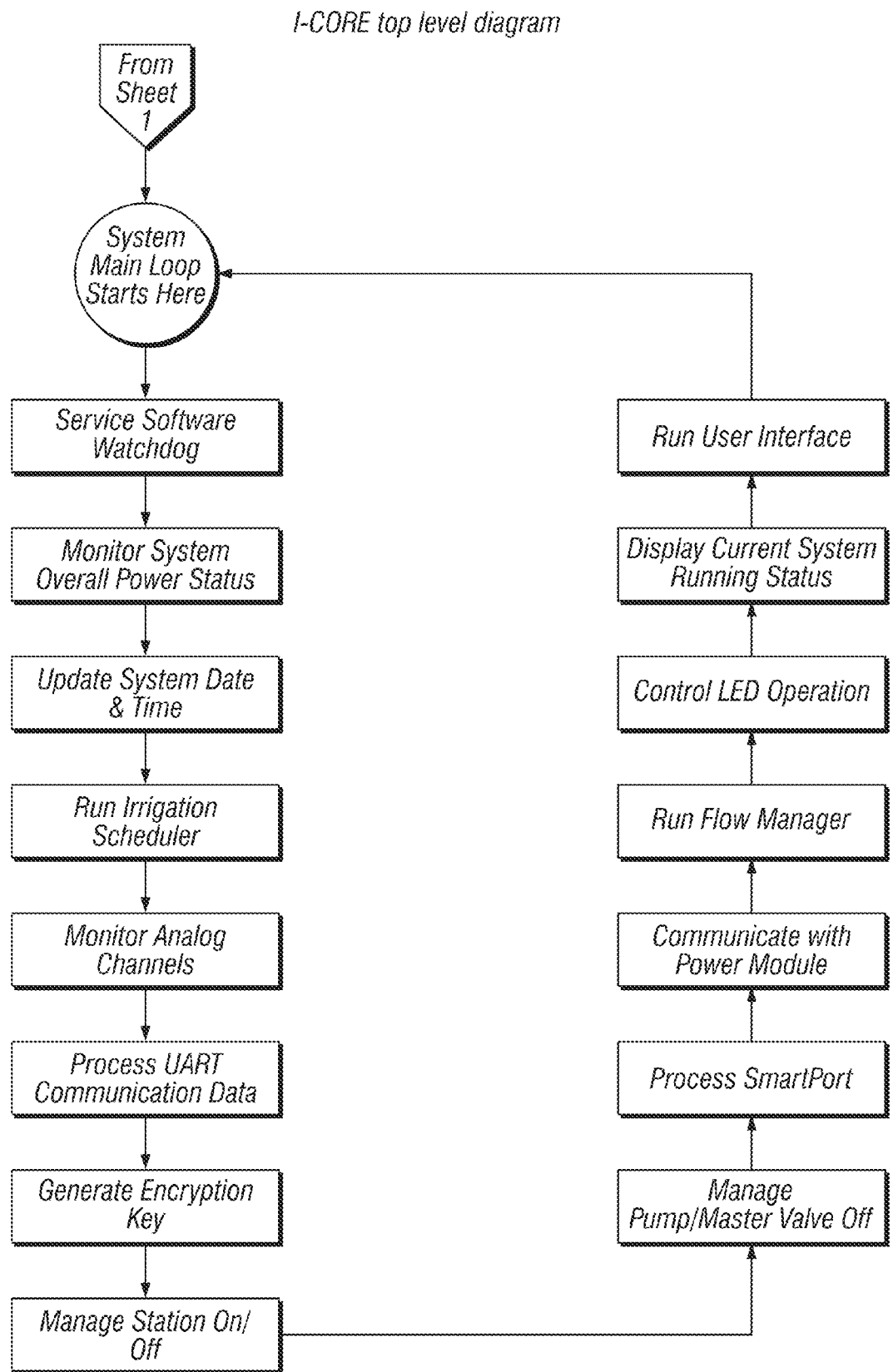
Figure 8C:
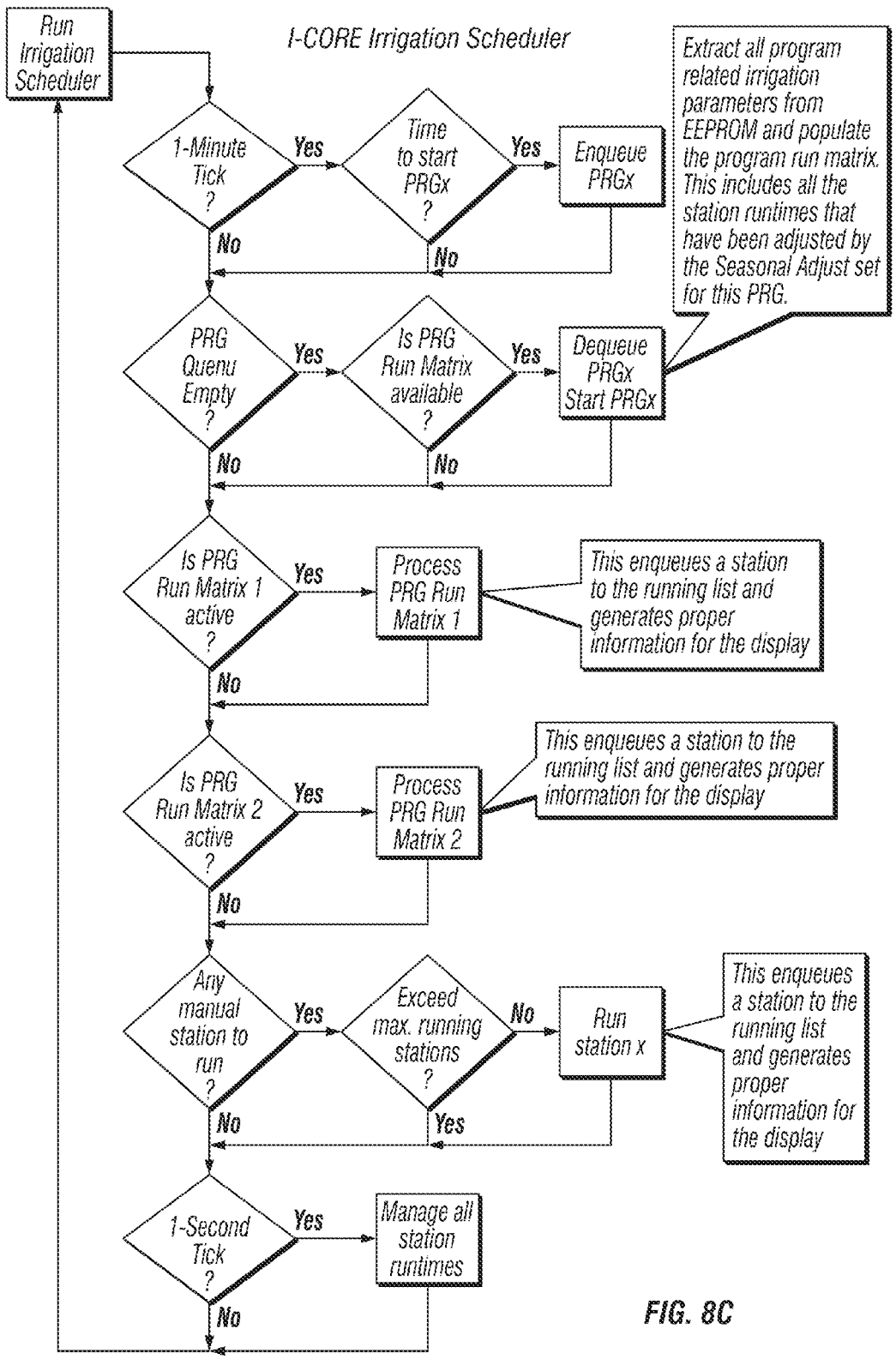
Figure 8D:
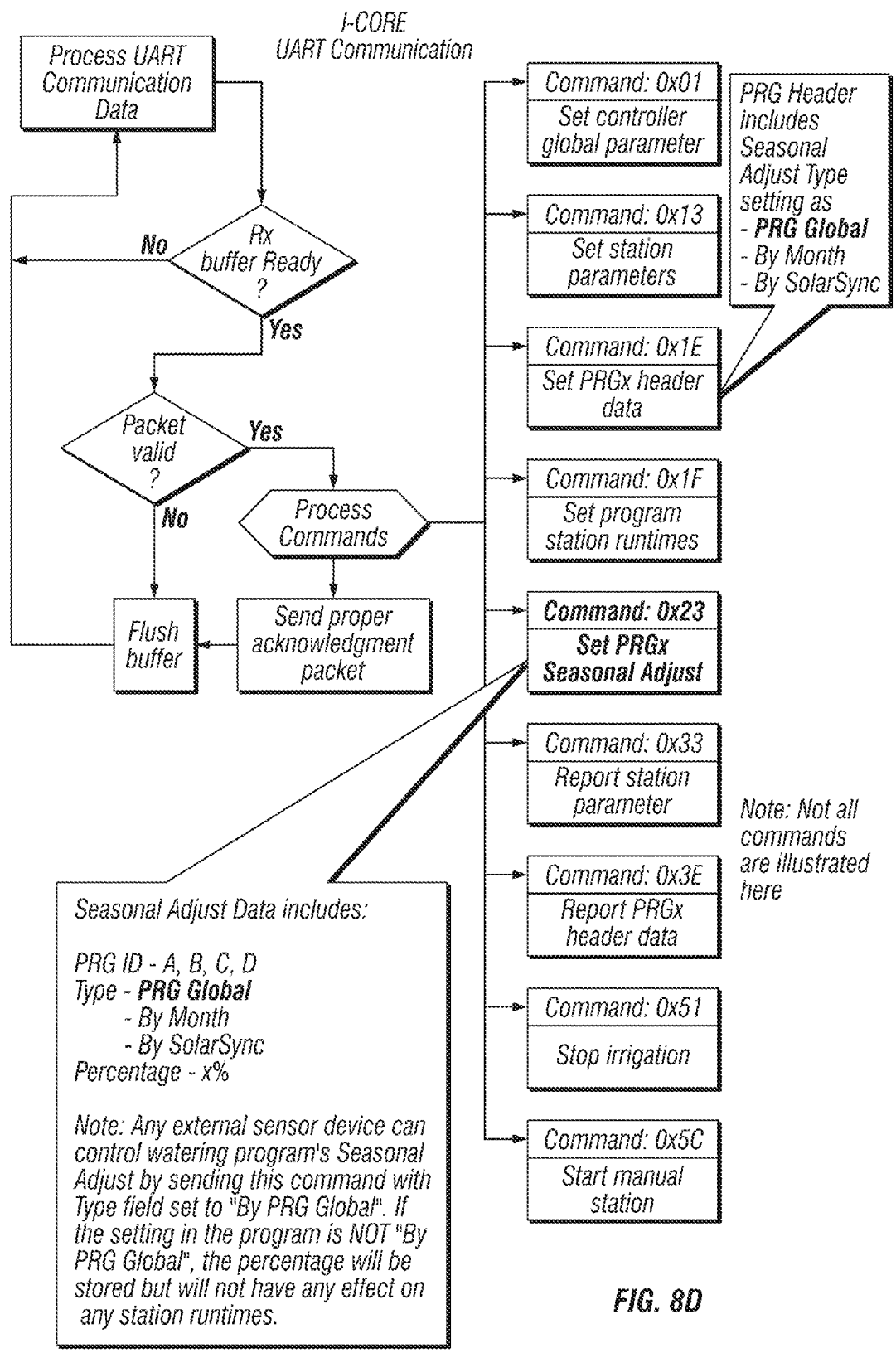
Figure 8E:
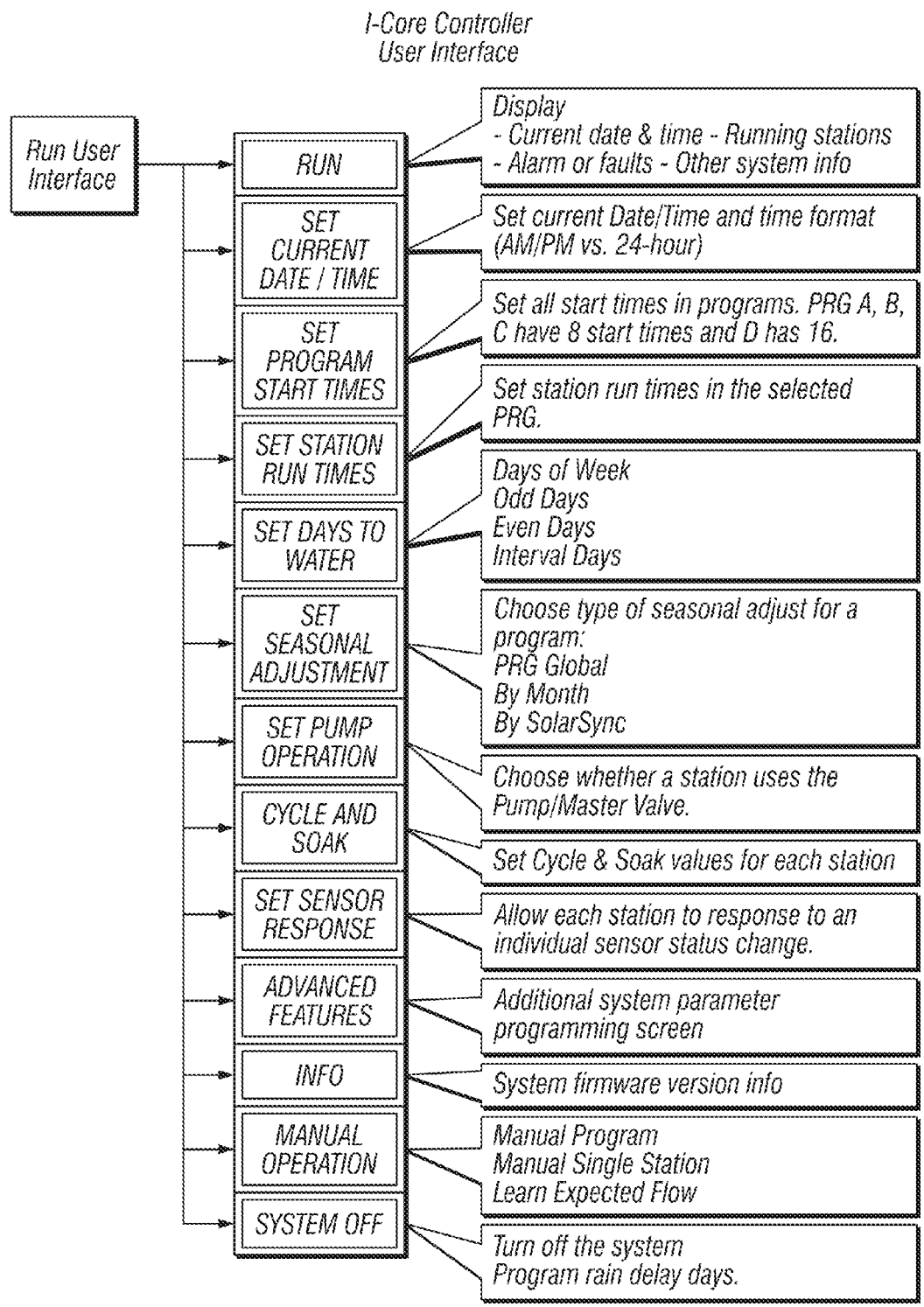
Figure 8F:
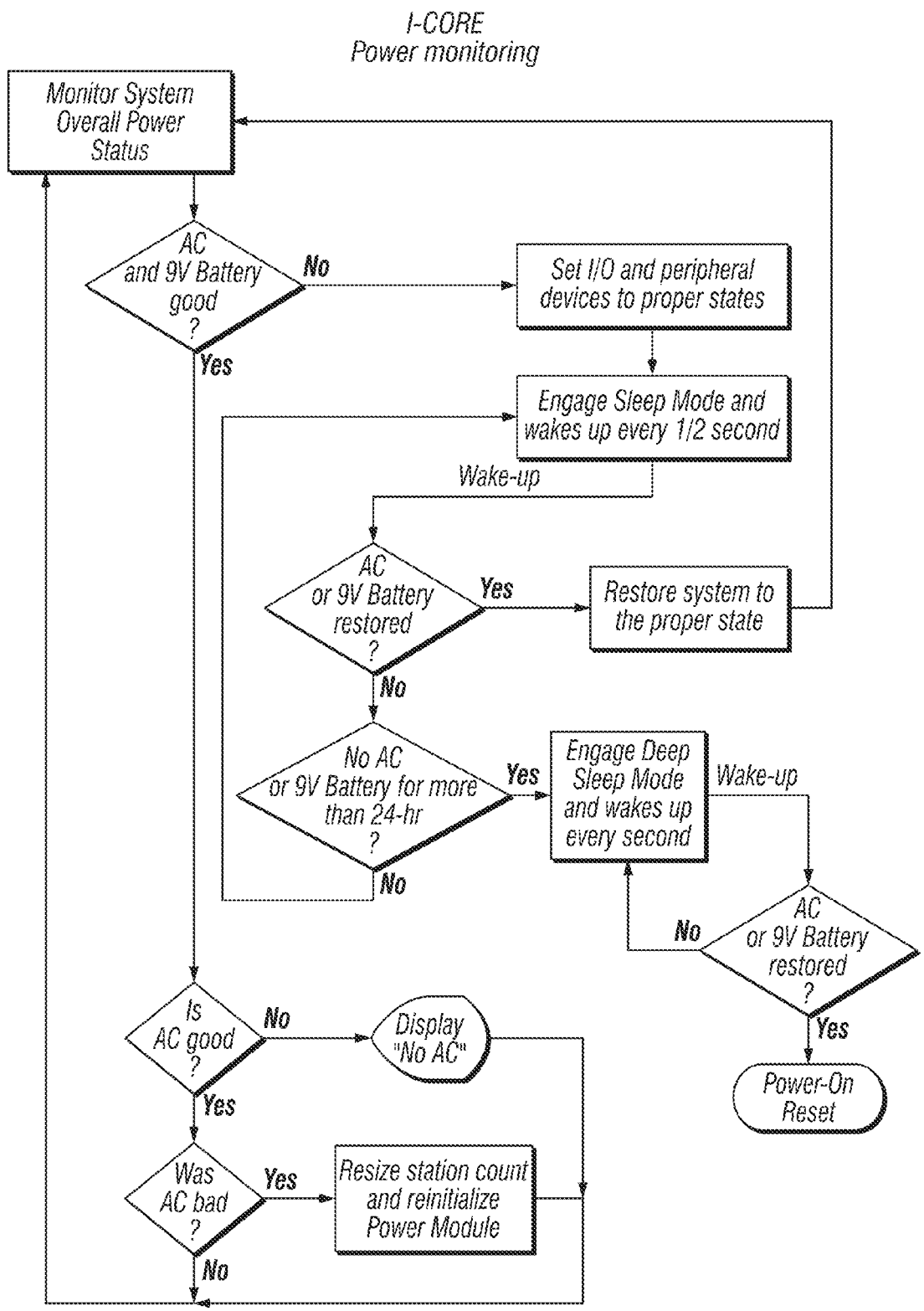
Figure 8G:
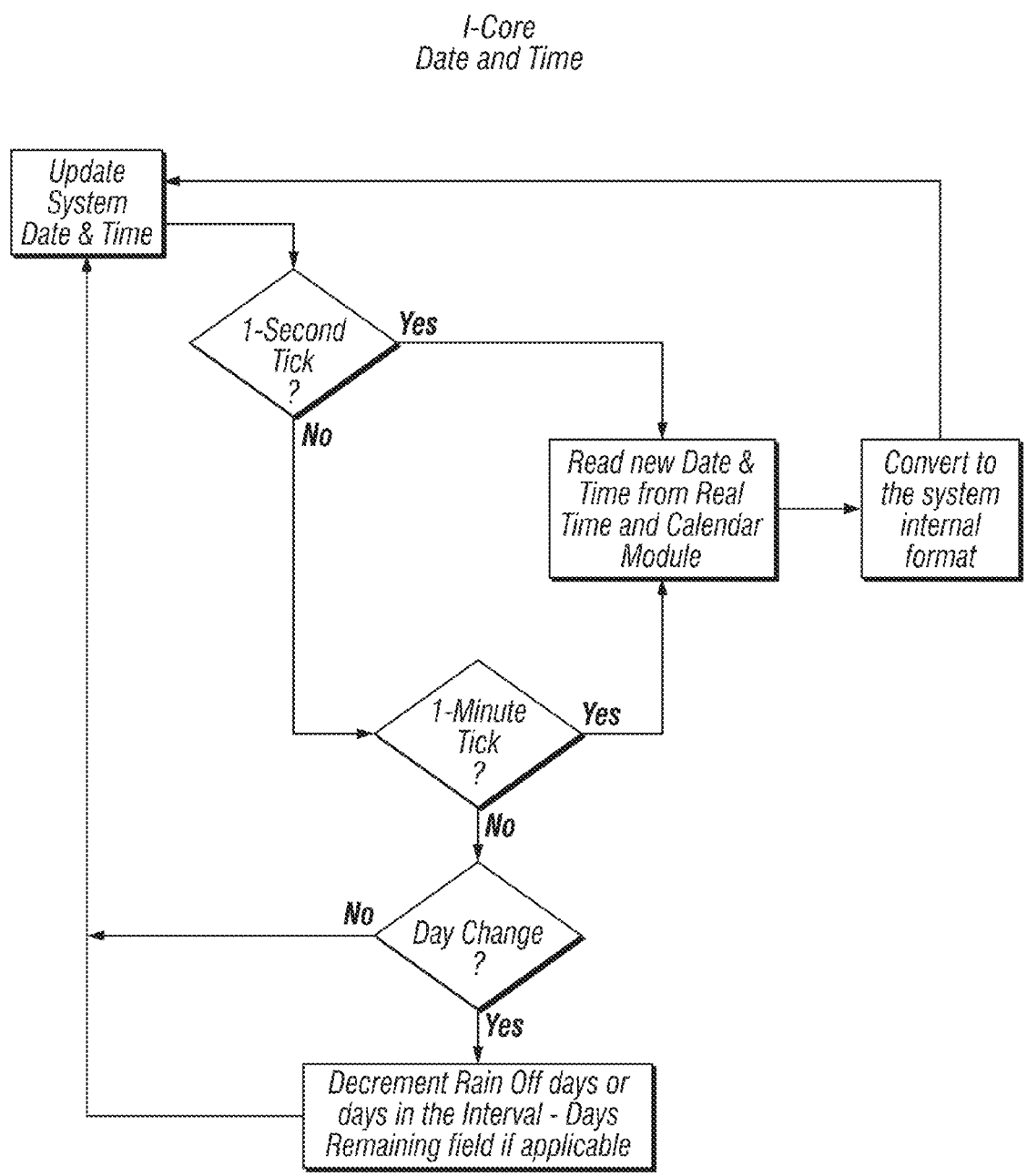
Figure 8H:
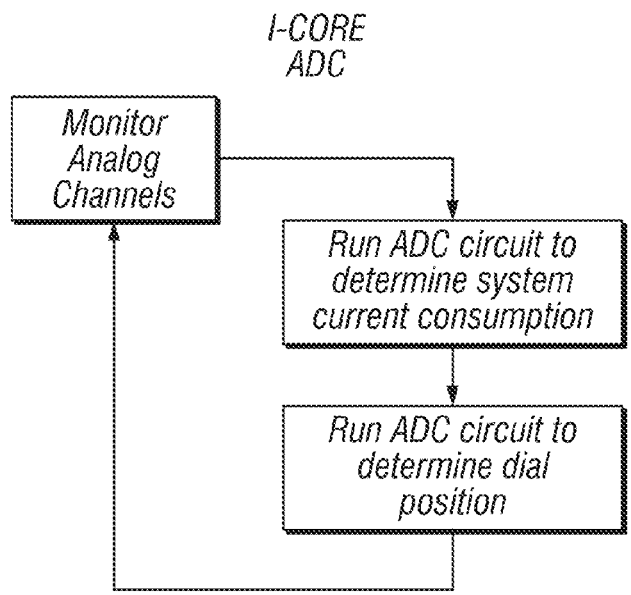
Figure 8I:
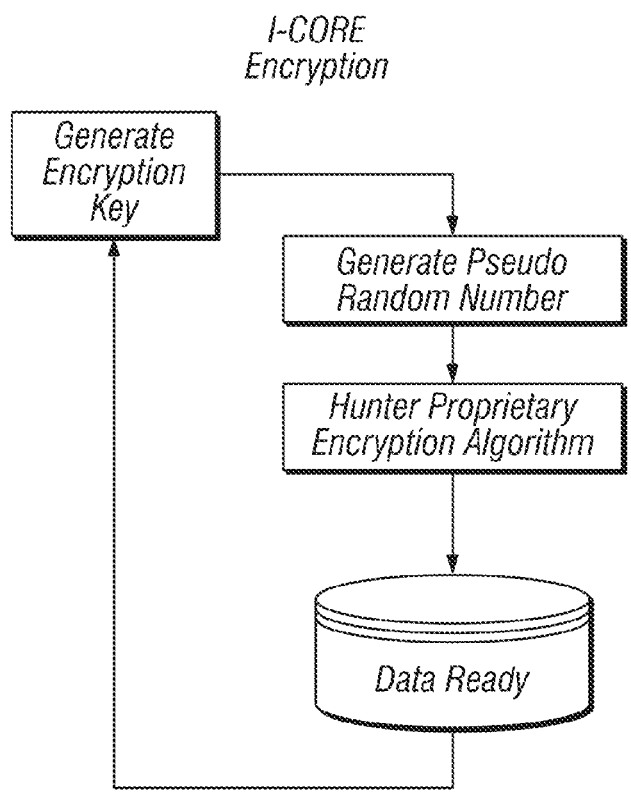
Figure 8J:
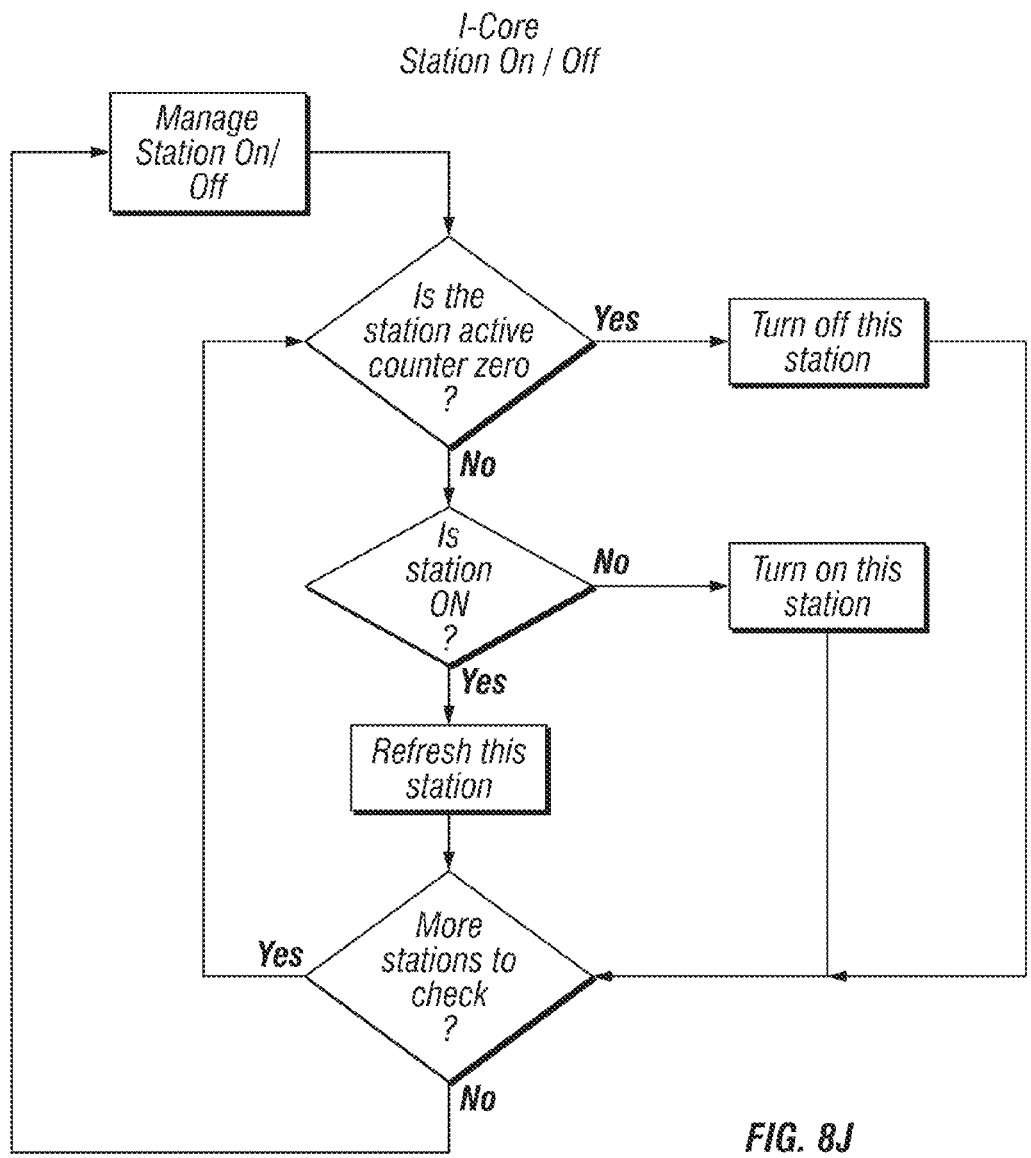
Figure 8K:
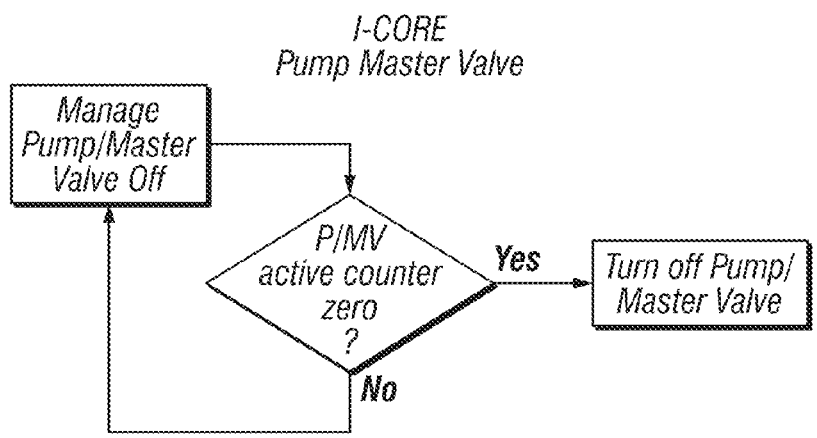
Figure 8L:
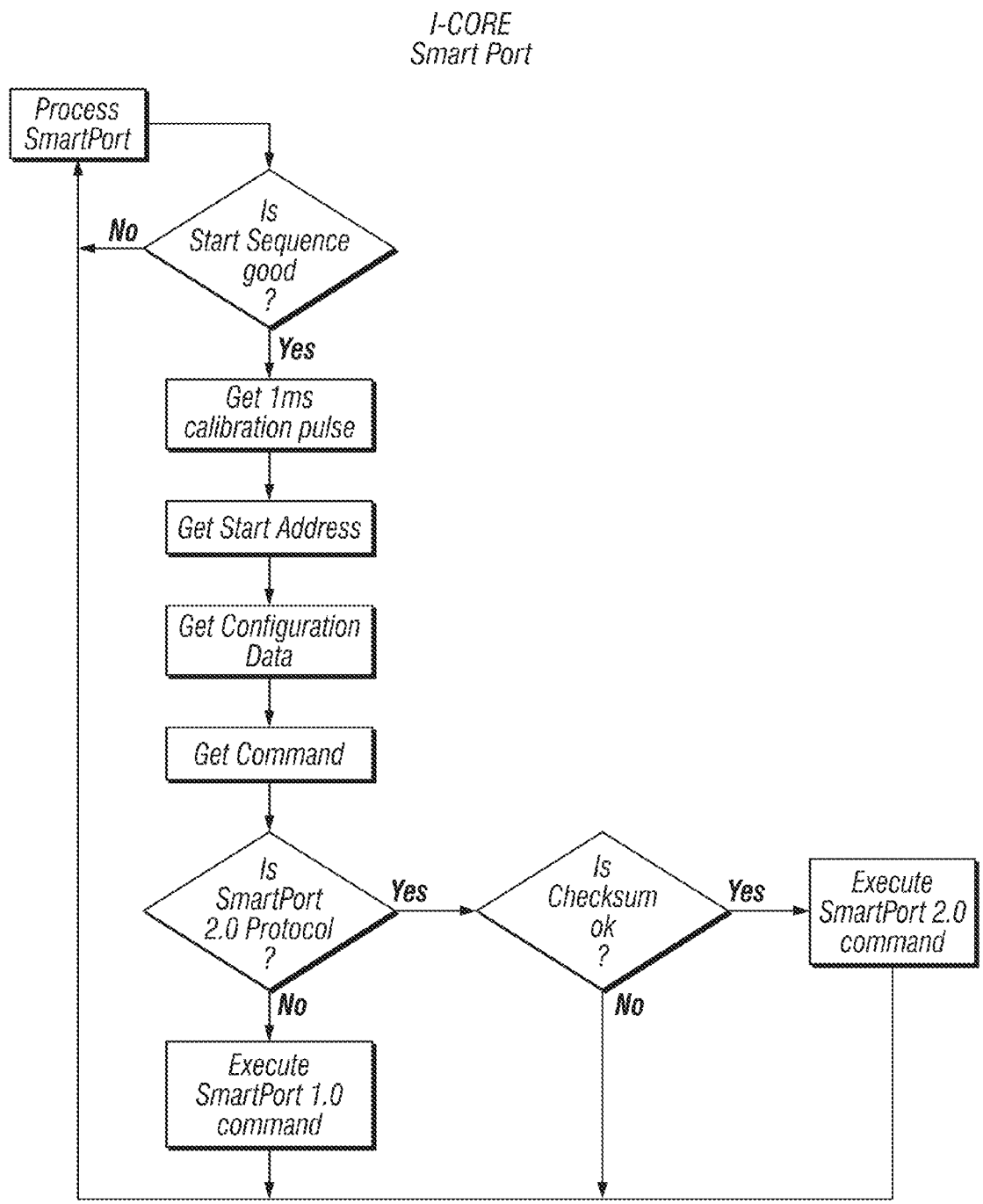
Figure 8M:
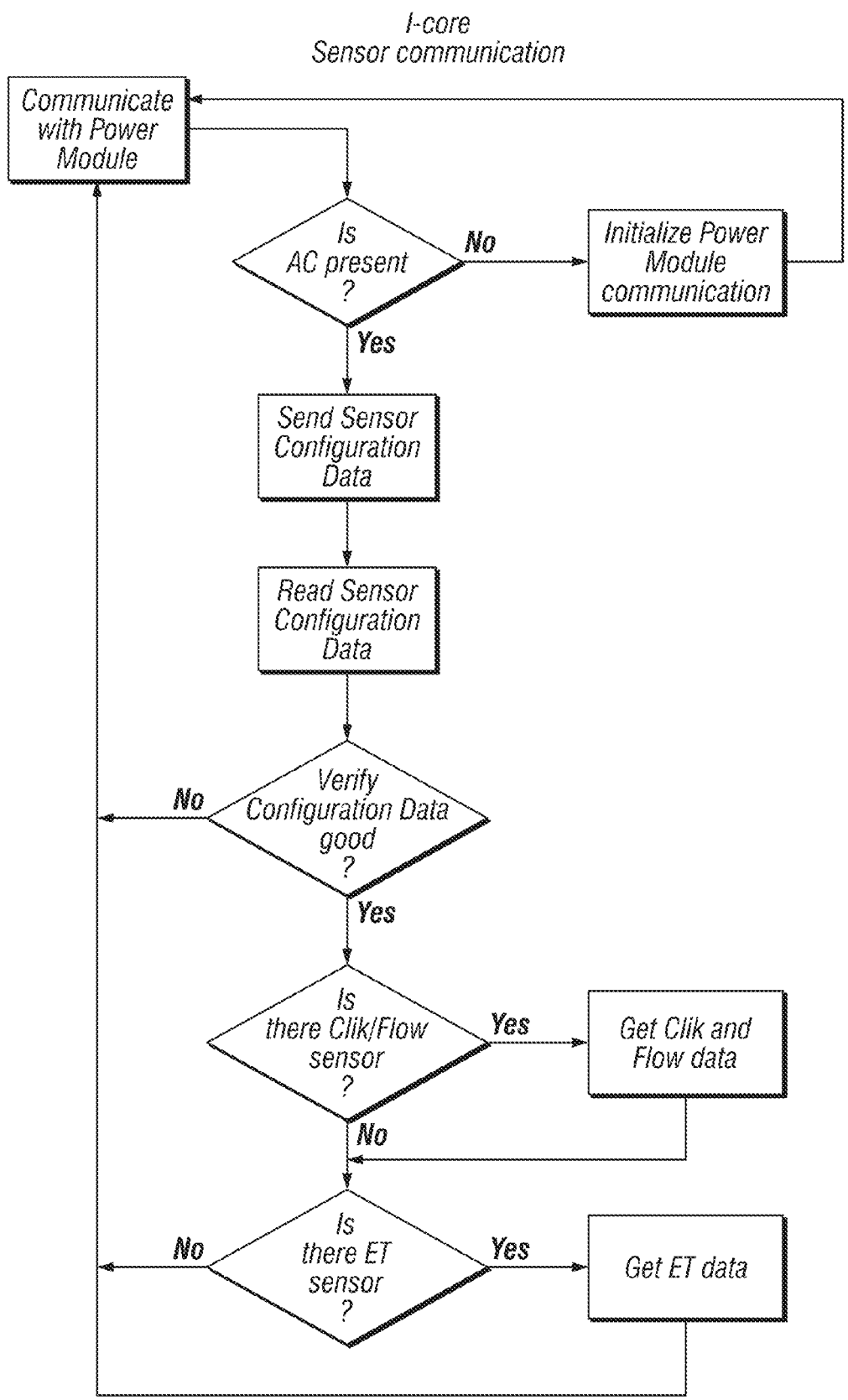
Figure 8N:
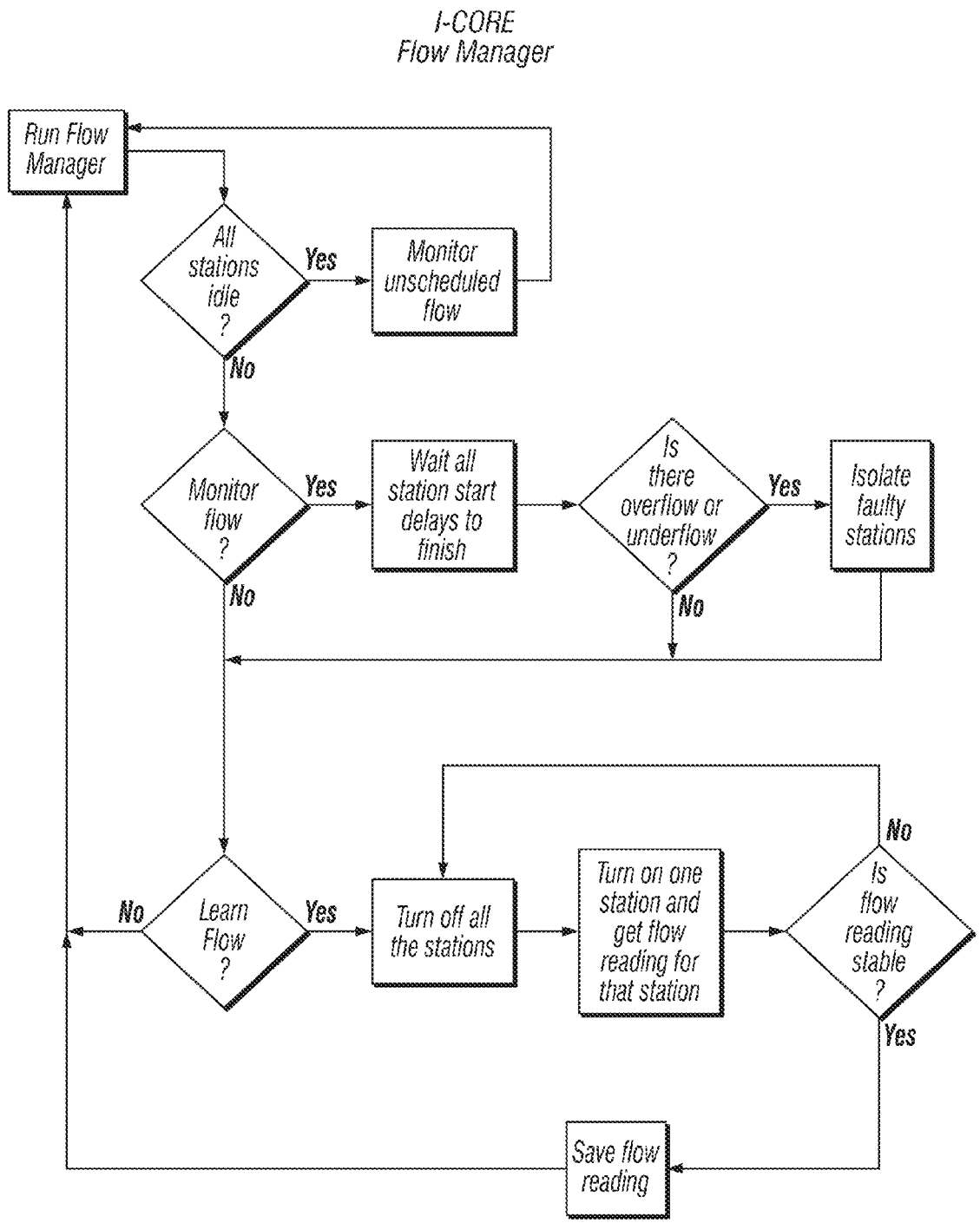
Figure 80:
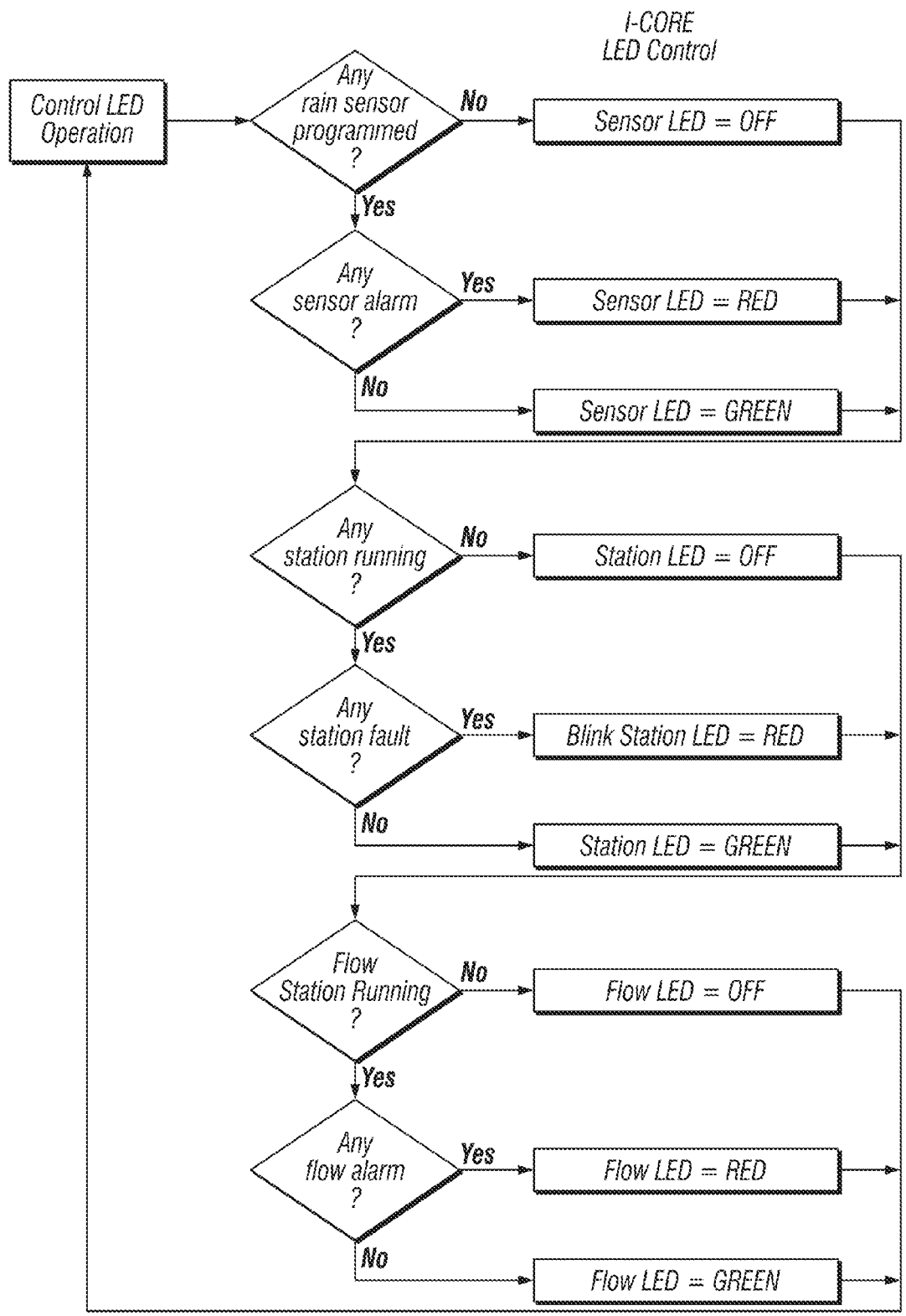
Figure 8P:
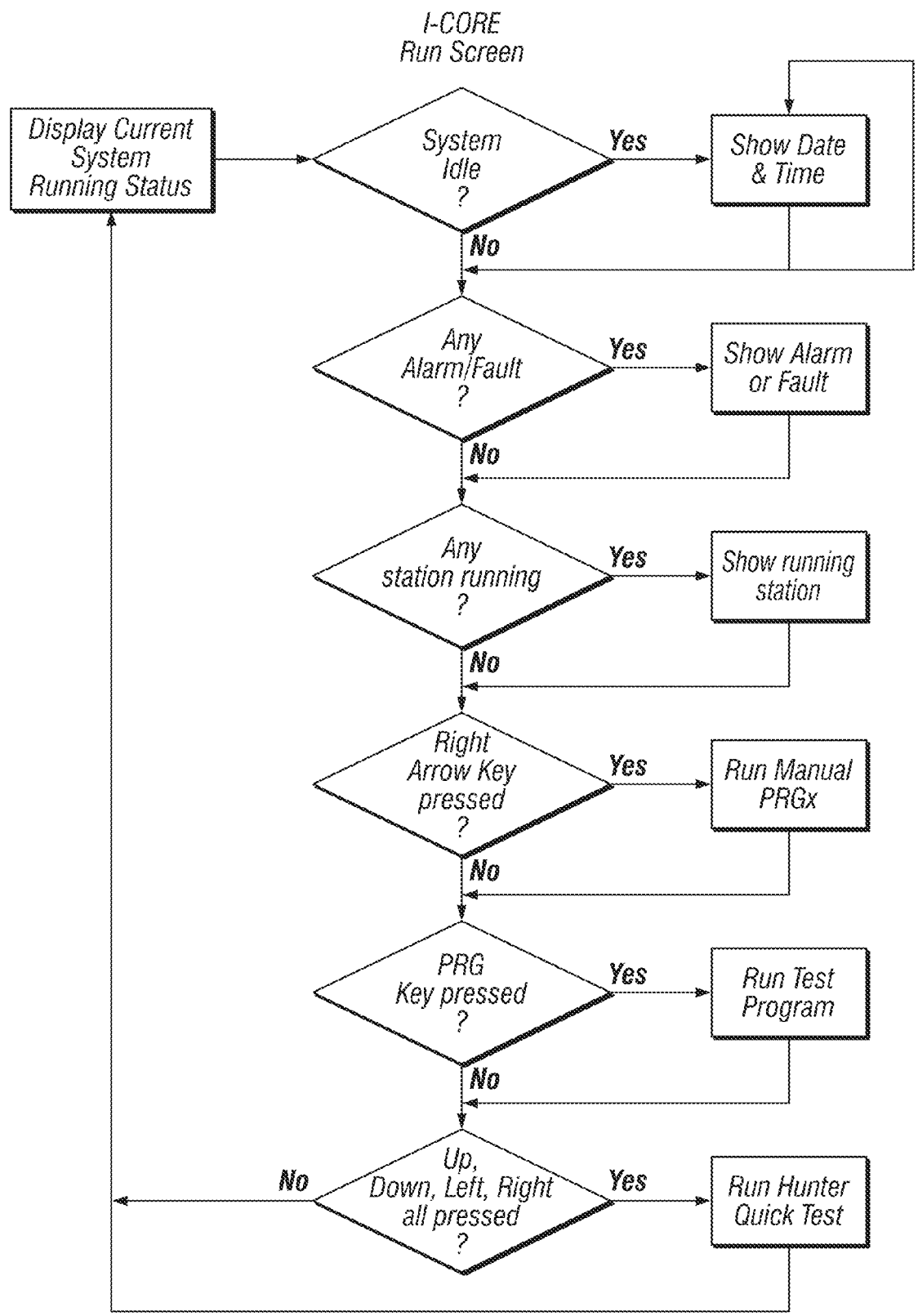

FIGS. 8A-8P are detailed flow diagrams illustrating the operation of the stand alone irrigation controller 12 of FIG. 2. Those skilled in the art of designing and programming irrigation controllers for residential and commercial applications will readily understand the logical flow and algorithms that permit the processor 40 to execute the watering programs stored in the memory 42. These watering programs enables the processor 40 to generate commands for selectively turning the plurality of valves ON and OFF in accordance with the selected or entered watering schedules. The watering programs each include one or more seasonal adjustment features that provides the capability for automatically modifying the watering schedules to thereby conserve water while maintaining plant health. By actuating one of the push buttons 32*c* or 32*d* the user can increase or decrease the run times for the assigned stations by a selected scaling factor, such as ten percent, to account for seasonal variations in temperature and rainfall. Different watering programs may be programmed for different zones. A zone is typically an area of turf or plantings watered by one or more sprinklers supplied with water from the same solenoid actuated valve. In accordance with the present invention, the soil moisture sensors 20*a-d* are each physically buried in the soil of a corresponding zone so that the signal output therefrom can be used to calculate a soil moisture requirement value for that zone.

Figure 9:
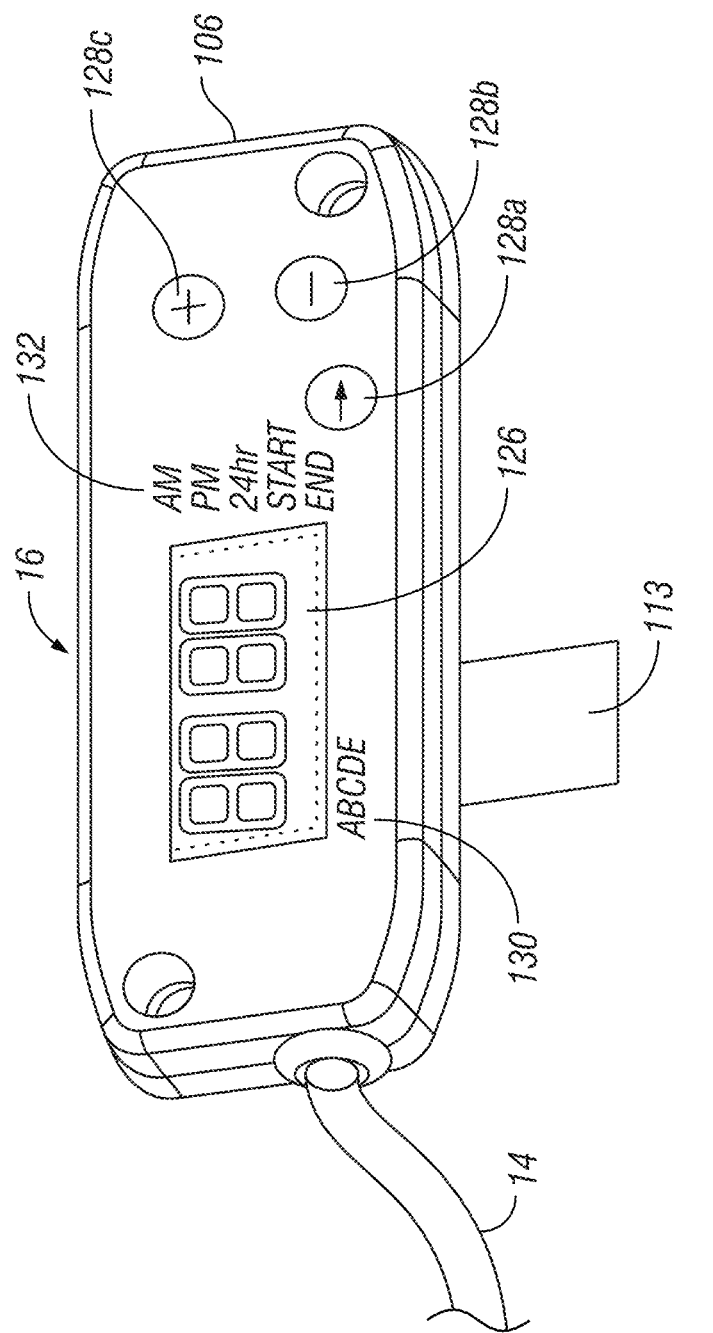
FIG. 9 is a perspective view of the stand alone soil moisture control unit of the system of any of FIGS. 1A-1H.
Figure 10:
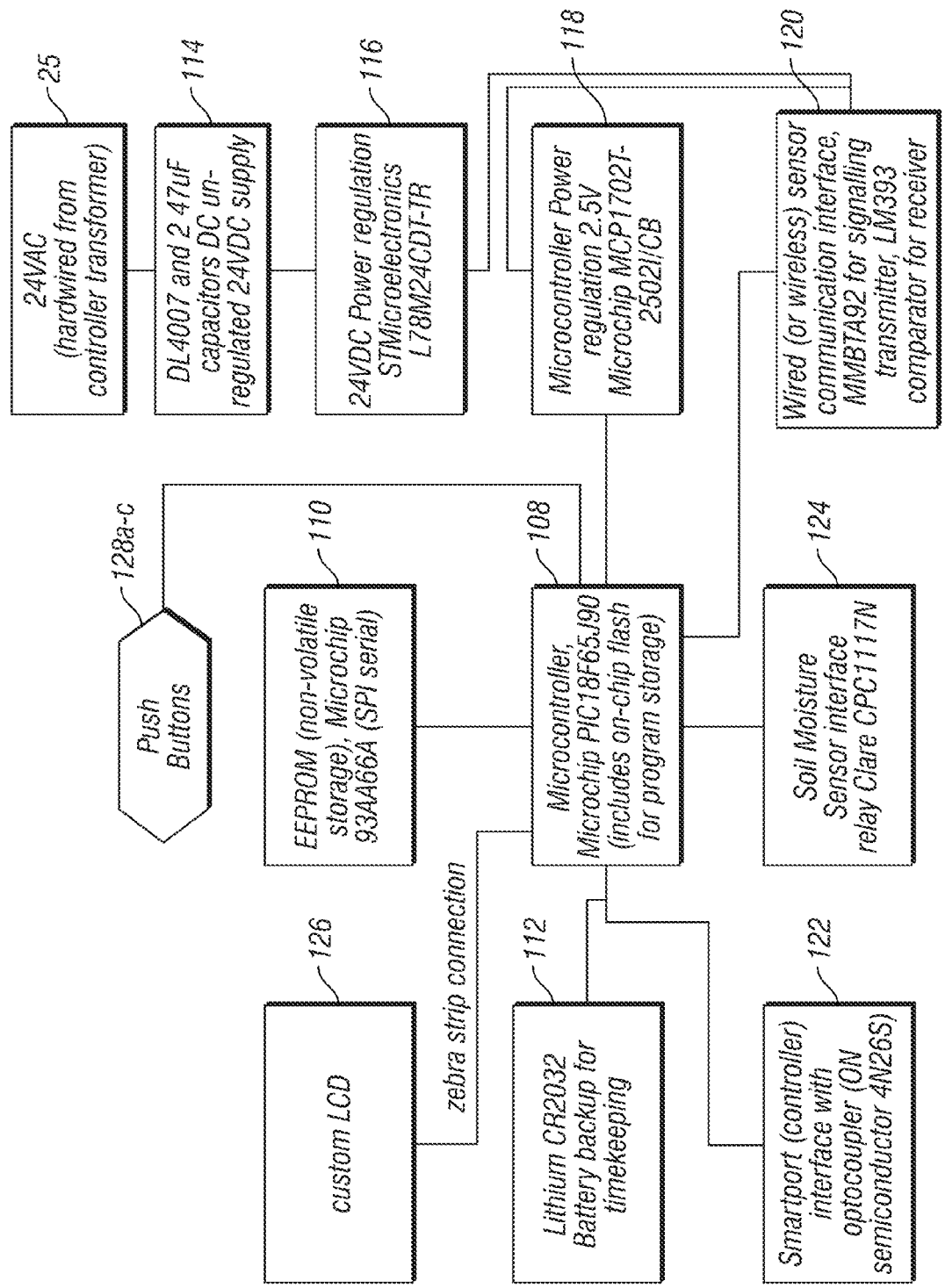
FIG. 10 is a block diagram of the electronic portion of the stand alone soil moisture control unit of FIG. 9.

Referring to FIG. 9, the stand alone soil moisture control unit 16 includes a rectangular outer plastic housing 106 enclosing a printed circuit board (not illustrated) which supports the electronic circuit of the soil moisture control unit 16 that is illustrated in the block diagram of FIG. 10. A microcontroller 108 such as a Microchip PIC18F65J90 processor executes firmware programming stored in a memory 110 such as an industry standard 93AA66A EEPROM memory. The microcontroller 108 can receive DC power from a lithium battery 112 such as an industry standard CR2032 battery, which allows accurate time keeping in the event of a power failure. Insulating strip 113 (FIG. 9) must be manually pulled out to establish an operative connection of the battery 112. External power for the soil moisture control unit 16 is supplied from the transformer 25 (FIG. 1) via the cable 14. The twenty-four volt AC power from the transformer 25 is supplied to a rectifier/filter circuit 114 (FIG. 10) which supplies twenty-four volt DC power to a power regulation circuit 116 which may be an ST Microelectronics L78M24CDT-TR regulator. Power from the power regulation circuit 116 is fed to a microcontroller power regulator 118 which may be a Microchip MCP 1702T-25021/CB regulator. Power from the power regulation circuit 116 is also fed to a wired or wireless sensor communications device 120 that may include, by way of example, an industry standard MMBTA92 for the signal transmitter and an industry standard LM393 comparator for the receiver.

The microcontroller 108 (FIG. 10) interfaces with the SmartPort (Trademark) connector of the irrigation controller 12 with a combination interface/optocoupler 122 which may be provided by an industry standard 4N26S device. The microcontroller 108 interfaces with a soil moisture sensor illustrated in FIG. 1. An LCD display 126 is mounted in the housing 106. Three manually actuable controls in the form of push buttons 128*a-c* (FIG. 9) are mounted in the housing 106 for enabling the user to make selections when setting up and modifying the operation of the Moisture sensor control unit 16 in conjunction with information indicated on the display 126 which is facilitated by column and row indicia 130 and 132, respectively, affixed to the housing 106 adjacent the horizontal and vertical margins of the display 126. Row indicia 132 include, from top to bottom, AM, PM, 24 hr, START and END which are printed, painted, molded or otherwise applied to the outer plastic housing such as by a sticker. Column indicia 130 are illustrated diagrammatically as A-E in FIG. 9 due to space constraints in the drawing. The soil moisture control unit 16 can be manufactured to work with a variety of different soil moisture sensors. Different sensors may have different set up requirements. As a result, A-E may be labeled differently depending on which type of sensor it is designed to control. The labels of A-E may be selected from, but not limited to the group consisting of; MOISTURE SENSOR TYPE, SOILTYPE, SENSOR DEPTH, TEMPERATURE SENSOR TYPE, CALIBRATION, CABLE LENGTH, SET THRESHOLD, NO WATER and WATER+/− with associated icons which are printed, painted, molded or otherwise applied to the outer plastic housing 106 such as by a sticker.

Figure 11:
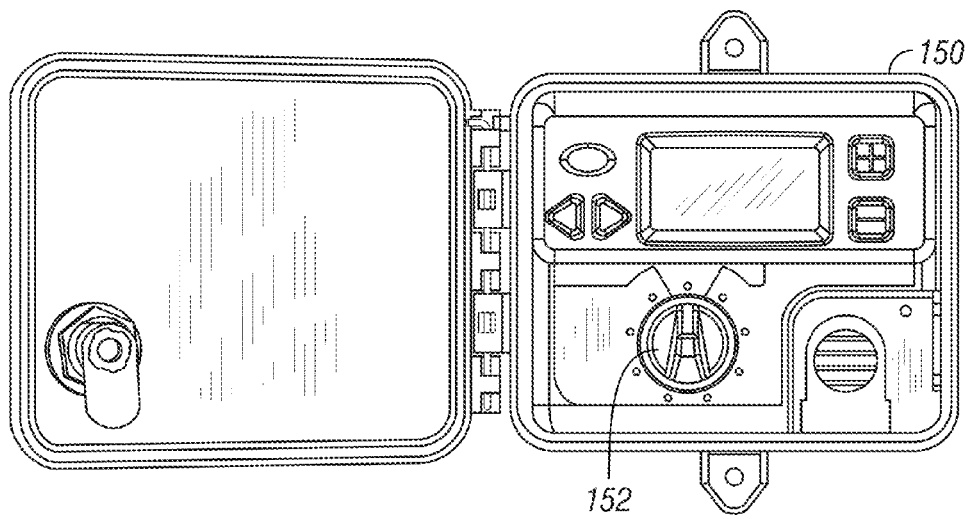
FIG. 11 is a front elevation view of an alternate embodiment of the soil moisture control unit.

FIG. 11 is an alternate embodiment of the above described soil moisture control unit 16. This alternated embodiment controller 150 may perform essentially the same functions as the described soil moisture control unit 16 with the added benefit of a rotary control knob 152 added to the push button switches. This rotary control knob 152 allows for more complex programming and the programming using push buttons alone is too cumbersome. This is particularly beneficial when many sensors are hooked up to the soil moisture control unit and when communications need to be set up for wireless systems.

Figure 12:
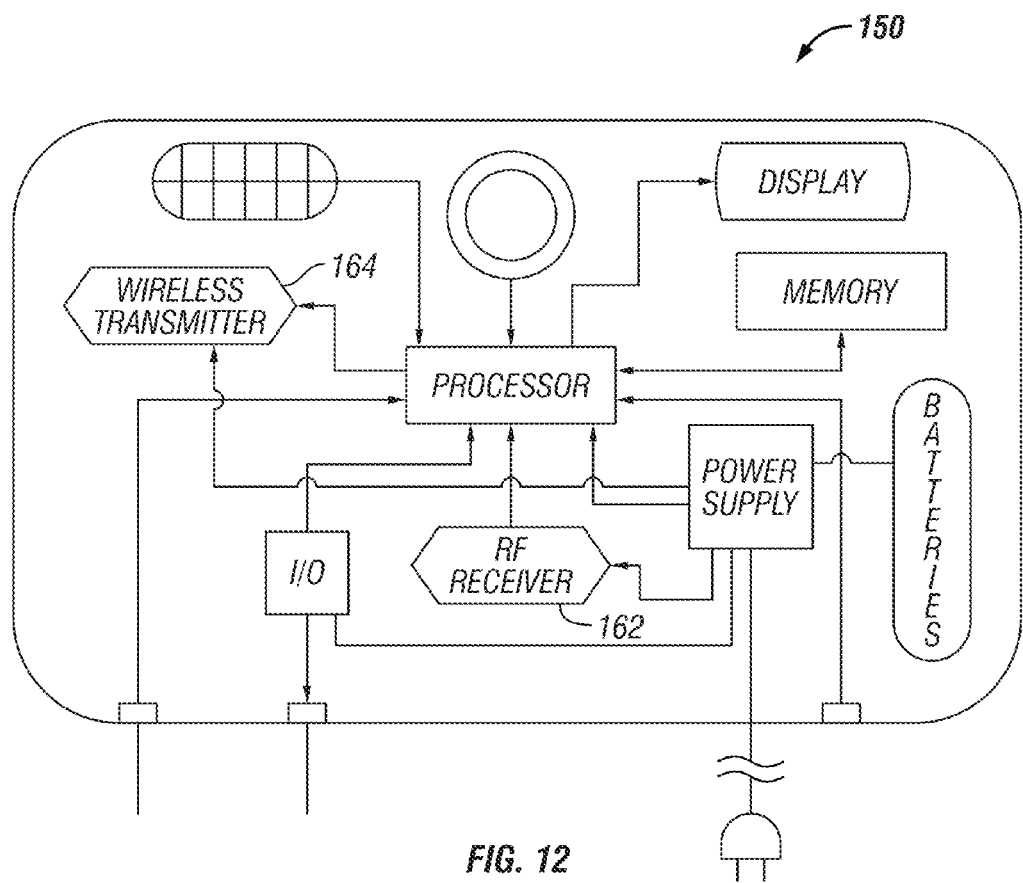
FIG. 12 is a block diagram of the circuitry of the soil moisture control unit of FIG. 11.
Figure 13A:
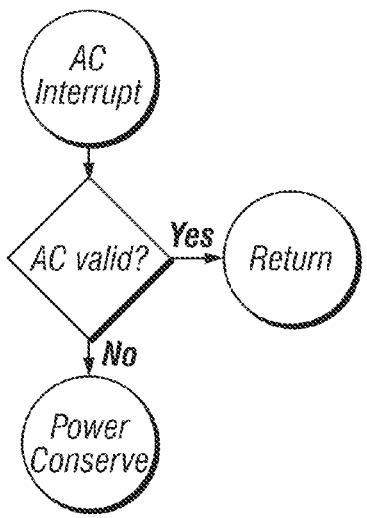
FIGS. 13A-13D are flow diagrams illustrating the operation of the stand alone soil moisture control unit of FIG. 9.
Figure 13B:
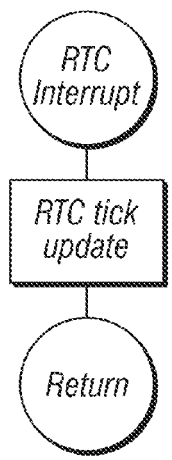
Figure 13C:
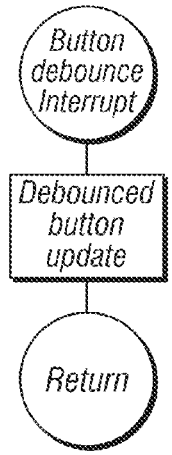
Figure 13D:
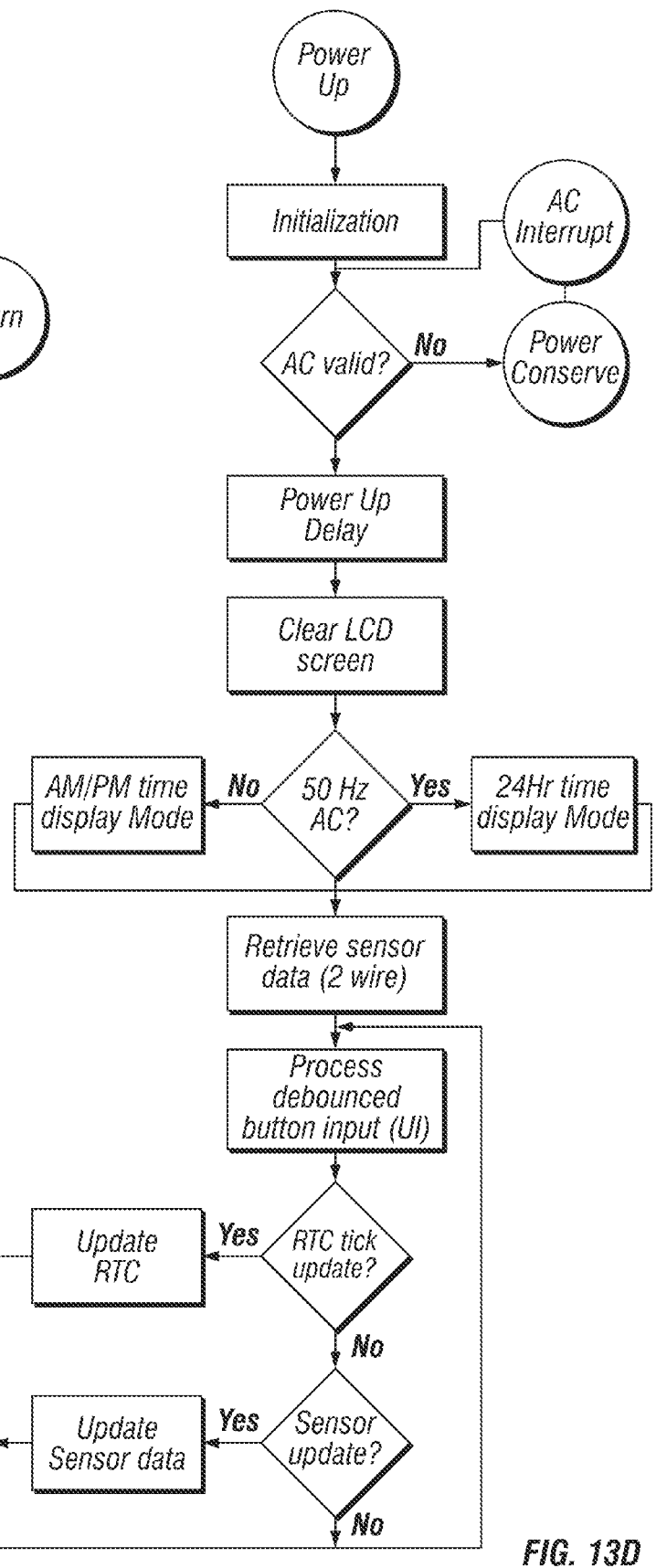

FIG. 12 is a block diagram of the circuitry of the alternate embodiment 150. This alternate embodiment also includes wireless transmitter 164 and RF receiver 162 to facilitate wireless communications to various components of the soil moisture controlled irrigation system.

FIGS. 13A-13D is flow diagrams illustrating the operation of the stand alone soil moisture control unit 16. A watering program may include several watering schedules that include inputted parameters such as start times, run times and days to water. The soil moisture control unit 16 can automatically set the seasonal adjustment of the irrigation controller 12 to reduce watering time, or increase watering times for each watering program, depending on the soil conditions at the time. The soil moisture control unit 16 utilizes actual soil moisture data as its basis for estimating a soil moisture requirement value and making the modifications to the watering schedules implemented by the irrigation controller 12. The soil moisture control unit 16 is designed to work with one or more styles of moisture sensor. One example may be similar to U.S. Pat. No. 5,179,347 of Hawkins, the entire disclosure of which is hereby incorporated by reference. Another example is illustrated in the method of sensing moisture described in Published U.S. Patent Application No. 2008/0202220 of Schmidt where ambient soil temperature and temperature degradation times are used to determine the soil moisture content, the entire disclosure of which is hereby incorporated by reference. Other types of soil moisture sensors with or without temperature sensors may be used with various models of the soil moisture control unit. Soil moisture sensors without temperature sensing capabilities can be used alone, or with optional temperature sensing devices that can be added during the installation. Temperature sensors may be placed in the ground or may be used to measure air temperature.

If the installation includes the ability to measure the either the soil or the air temperature, this additional information can be used by the soil moisture control unit 16 to calculate the soil moisture requirement value. The soil moisture requirement value will increase or decrease in relationship to changes in the soil temperature or air temperature. The higher the recorded temperatures, the greater the evapotranspiration of the plant material will be. Furthermore, overhead irrigation is not as efficient as high temperatures because of evaporation of the spray in the air prior to it hitting the surface of the ground. Also if the temperatures are very high, a certain percentage of water that hits the ground will evaporate prior to soaking into the soil. All of these considerations can be taken in to account by the soil moisture controller to increase or decrease the amount of water that is supplied at a given time. In the case of a soil temperature measurement, this is further modified by how deep the sensor is placed into the soil because the temperature changes in the soil are reduced as the sensing depth is increased. The ability of the soil moisture control unit 16 to determine the irrigation requirements based on either air or soil temperature and moisture content allow it to change the seasonal adjust of the irrigation controller 12 from as little as zero percent (0%) of normal watering to more than one hundred percent (100%) of the normal watering schedule based on the actual conditions of the soil at the irrigation site.

The user can modify the run and cycle times for individual stations in the usual manner in the irrigation controller 12. As an example, if one station is watering too much, but all of the other stations are watering the correct amount, the user can easily reduce the run time of that particular station and balance the system out. Then the soil moisture control unit 16 continues modifying the watering schedules executed by the irrigation controller 12 on a global basis as a percentage of run time, based on the calculated estimated soil moisture requirement value. Irrigation controllers can be used to control landscape lighting and other non-irrigation devices such as decorative water fountains. The controller 12 may have features in it such that the soil moisture control unit 16 only modifies the watering schedules of the irrigation controller 12.

One of the difficulties with conventional soil moisture based controllers is attributable to the difficulty of fine-tuning the irrigation controller schedule based on the soil moisture data being received. One situation is where the irrigation schedule has been inaccurately set up. It is very common for irrigation controllers to be programmed by the end user so that the schedule tends to over or under irrigate the property. In the system of the present invention, this scheduling error is automatically corrected by the soil moisture control unit 16. When the irrigation control unit 16 is installed, one of the soil moisture sensors 20*a-d* is installed at the proper root zone depth of each of the monitored irrigated zones. Each watering program has at least one soil moisture sensor associated therewith. There may be a plurality of watering programs associated with a landscaped area, each program having at least one zone assigned to it where one of the assigned zones has a soil moisture sensor buried in the landscaped area that is irrigated by that zone.

When a monitored zone is being watered, the soil moisture control unit 16 and the controller 12 communicate via a two way communications platform to measure how long that station operates. If the soil moisture control unit 16 has not detected the proper moisture when the irrigation cycle is complete, it can automatically increase the run time of the watering schedules within the program by adjusting the associated seasonal adjust feature higher. It will continue to do this over time until operation of that zone runs long enough for the soil moisture to sense the moisture in the soil. A maximum run time may manually or automatically be entered into the program. This will be a value that is higher than the programmed run time. This will restrict the controller from excessive over watering of a zone in the event that the controller does not get a signal from the sensor that the soil is moist. If this occurs, the controller may display a fault warning for that sensor. Also, if the soil moisture control unit 16 detects that the soil is moist, but the irrigation cycle is still running, it will allow that irrigation cycle to continue.

After the cycle is complete, the soil moisture control unit 16 will calculate the amount of time the zone ran and compare that with the amount of time it took to moisten the soil. It will then automatically reduce the associated seasonal adjustment of the irrigation controller so the irrigation cycle time will match the amount of time required to irrigate the soil to the proper moisture. This is repeated each time the irrigation controller operates that zone to continually fine tune the watering schedule.

Another situation occurs when the soil moisture sensors may not be placed in an optimum location on the irrigation site. As an example, a soil moisture sensor may be placed in an area that receives late afternoon shade. This will result in the calculation of an abnormally high estimated soil moisture content value for the rest of the irrigation site. The entire irrigation site may receive too little water and the plant material may become stressed from too little water if the watering schedules are based on an abnormally high estimated soil moisture content. If a conventional soil moisture based irrigation controller receives input from such an incorrectly located soil moisture sensor, the user can attempt to compensate by increasing the run times for each zone to compensate for the error. This is cumbersome and makes it difficult and frustrating for the user to adjust the conventional soil moisture based irrigation controller for optimum watering.

An advantage of the present invention is the ability to modify the watering programs of the stand alone irrigation controller 12 to compensate for this type of condition. If at any time the user realizes that a controlled zone is receiving too little water, the user can simply manually change an overall watering adjustment feature for that associated program. The overall watering adjustment feature is implemented as a simple plus or minus control via actuation of an assigned pair of the push buttons 128*a-c* (FIG. 9). This changes the reference point of the soil moisture requirement calculation either up or down. After this adjustment is made, the seasonal adjustment executed by the soil moisture control unit 16 references the new setting and then compensates for under watering that would otherwise occur. Likewise, if the overall watering is too much for the controlled zone, the user can simply adjust the overall watering adjustment feature down and create a new lower reference for the automatic soil moisture based adjustments. The overall watering adjustment feature makes it easy for the user to fine-tune the system to the particular requirements of the irrigation zone. The overall watering adjustment feature can be indicated by showing "global adjustment," or "more/less, water+/−," or similar naming conventions. In the case where more than one sensor is installed, this feature can be used to modify each assigned sensor independently of the others.

In calculating the estimated soil moisture requirement value, the microcontroller 108 (FIG. 10) in the soil moisture control unit 16 uses only select data points as variables (soil moisture readings and optional temperature measurements) and may use other data points that consist of pre-programmed constants, and/or data entered by the user that defines some one or more constants of the site.

Another feature provided by the soil moisture control unit 16 is an automatic shut down feature for irrigation that overrides any scheduled run times. The automatic shut down feature of the soil moisture control unit 16 can be utilized in geographic areas where watering agencies and municipalities impose restrictions that limit the times when irrigation can occur. The user is able to enter a no-water window into the soil moisture control unit 16, which consists of the times when irrigation is not allowed to take place. When a no-water window is entered by the user, the soil moisture control unit 16 will signal the irrigation controller 12 to shut down, irregardless of any scheduled irrigation running or not running at the time. The soil moisture control unit 16 will then allow the irrigation controller 12 to return to its normal run mode after the selected no-water window time has elapsed. The irrigation controller 12 may have sensor input terminals which can be used to shut down all watering on receipt of a shut down command from the soil moisture control unit 16.

In summary, the soil moisture control unit 16 of the present invention utilizes the watering program set up procedures that the users are already accustomed to. Start times, station run times, and days-to-water are manually entered into the irrigation controller 12. When multiple sensors are installed, the user can assign a specific sensor to a specific program of the irrigation controller. Each watering program will have one or more zones assigned to it. The user also selects from one of a group selected sensors in the soil moisture control unit 16. The soil moisture control unit 16 then automatically takes over setting of the seasonal adjustment feature of each of the zones of the irrigation controller 12 on a regular basis. Instead of a user changing these settings several times per year, the soil moisture control unit 16 sets these seasonal adjustments program by program as required depending on current soil conditions gathered on site. Furthermore, the soil moisture control unit 16 shuts down any scheduled watering by the irrigation controller 12 when there is a scheduled no-water window to comply with local agency regulations.

The present invention also provides a unique method of controlling a plurality of valves on an irrigation site. The method includes the steps of selecting and/or creating one or more watering schedules, assigning those watering schedules to one or more watering programs, storing the watering programs and generating a signal representative of the soil moisture condition associated with any one or more of the watering programs on an irrigation site. The method also includes the steps of calculating an estimated soil moisture requirement value for the schedules associated with each assigned program based at least in part on the signal and selectively turning a plurality of valves located on the irrigation site ON and OFF in accordance with each assigned watering schedule. Importantly, the method includes the further step of automatically modifying each assigned watering program based on the estimated soil moisture requirement value using a seasonal adjust algorithm to thereby conserve water while maintaining the health of plants on the irrigation site. Optionally, the method of the present invention may further include the step of inputting an overall watering adjustment and independently modifying each assigned watering program through the seasonal adjust algorithm based on the estimated soil moisture requirement value as increased or decreased by the inputted overall watering adjustment.

Figure 14:
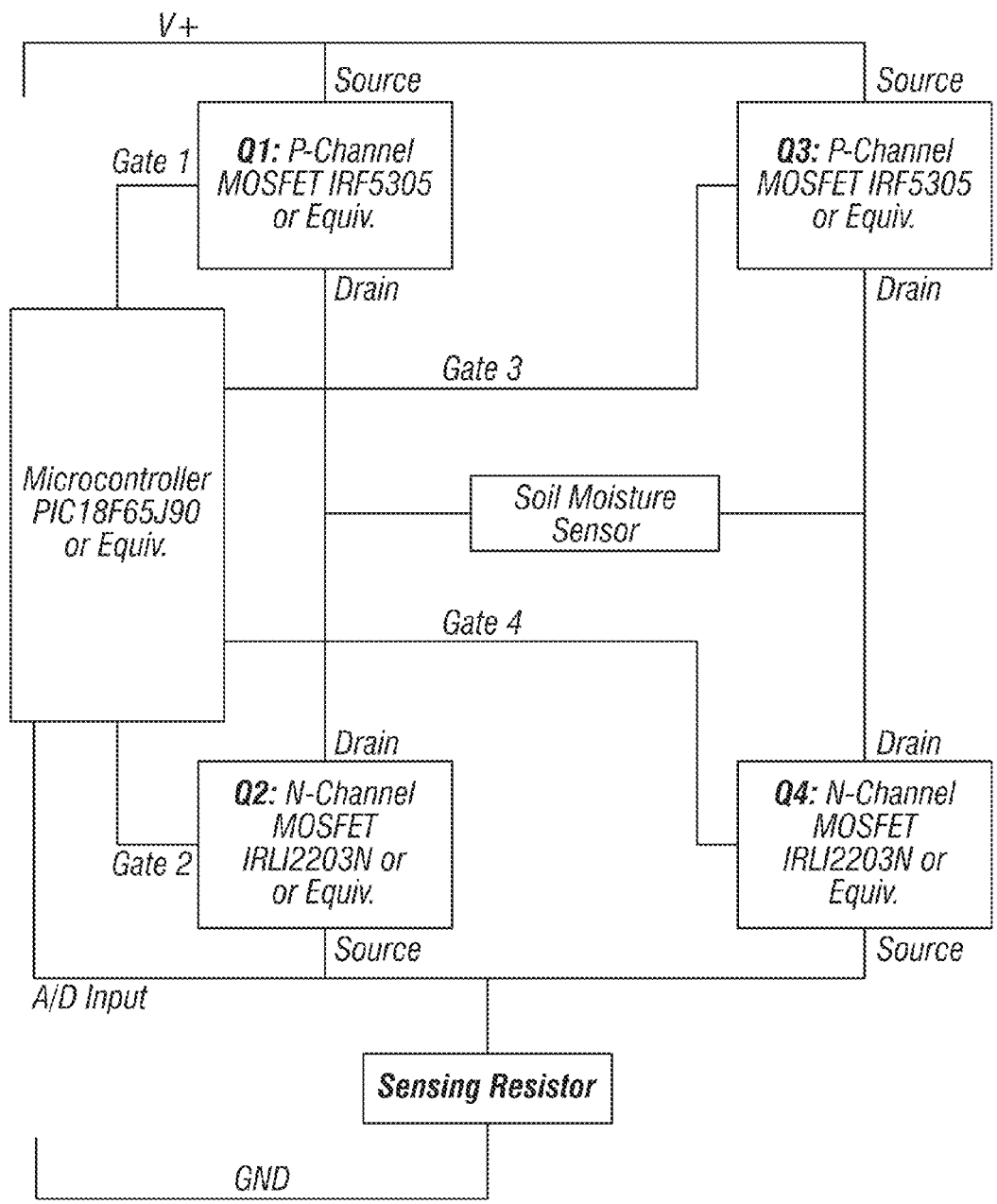
FIG. 14 is a schematic diagram of an interface circuit for use with a resistive soil moisture sensor.
Figure 15:
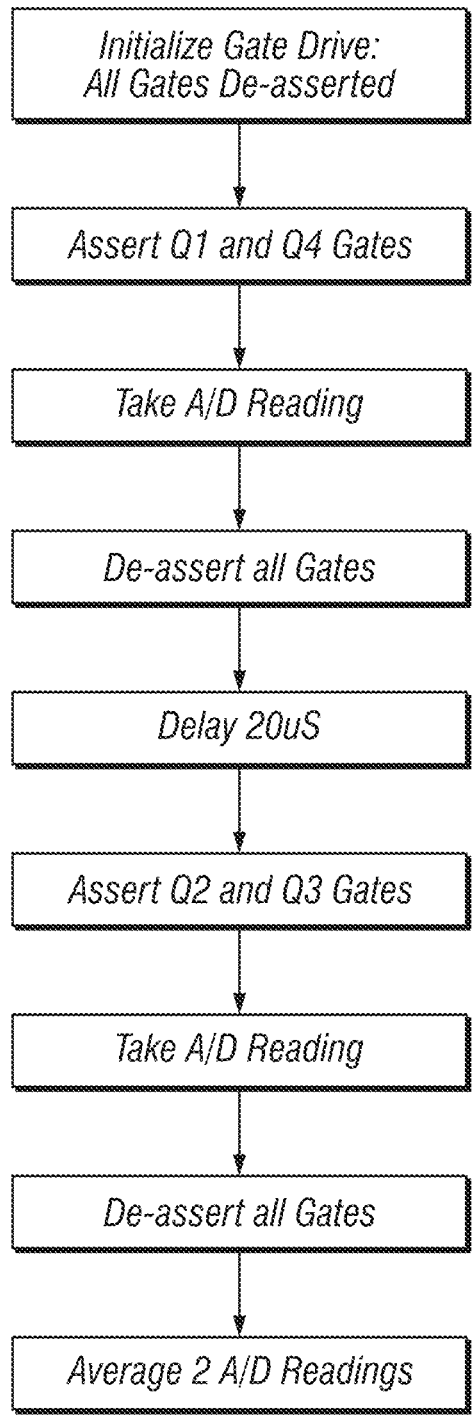
FIG. 15 is a flow diagram illustrating the operation of the interface circuit of FIG. 12.

While the a soil moisture sensor of any type can be combined with some intelligence (microcontroller) at the sensor itself, and made to communicate with the control unit via the MMBTA92 and LM393 as discussed earlier, it may be more cost effective to deal with the "raw" sensor interface, than to add this intelligence in every soil moisture sensor. An example of this approach for a resistive soil moisture sensor is illustrated in FIGS. 14 and 15.

This type of sensor varies its resistance based on the amount of moisture in the soil. It is very important that there be no DC potential between any metallic part of the sensor, and earth ground. If such a potential exists, the sensor will disintegrate due to the well known process of galvanic corrosion. Referring to the schematic diagram of FIG. 14, and the flowchart of FIG. 15, it will be understood that first transistors Q1 and Q4 turn ON, and the resistance of the sensor is measured using the sensing resistor and an A/D input of the microcontroller. Then, Q1 and Q4 are turned OFF and transistors Q2 and Q3 are turned ON and the measurement repeated. Both readings should be about the same, but are averaged to increase accuracy. During the first measurement, a DC voltage of one polarity is applied to the sensor. During the second measurement, an opposite polarity DC voltage is applied to the sensor, thus the time-average DC voltage that the sensor sees is zero. Furthermore, during the vast majority of the time, when no readings are being taken, all transistors are OFF and there is no potential on the sensor. This approach eliminates the galvanic corrosion that would otherwise occur.

The relationship of resistance to soil moisture is typically non-linear, thus the microcontroller can apply a polynomial expansion, or lookup table function to determine the amount of moisture in the soil from the resistance reading.

The present invention also provides a unique method to automatically develop irrigation programs using soil moisture based control technology. FIGS. 16 A-16C are flow charts that illustrate how an irrigation controller that uses soil moisture sensors can establish the irrigation programs automatically. The controller has the ability to automatically establish all of the watering schedules for each program that has a soil moisture sensor associated with it. After the user has completed the wiring and installation of all of the irrigation components and sensors, the user will do some simple entries on the controller to associate certain zones with certain programs. This may include the steps of assigning one or more master zones with each master zone having a soil moisture sensor communicating to it. Each master zone will be assigned to a program. Then the user then assigns associated zones to each program. The user may for example assign all of the stations that irrigate turf in the sun to one program. If all of the zones that irrigate turf in the sun have sprinklers that wet the area at the same precipitation rate, then only one sensor is necessary in only one of the zones. This zone is referred to as the master zone. Likewise, all stations that water turf in the shade may be assigned to another seasonal adjustment. This may continue to add other zones such as those used for potted plants, those used for planters with over head watering, those used for planters with drip, those used for watering trees, etc. Each associated zone can be programmed to run the same time as the master zone, or a percentage higher or lower than the master zone. This allows the user to vary the times of each zone as may be required by different precipitation rates, or other environmental factors affecting that zone.

Figure 16A:
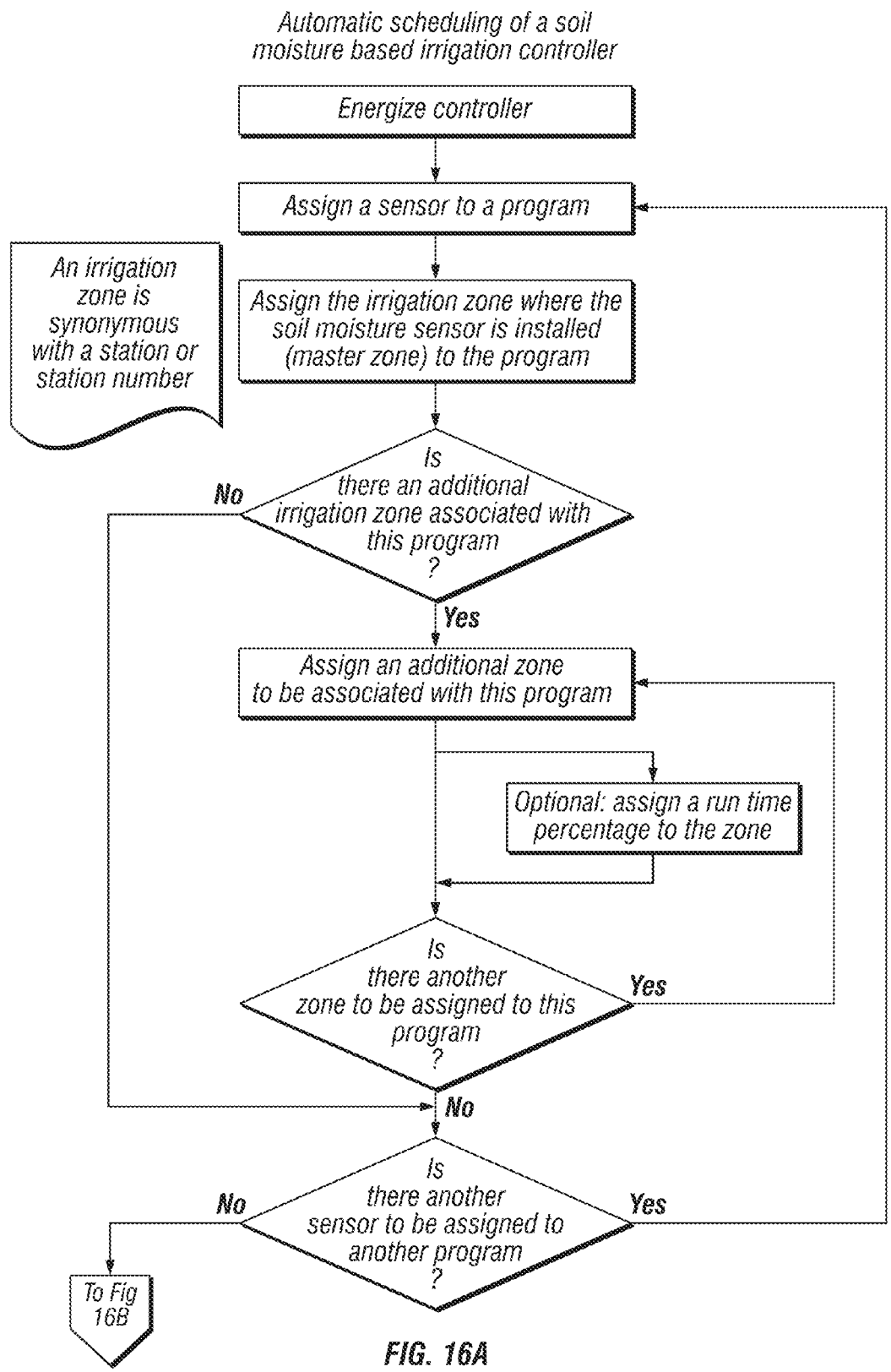
FIGS. 16A-16C are flow diagrams illustrating a method that may be employed by a soil moisture sensor based irrigation controller for automatically entering the watering schedule based on learned data.
Figure 16B:
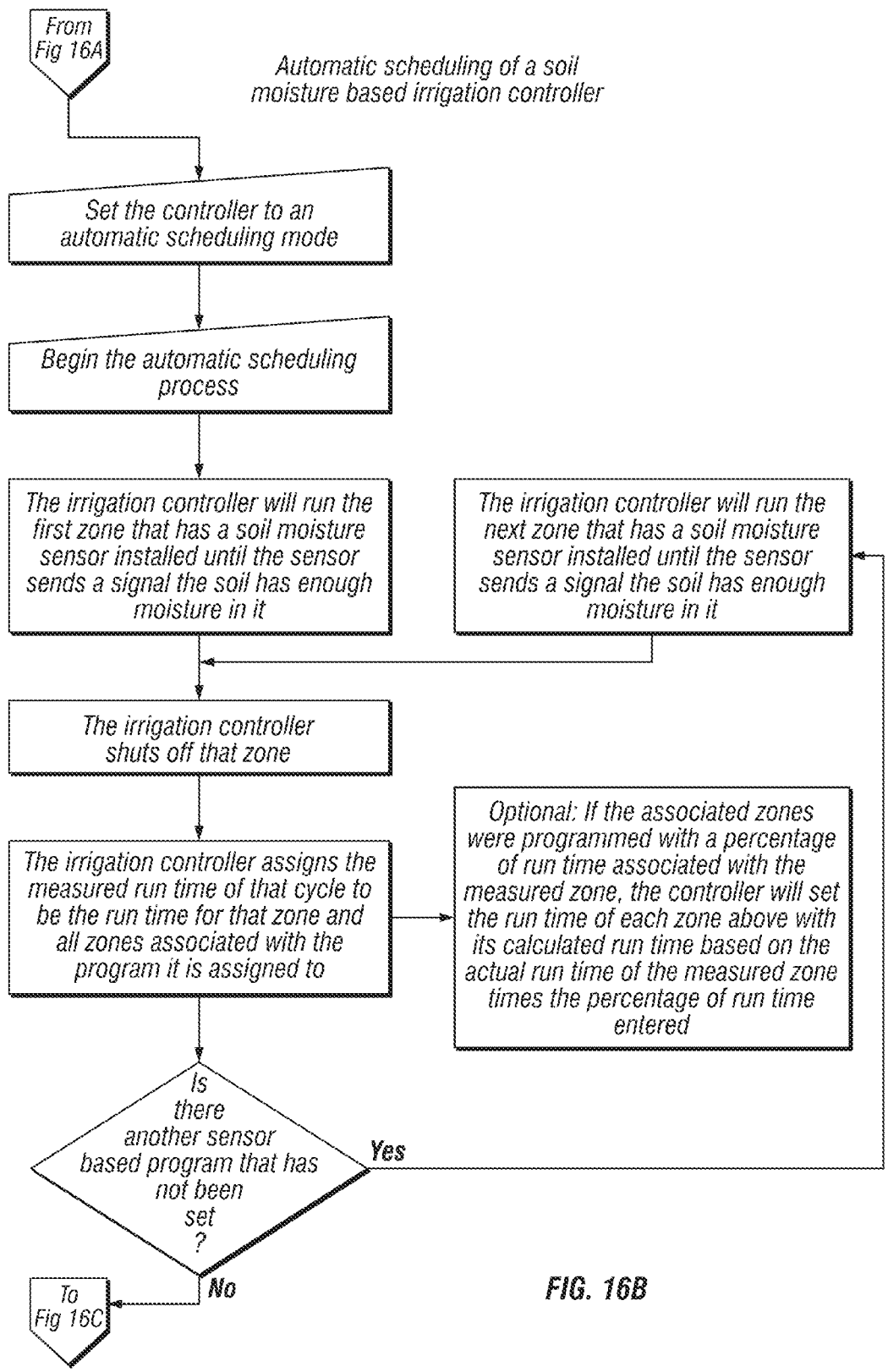
Figure 16C:
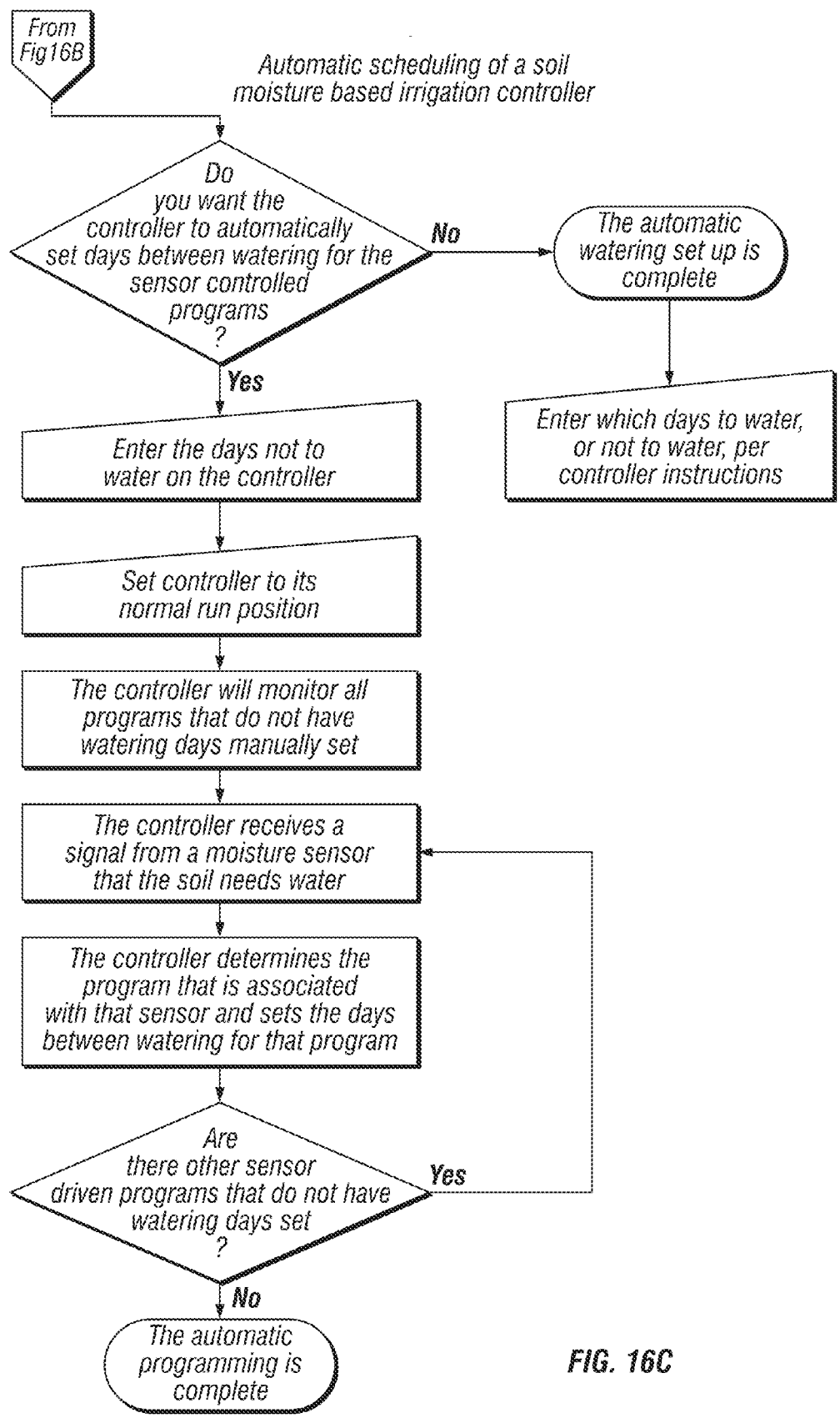

The method illustrated in FIGS. 16A-16C further includes the step of starting the controllers' irrigation in an automatic programming mode. In the automatic programming mode, the controller runs the first master zone until the soil moisture sensor senses that the soil is moist. The controller then sets this time as the run time for the first master zone and calculates the run time for each associated zone assigned to it. The controller repeats this function for each of the remaining master zones. Once the time values have been established for each of the zones, the user set the controller to run automatically. The controller will monitor each automatically programmed master zone to determine how many days it takes for the sensor to dry out. When each of the sensors sense that the zone associated with it is dry, the controller will set the delay time between watering values for that program and begin irrigating according to the watering schedule.

Figure 17A:
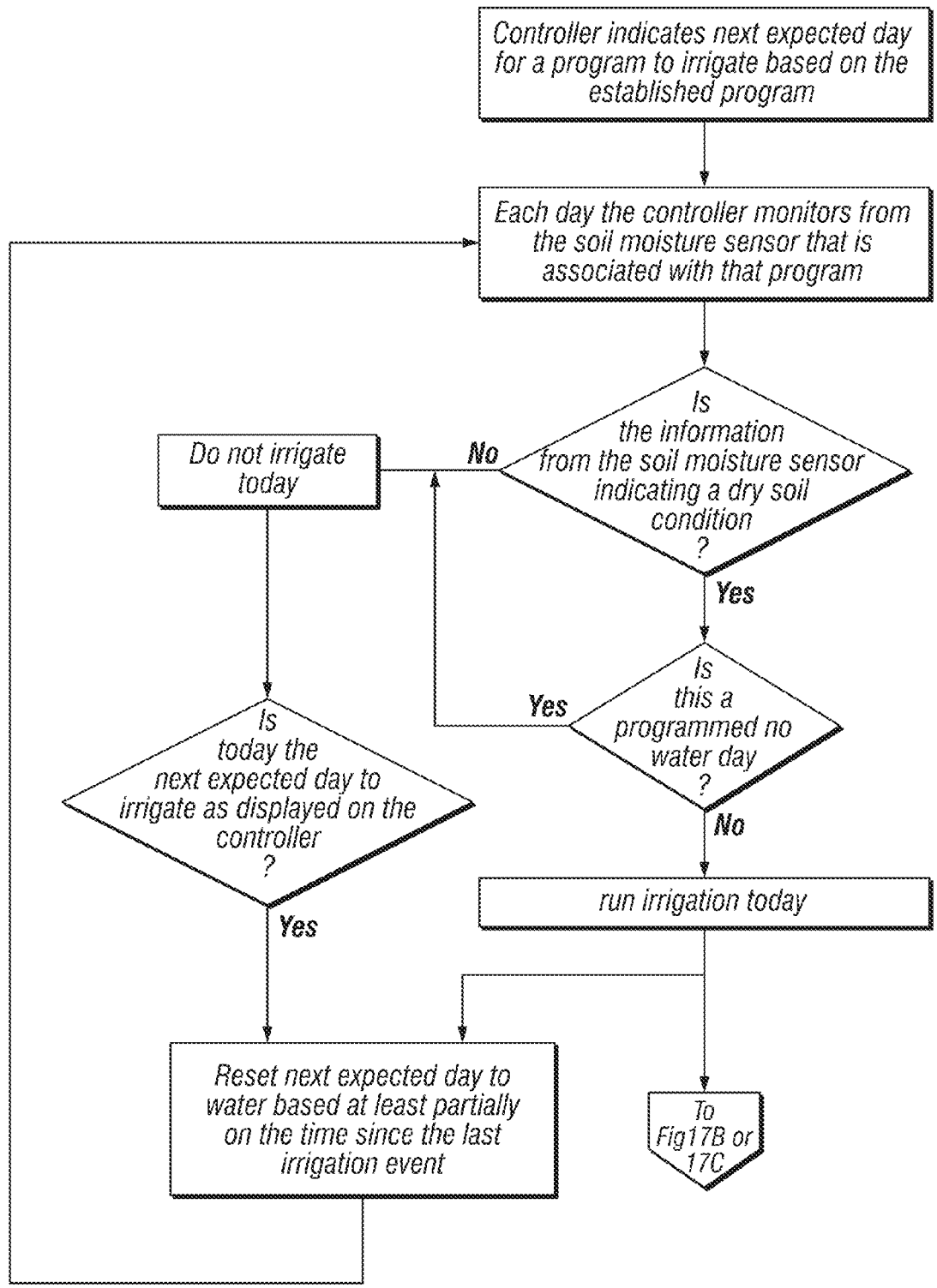
FIGS. 17A-17C are flow diagrams illustrating a method for automatically and continuously refining the watering schedules of a soil moisture based controller using learned data.
Figure 17B:
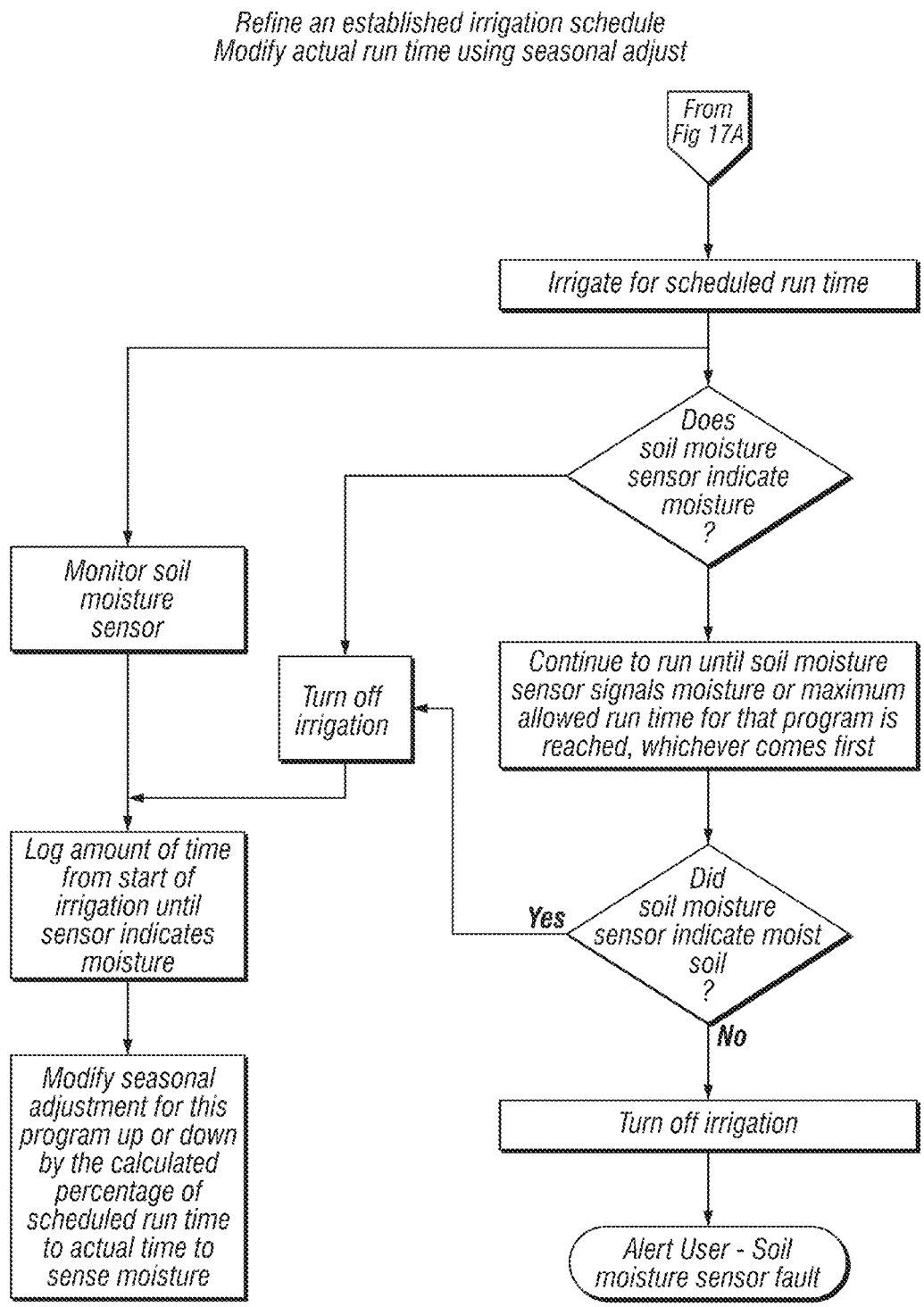
Figure 17C:
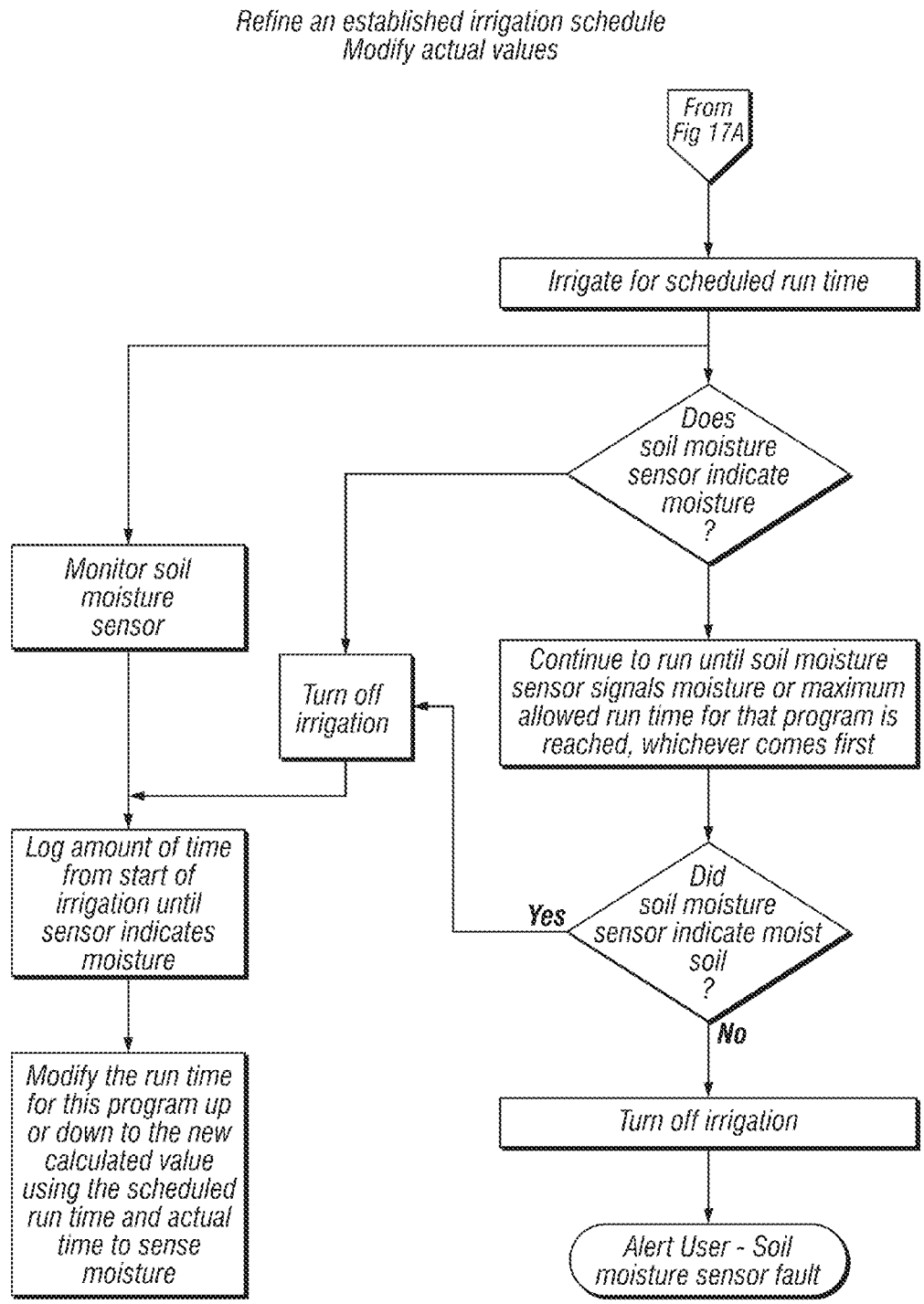

FIGS. 17 A-C are flow charts that illustrate how a soil moisture based controller can continuously monitor soil conditions and refine the irrigation schedule that was previously established. In normal operation, the controller may indicate an expected delay between watering days and display an expected next day to water that the user can view. The actual next day to water is ultimately determined by actual measurements of the soil moisture sensor. The station will actually water when the soil moisture sensor signals that the soil is dry. Factors that may affect the actual watering day include rain, manual watering, or excessive depletion of moisture from the soil because of hot or dry weather conditions. When each of the sensors sense that the zone associated with it is dry, the controller will set the delay time between watering values for that zone and begin irrigating according to the watering schedule. The amount of time that the stations waters may be adjusted regularly base on actual measurements of time required for the soil moisture sensor to send the signal that the soil is moist. This adjustment may be made through the seasonal adjustment feature or as a direct numerical value based on the measured time. A maximum run time can be entered for each zone either manually or automatically. This will prevent that zone from excessive over watering in the event a sensor fails, or the controller does not receive the signal from the sensor because of wiring or other communication problems.

Thus the system described herein can automatically generate a watering schedule where one does not exist at all through a self teaching routine. The system can continuously modify the automatically generated watering schedule in addition to modifying the seasonal adjustment. Air and/or soil temperature can optionally be added to the calculations. The system includes the ability for the operator to manually set an overall watering adjustment feature to modify the adjustments normally made by the system to compensate for factors such as shade, excess sun, less than ideal installations, etc. The system can also include an automatic irrigation shut-off over ride feature to meet local municipality requirements.

While embodiments of an irrigation system comprising a stand alone soil moisture control unit connected to stand alone irrigation controller and linked to one or more separate soil moisture sensors have been described in detail, persons skilled in the art will appreciate that the present invention can be modified in arrangement and detail. The features and functionality described could be provided by combining the irrigation controller and the soil moisture control unit into a single integrated unit in which case a single microcontroller would replace the microcontrollers 40 and 108. Alternatively, the soil moisture control unit could be packaged in a soil moisture control module designed for removable insertion into a receptacle in a stand alone irrigation controller. The irrigation controller may be mounted outside, or be connected directly to 110 or 220 AC power with a transformer mounted inside the irrigation controller. The soil moisture sensors or communications hubs may be powered by batteries that may be replaceable or rechargeable. Rechargeable batteries may be recharged using any charging technology including solar, water, or wind powered generators. The functions of the distributed system illustrated in FIGS. 1A-1H could be all be implemented in a stand alone controller, working through a single micro processor, without need for the separate soil moisture control unit. Therefore, the protection afforded the subject invention should only be limited in accordance with the scope of the following claims.

What is claimed is:

1. An irrigation controller, comprising:
a control panel including a display and a plurality of user inputs that enable a user to enter one or more watering programs, each watering program including at least one start time, at least one zone assigned to the watering program, a run time for each zone, and a percentage adjustment feature, the plurality of user inputs further enable the user to manually adjust a percentage adjustment value of the percentage adjustment feature for each watering program;
a computer processor operatively connected to the control panel;
a memory connected to the computer processor, said computer processor configured to execute programs stored in the memory;
a plurality of switches operatively connected to the processor for turning a power signal on and off to a plurality of valves that deliver water to a plurality of sprinklers organized into different ones of said zones of an irrigation site;
programming stored in the memory to accept input from a user via the plurality of user inputs to implement said one or more watering programs, wherein during each run time of each watering program, said computer processor operates ones of said plurality of switches to turn said power signal on to one or more of said plurality of valves thereby delivering said water to ones of said plurality of sprinklers to irrigate the at least one zone associated with that watering program, said programming further accepting input from the user via the user inputs to implement the percentage adjustment feature of each watering program to increase or decrease said run time of each zone assigned to that watering program by said percentage adjustment value, said percentage adjustment value being a percentage of said run time, wherein the computer processor implements said increase or decrease of said run time by said percentage adjustment value; and
programming stored in memory that calculates an amount of time for at least one watering program until a signal from at least one soil moisture sensor associated with that watering program indicates a predetermined soil moisture level, compares said amount of time to reach the predetermined soil moisture level to the run time as increased or decreased by the percentage adjustment value for that watering program, and automatically increases or decreases said percentage adjustment value of said percentage adjustment feature for that watering program based on the comparison.

2. The controller of claim 1 wherein said percentage adjustment feature comprises a seasonal adjustment feature.

3. The controller of claim 1 wherein the programming provides a capability to enter through the control panel at least one no-water window that automatically overrides at least one watering program.

4. The controller of claim 1 wherein the programming automatically increases or decreases said percentage adjustment value of said percentage adjustment feature for that watering program based on the comparison and temperature signal from a temperature sensor.

5. The controller of claim 1 wherein a soil moisture requirement value is calculated by a second processor in a moisture sensor control unit operatively connected between the computer processor and the at least one soil moisture sensor.

6. The controller of claim 1 further comprising a plurality of decoder modules each connecting the computer processor with a corresponding one of the at least one soil moisture sensor.

7. The controller of claim 1 further comprising programming stored in memory that decreases said percentage adjustment value of said percentage adjustment feature for that watering program when the comparison indicates that the amount of time to reach the predetermined soil moisture level is less than the run time as increased or decreased by the percentage adjustment value.

8. The controller of claim 7 further comprising programming stored in memory that increases said percentage adjustment value of said percentage adjustment feature for that watering program when the comparison indicates that the amount of time to reach the predetermined soil moisture level is greater that the run time as increased or decreased by the percentage adjustment value.

9. A soil moisture based irrigation system, comprising:
a stand alone irrigation controller comprising:
a control panel including a display and a plurality of user inputs that enable a user to enter one or more watering programs, each watering program including at least one start time, at least one zone assigned to the watering program, a run time for each zone, and a percentage adjustment feature, the plurality of user inputs further enable the user to manually adjust a percentage adjustment value of the percentage adjustment feature for each watering program;
a computer processor operatively connected to the control panel,
a memory connected to the computer processor, said computer processor configured to execute programs stored in the memory;
a plurality of switches operatively connected to the computer processor to turn a power signal ON and OFF to a plurality of valves that deliver water to a plurality of sprinklers organized into different zones of an irrigation site; and programming stored in the memory to accept input from the user via the plurality of user inputs to implement said one or more watering programs, wherein during said run times of each watering program, said computer processor operates ones of said plurality of switches to turn said power signal on to one or more of said plurality of valves thereby delivering said water to ones of said plurality of sprinklers to irrigate at least one zone associated with that watering program, said programming further accepting input from the user via the user inputs to implement the percentage adjustment feature of each watering program to increase or decrease each run time associated with that watering program by the percentage adjustment value;
at least one soil moisture sensor physically associated with at least one watering program; and
a stand alone soil moisture control unit operatively in communication with the stand alone irrigation controller and the at least one soil moisture sensor, the stand alone soil moisture control unit installed on the irrigation site and including programming stored in memory that calculates an amount of time for the at least one watering program until a signal from the at least one soil moisture sensor associated with that watering program reaches a predetermined soil moisture level, compares said amount of time to reach the predetermined soil moisture level to the run time as increased or decreased by the percentage adjustment value for that watering program to calculate a change to said percentage adjustment value, and communicates said change for that watering program to said computer processor of said stand alone irrigation controller to automatically increase or decrease said percentage adjustment value of said percentage adjustment feature for that watering program.

10. The system of claim 9 wherein the stand alone soil moisture control unit is configured to receive power from the stand alone irrigation controller.

11. The system of claim 9 further comprising a communications hub connecting the at least one soil moisture sensor and the stand alone soil moisture control unit.

12. The system of claim 9 wherein the processor implements said increase or decrease of said run time of each watering program without changing a time value of the run time stored in the memory of the stand alone irrigation controller.

13. The system of claim 9 wherein at least two soil moisture sensors are connected in a daisy chain connection configuration that allows communications between the at least two soil moisture sensors and the stand alone soil moisture control unit.

14. The system of claim 9 wherein the stand alone soil moisture control unit further comprises programming that decreases said percentage adjustment value of said percentage adjustment feature for that watering program when the comparison indicates that the amount of time to reach the predetermined soil moisture level is less than the run time as increased or decreased by the percentage adjustment value.

15. The system of claim 14 wherein the stand alone soil moisture control unit further comprises programming that increases said percentage adjustment value of said percentage adjustment feature for that watering program when the comparison indicates that the amount of time to reach the predetermined soil moisture level is greater than the run time as increased or decreased by the percentage adjustment value.

16. An irrigation controller, comprising:
a control panel including a display and a plurality of user inputs that enable a user to enter one or more watering programs, each watering program including at least one zone assigned to that watering program and a run time for each zone;
the plurality of user inputs further enable the user to assign one or more watering programs to one of a plurality of percentage adjustment features and to manually adjust a percentage adjustment value for each of the plurality of percentage adjustment features;
a computer processor operatively connected to the control panel;
a memory connected to the computer processor, said computer processor configured to execute programs stored in the memory;
a plurality of switches operatively connected to the processor for turning a power signal on and off to a plurality of valves that deliver water to a plurality of sprinklers organized into different zones of an irrigation site;
programming stored in the memory to accept input from a user via the plurality of user inputs to implement said one or more watering programs, wherein during said run times of each watering program, said computer processor operates ones of said plurality of switches to turn said power signal on to one or more of said plurality of valves thereby delivering said water to ones of said plurality of sprinklers to irrigate at least one zone associated with that watering program, said programming further accepting input from the user via the user inputs to implement the percentage adjustment feature of each watering program to increase or decrease said run times of that watering program by said percentage adjustment value, said percentage adjustment value being a percentage of said run time, wherein the computer processor implements said increase or decrease of said run time; and programming stored in memory that monitors soil moisture for at least one watering program using a signal from at least one soil moisture sensor associated with that watering program, wherein if the signal indicates that the soil moisture has reached a predetermined soil moisture level before completion of the run time as adjusted by said percentage adjustment feature for that watering program, then said percentage adjustment value of said percentage adjustment feature is automatically decreased, else said percentage adjustment value of said percentage adjustment feature is automatically increased.

17. The controller of claim 16 further comprising programming stored in the memory that decreases said percentage adjustment value of said percentage adjustment feature for that watering program by a percentage of actual run time to an amount of time to sense the predetermined soil moisture level.

18. The system of claim 16 further comprising programming stored in the memory that provides the capability to enter at least one no-water window that automatically overrides at least one watering program.

19. The system of claim 16 wherein the at least one soil moisture sensor is operatively connected to the computer processor through a wireless communications link.

20. The system of claim 16 further comprising programming stored in the memory that modifies the one or more watering programs through a data port.

* * * * *

UNITED STATES PATENT AND TRADEMARK OFFICE
CERTIFICATE OF CORRECTION

| | |
|---|---|
| PATENT NO. | : 8,793,024 B1 |
| APPLICATION NO. | : 12/713104 |
| DATED | : July 29, 2014 |
| INVENTOR(S) | : Peter J. Woytowitz et al. |

It is certified that error appears in the above-identified patent and that said Letters Patent is hereby corrected as shown below:

In the Specification

In column 8 at line 41, Change "an a" to --a--.

In column 21 at line 62, Change "the a" to --a--.

In the Claims

In column 25 at line 17, In Claim 8, delete "that" and insert --than--, therefor.

Signed and Sealed this
Twenty-fourth Day of March, 2015

Michelle K. Lee
*Director of the United States Patent and Trademark Office*